United States Patent
Nguyen

Patent Number: 6,058,465
Date of Patent: *May 2, 2000

[54] SINGLE-INSTRUCTION-MULTIPLE-DATA PROCESSING IN A MULTIMEDIA SIGNAL PROCESSOR

[76] Inventor: Le Trong Nguyen, 15095 Danielle Pl., Monte Sereno, Calif. 95030

[*] Notice: This patent issued on a continued prosecution application filed under 37 CFR 1.53(d), and is subject to the twenty year patent term provisions of 35 U.S.C. 154(a)(2).

[21] Appl. No.: 08/699,597

[22] Filed: Aug. 19, 1996

[51] Int. Cl.⁷ ............ G06F 9/305; G06F 13/20; G06F 9/38
[52] U.S. Cl. ........ 712/7; 712/4; 712/5; 712/13; 712/228; 712/23; 708/441
[58] Field of Search ........ 395/800.22, 800.07, 395/800.05, 800.04, 800.02, 386; 708/520, 641, 550; 712/3, 7, 4, 5, 6, 23, 13, 22, 228, 222, 244, 40; 711/217

[56] References Cited

U.S. PATENT DOCUMENTS

| | | | |
|---|---|---|---|
| 4,916,657 | 4/1990 | Morton | 712/22 |
| 5,073,970 | 12/1991 | Aoyama et al. | 708/520 |
| 5,146,592 | 9/1992 | Pfeiffer et al. | 395/157 |
| 5,327,541 | 7/1994 | Reinecke et al. | 395/400 |
| 5,361,385 | 11/1994 | Bakalash | 395/124 |
| 5,513,366 | 4/1996 | Agarwal et al. | 712/22 |
| 5,515,520 | 5/1996 | Hatta et al. | 708/550 |
| 5,530,888 | 6/1996 | Amasaki et al. | 395/825 |
| 5,590,328 | 12/1996 | Seno et al. | 395/675 |
| 5,689,653 | 11/1997 | Karp et al. | 712/222 |
| 5,706,478 | 1/1998 | Dye | 395/503 |
| 5,706,514 | 1/1998 | Bonola | 395/674 |
| 5,751,981 | 5/1998 | Witt et al. | 395/380 |
| 5,832,290 | 11/1998 | Gostin et al. | 711/217 |

*Primary Examiner*—Daniel H. Pan
*Attorney, Agent, or Firm*—Skjerven, Morrill, MacPherson, Franklin & Friel LLP; David T. Millers

[57] ABSTRACT

A vector processor architecture provides vector registers of fixed size having data elements of programmable size and type. The type and size for data elements are defined by instructions which manipulate operands associated with the vector registers. The data size defined by an instruction determines the number of the data elements in a vector register and the number of parallel operations performed to complete the instruction. One embodiment of the invention supports 8-bit, 9-bit, 16-bit, and 32-bit data element sizes of integer type for all sizes and floating point data type for the 32-bit data elements.

14 Claims, 10 Drawing Sheets

SINGLE-INSTRUCTION-MULTIPLE-DATA PROCESSING IN A MULTIMEDIA SIGNAL PROCESSOR

CROSS-REFERENCE TO RELATED APPLICATION

This patent document is related to and incorporates by reference, in their entirety the following concurrently filed patent applications:

U.S. patent application Ser. No. 08/697,102, entitled "Multiprocessor Operation in a Multimedia Signal Processor;"

U.S. patent application Ser. No. 08/699,208, filed Aug. 19, 1996, now U.S. Pat. No. 5,751,597, entitled "Efficient Context Saving and Restoring in Multi-Tasking Computing System Environment";

U.S. patent application Ser. No. 08/699,295, entitled "System and Method for Handling Software Interrupts with Argument Passing";

U.S. patent application Ser. No. 08/699,294, entitled "System and Method for Handling Interrupts and Exception Events in an Asymmetric Multiprocessor Architecture";

U.S. patent application Ser. No. 08/699,303, entitled "Methods and Apparatus for Processing Video Data";

U.S. patent application Ser. No. 08/697,086, filed Aug. 19, 1996, now U.S. Pat. No. 5,838,984, entitled "Single-Instruction-Multiple-Data Processing Using Multiple Banks of Vector Registers"; and U.S. patent application Ser. No. 08/699,585, entitled "Single-Instruction-Multiple-Data Processing with Combined Scalar/Vector Operations".

BACKGROUND OF THE INVENTION

1. Field of the Invention

This invention relates to digital signal processors, and particularly processes for parallel processing of multiple data elements per instruction for multimedia functions such as video and audio encoding and decoding.

2. Description of Related Art

Programmable digital signal processors (DSPs) for multimedia applications such as real-time video encoding and decoding require considerable processing power for the large amount of data which must be processed within a limited time. Several architectures for digital signal processors are known. A general purpose architecture such employed in most microprocessors typically requires high operating frequencies to provide a DSP with sufficient computing power for real-time video encoding or decoding. This makes such DSP expensive.

A very long instruction word (VLIW) processor is a DSP having many functional units most of which perform different, relatively simple tasks. A single instruction for a VLIW DSP may be 128 bytes or longer and has separate parts which the separate functional units execute in parallel. VLIW DSPs have high computing power because many functional units can operate in parallel. VLIW DSPs also have relatively low cost because each functional unit is relatively small and simple. A problem for VLIW DSPs is inefficiency in handling input/output control, communication with a host computer, and other functions that do not lend themselves to parallel execution on the functional units of the VLIW DSP. Additionally, VLIW software differs from conventional software and can be difficult to develop because programming tools and programmers familiar with VLIW software architectures are scarce.

A DSP which provides reasonable cost, high computing power, and a familiar programming environment is sought for multimedia applications.

SUMMARY OF THE INVENTION

In accordance with an aspect of the invention, a multimedia digital signal processor (DSP) includes a vector processor which manipulates vector data (i.e. multiple data elements per operand) to provide high processing power. The processor uses a single-instruction-multiple-data architecture with a RISC type instruction set. Programmers can easily adapt to the programming environment of the vector processor because it is similar to the programming environments of general purpose processors with which most programmers are familiar.

The DSP includes a set of general-purpose vector registers. Each vector register has a fixed size but is partitioned into separate data elements of user selectable size. Accordingly, the number of data elements stored in a vector register depends on the selected size for the elements. For example, a 32-byte register can be divided into thirty two 8-bit data elements, sixteen 16-bit data elements, or eight 32-bit data elements. Selection of data element size and type is made by an instruction which processes data associated with the vector register, and an execution data path for the instruction performs a number of parallel operations which depends on data size indicated by an instruction.

Instructions for the vector processor may have vector registers or scalar registers as operands and manipulate multiple data elements of vector registers in a parallel so that computing power is high. An exemplary instruction set for a vector processor in accordance with the invention includes: co-processor interface operations; flow control operations; load/store operations; and logic/arithmetic operations. The logic/arithmetic operations include operations which combine data elements from one vector register with corresponding data elements from one or more other vector registers to generate the data elements of a resulting data vector. Other logic/arithmetic operations mix various data elements from one or more vector registers or combine data elements from a vector register with scalar quantities.

An extension of the vector processor architecture adds scalar registers, each of which contains a scalar data element. The combination of scalar and vector registers facilitates extension of the vector processor's instruction set to include operations that in parallel combine each data element of a vector with a scalar value. One instruction, for example, multiplies the data elements of a vector by a scalar value. Scalar registers also provide a location for storage of a single data element to be extracted from or stored in a vector register. The scalar register are also convenient for passing information between the vector processor and a co-processor having an architecture that provides only scalar registers and for calculations of effective addresses for load/store operations.

In accordance with another aspect of the invention, vector registers in the vector processor are organized into banks. Each bank can be selected to be the "current" bank while the other bank is the "alternative" bank. A "current bank" bit in a control register of the vector processor indicates the current bank. To reduce the number of bits require to identify a vector register, some instructions provide only a register number to identify a vector register in the current bank. Load/store instructions have an additional bit to identify a vector register from either bank. Accordingly, load/store operations can fetch data into the alternative bank during manipulation of data in the current bank. This facilitates software pipelining for image processing and graphics procedures, and reduces processor delays when fetching data because logic/arithmetic operations can be performed out-of-order with load/store operations accessing the alternative register bank. In other instructions, the alternative bank permits use of double-size vector registers which include a vector register from the current bank and a corresponding vector register from the alternative bank. Such double-size registers may be identified from instruction syntax. A control bit in the vector processor may be set so that the default vector size is either one or two vector registers. The alternative banks also enable use of fewer explicit identified operands in the syntax of complex instructions such as shuffle, unshuffle, saturate, and conditional moves that have two source and two destination registers.

The vector processor further implements novel instructions such as average quad, shuffle, unshuffle, pair-wise maximum and exchange, and saturate. These instructions perform operations common in multimedia functions such as video encoding and decoding and take the place of two or more instructions which other instruction sets would required to implement the same function. Accordingly, the vector processor instruction set improves the efficiency and speed of programs in multimedia applications.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
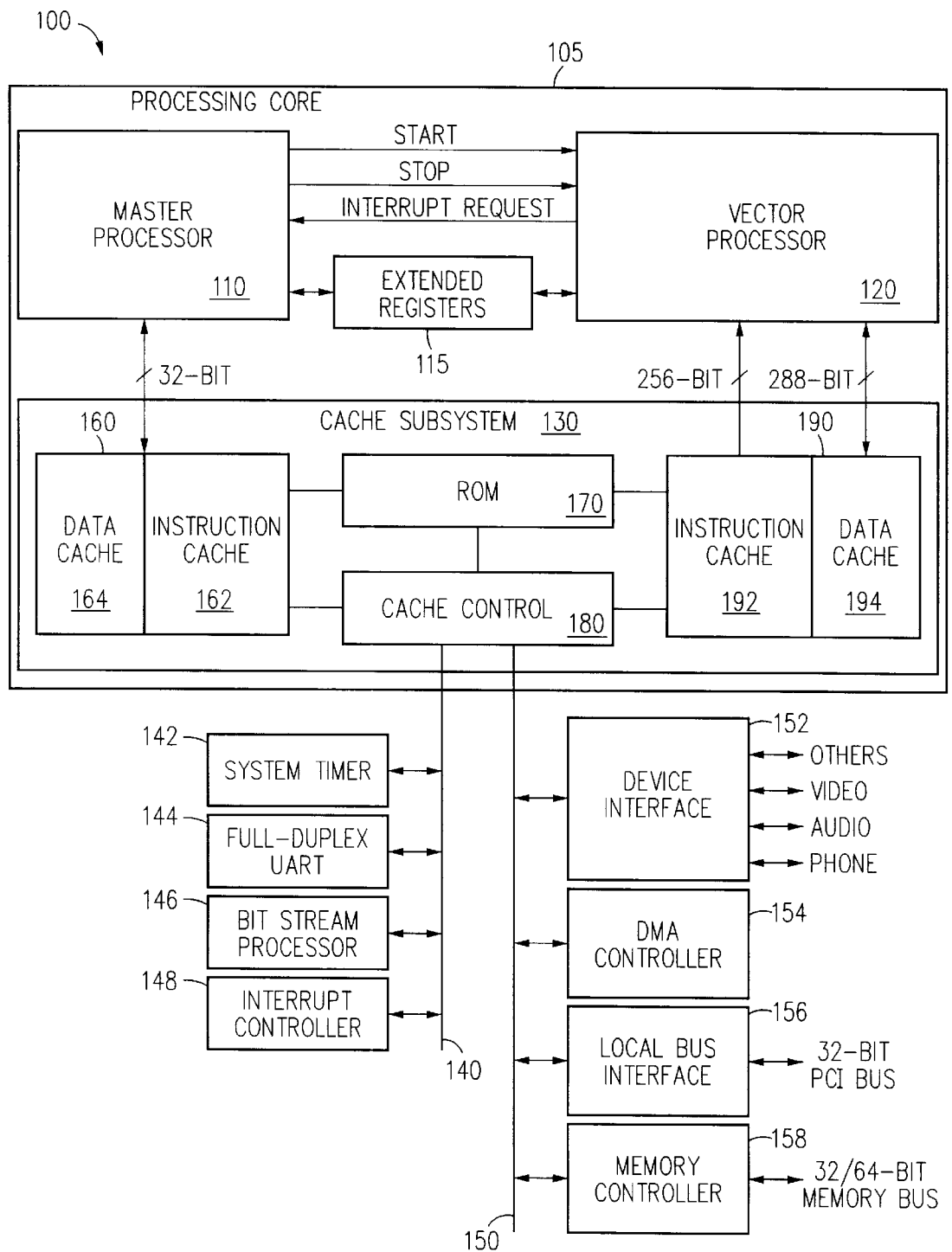
FIG. 1 is a block diagram of a multimedia processor in accordance with an embodiment of the invention.

FIG. 1 shows a block diagram of an embodiment of a multimedia signal processor (MSP) 100 in accordance with an embodiment of the invention. Multimedia processor 100 includes a processing core 105 containing a general-purpose processor 110 and a vector processor 120. Processing core 105 connects to the remainder of multimedia processor 100 through a cache subsystem 130 which contains SRAM 160 and 190, a ROM 170, and a cache control 180. Cache control 180 can configure SRAM 160 as an instruction cache 162 and a data cache 164 for processor 110 and configure SRAM 190 as an instruction cache 192 and data cache 194 for vector processor 120.

On-chip ROM 170 contains data and instructions for processors 110 and 120 and can also be configured as a cache. In the exemplary embodiment, ROM 170 contains: reset and initialization procedures; self-test diagnostics procedures; interrupt and exception handlers; and subroutines for soundblaster emulation; subroutines for V.34 modem signal processing; general telephony functions; 1-D and 3-D graphics subroutine libraries; and subroutine libraries for audio and video standards such as MPEG-1, MPEG-2, H.261, H.263, G.728, and G.723.

Cache subsystem 130 connects processors 110 and 120 to two system busses 140 and 150 and operates as both a cache and a switching station for processors 110 and 120 and the devices coupled to busses 140 and 150. System bus 150 operates at a higher clock frequency than bus 140 and is connected to a memory controller 158, a local bus interface 156, a DMA controller 154, and a device interface 152 which respectively provide interfaces for an external local memory, a local bus of a host computer, direct memory accesses, and various analog-to-digital and digital-to-analog converters. Connected to bus 140 are a system timer 142, a UART (universal asynchronous receiver transceiver) 144, a bitstream processor 146, and an interrupt controller 148. The above-incorporated patent applications entitled "Multiprocessor Operation in a Multimedia Signal Processor" and "Methods and Apparatus for Processing Video Data" more fully describe the operation of cache subsystem 130 and exemplary devices which processors 110 and 120 access through cache subsystem 130 and buses 140 and 150.

Processors 110 and 120 execute separate program threads and are structurally different for more efficient execution of particular tasks assigned to them. Processor 110 is primarily for control functions such as execution of a real-time operating system and similar functions not requiring large numbers of repetitive calculations. Accordingly, processor 110 does not require high computing power and can be implemented using a conventional general-purpose processor architecture. Vector processor 120 mostly performs number crunching that involves repetitive operations on data blocks common in multimedia processing. For high computing power and relatively simple programming, vector processor 120 has a SIMD (single instruction multiple data) architecture; and in the exemplary embodiment, most data paths in vector processor 120 are either 288 or 576 bits wide to support vector data manipulation. Additionally, the instruction set for vector processor 120 includes instructions particularly suited for multimedia problems.

In the exemplary embodiment, processor 110 is a 32-bit RISC processor which operates at 40 MHz and conforms to the architecture of an ARM7 processor including a register set as defined by the ARM7 standard. An architecture and instruction set for an ARM7 RISC processor is described in the "ARM7DM Data Sheet", Document Number: ARM DDI 0010G which is available from Advance RISC Machines Ltd. The ARM7DM Data Sheet is hereby incorporated by reference herein in its entirety. Appendix A describes the extension of ARM7 instruction set in the exemplary embodiment.

Vector processor 120 manipulates both vector and scalar quantities. In the exemplary embodiment, vector data processor 120 consists of a pipelined RISC engine that operates at 80 MHz. The registers of vector processor 120 includes 32-bit scalar registers, 32-bit special-purpose registers, two banks of 288-bit vector registers, and two double-size (i.e. 576-bit) vector accumulator registers. Appendix C describes the register set for the exemplary embodiment of vector processor 120. In the exemplary embodiment, processor 120 includes 32 scalar registers which are identified in instructions by 5-bit register numbers ranging from 0 to 31. There are also 64 288-bit vector registers which are organized into two banks of 32 vector registers. Each vector register can be identified by a 1-bit bank number (0 or 1) and a 5-bit vector register number ranging from 0 to 31. Most instruction only access vector registers in a current bank as indicated by a default bank bit CBANK stored in a control register VCSR of vector processor 120. A second control bit VEC64 indicates whether register numbers by default identify a double-size vector register including a register from each bank. The syntax of the instructions distinguishes register numbers identifying vector registers from register numbers identifying scalar registers.

Each vector register can be partitioned into data elements of programmable size. Table 1 shows the data types supported for data elements within a 288-bit vector register.

TABLE 1

| Data Type | Data Size | Interpretation |
| --- | --- | --- |
| int8 | 8 bits (Byte) | 8-bit 2's complement between −128 and 127. |
| int9 | 9 bits (Byte9) | 9-bit 2's complement between −256 and 255. |
| int16 | 16 bits (Halfword) | 16-bit 2's complement between −32,768 and 32,767. |
| int32 | 32 bits (Word) | 32-bit 2's complement between −2147483648 and 2147483647 |
| float | 32 bits (Word) | 32-bit IEEE 754 single-precision format. |

Appendix D provides further descriptions of the data sizes and types supported in the exemplary embodiment of the invention.

For int9 data type, 9-bit bytes are packed consecutively in a 288-bit vector register, but for the other data types every ninth bit in a 288-bit vector register is unused. A 288-bit vector register can hold 32 8-bit or 9-bit integer data elements, sixteen 16-bit integer data elements, or eight 32-bit integer or floating point elements. Additionally, two vector registers may be combined to pack data elements in a double-size vector. In the exemplary embodiment of the invention, setting a control bit VEC64 in a control and status register VCSR places vector processor 120 in a mode VEC64 where double-size (576 bits) is the default size of vector registers.

Multimedia processor 100 also contains a set of 32-bit extended registers 115 which are accessible to both processors 110 and 120. Appendix B describes the set of extended registers and their function in the exemplary embodiment of the invention. The extended registers and the scalar and special-purpose registers of vector processor 120 are accessible to processor 110 in some circumstances. Two special "user" extended registers have two read ports to allow processors 110 and 120 to simultaneously read the registers. Other extended registers can not be simultaneously accessed.

Vector processor 120 has two alternative states VP_RUN and VP_IDLE which indicate whether vector processor 120 is running or idle. Processor 110 can read or write scalar or special-purpose registers of vector processor 120 when vector processor 120 is in state VP_IDLE, but the results of processor 110 reading or writing a register of vector processor 120 while vector processor 120 is in state VP_RUN are undefined.

The extension of the ARM7 instruction set for processor 110 includes instructions which access the extended registers and the scalar or special-purpose registers of vector processor 120. Instructions MFER and MFEP move data respectively from an extended register and a scalar or special-purpose register in vector processor 120 to a general register in processor 110. Instructions MTER and MTEP respectively move data from a general register in processor 110 to an extended register and a scalar or special-purpose register in vector processor 120. A TESTSET instruction both reads an extended register and sets bit 30 of the extended register to 1. Instruction TESTSET facilitates user/producer synchronization by setting bit 30 to signal to processor 120 that processor 110 has read (or used) a result produced. Other instructions for processor 110 such as STARTVP and INTVP control the operating state of vector processor 120.

Processor 110 acts as a master processor to control operation of vector processor 120. Using asymmetric division of control between processors 110 and 120 simplifies the problem of synchronizing processors 110 and 120. Processor 110 initializes vector processor 120 by writing an instruction address to a program counter for vector processor 120 while vector processor 120 is in state VP_IDLE. Processor 110 then executes a STRATVP instruction which changes vector processor 120 to state VP_RUN. In state VP_RUN, vector processor 120 fetches instructions through a cache subsystem 130 and executes those instructions in parallel with processor 110 continuing to execute its own program. After being started, vector processor 120 continues execution until encountering an exception, executing a VCJOIN or VCINT instruction with an appropriate condition satisfied, or being interrupted by processor 110. Vector processor 120 can pass results of program execution to processor 110 by writing the results to an extended register, writing the results to the shared address space of processors 110 and 120, or leaving the result in a scalar or special purpose register which processor 110 accesses when vector processor 120 re-enters state VP_IDLE.

Vector processor 120 does not handle its own exceptions. Upon executing an instruction that causes an exception, vector processor 120 enters state VP_IDLE and signals an interrupt request through a direct line to processor 110. Vector processor 120 remains in state VP_IDLE until processor 110 executes another STARTVP instruction. Processor 110 is responsible for reading a register VISRC of vector processor 120 to determine the nature of the exception, handling the exception possibly by reinitializing vector processor 120, and then directing vector processor 120 to resume execution if desired.

An INTVP instruction executed by processor 110 interrupts vector processor 120 causing the vector processor 120 to enter idle state VP_IDLE. Instruction INTVP may, for example, be used in a multitasking system to switch vector processor 120 from one task such as video decoding to another tasks such as sound card emulation.

Vector processor instructions VCINT and VCJOIN are flow control instructions which if a condition indicated by the instruction is satisfied, halt execution by vector processor 120, place vector processor 120 in state VP_IDLE, and issue an interrupt request to processor 110 unless such requests are masked. The program counter (special-purpose register VPC) of vector processor 120 indicates the instruction address after the VCINT or VCJOIN instruction. Processor 110 can check an interrupt source register VISRC of vector processor 120 to determine whether a VCINT or VCJOIN instruction caused the interrupt request. Since vector processor 120 has large data busses and is more efficient at saving and restoring its registers, software executed by vector processor 120 should save and restore registers during context switching. The above-incorporated patent application entitled "Efficient Context Saving and Restoring in Multi-Tasking Computing System Environment" describes an exemplary system for context switching.

Figure 2:
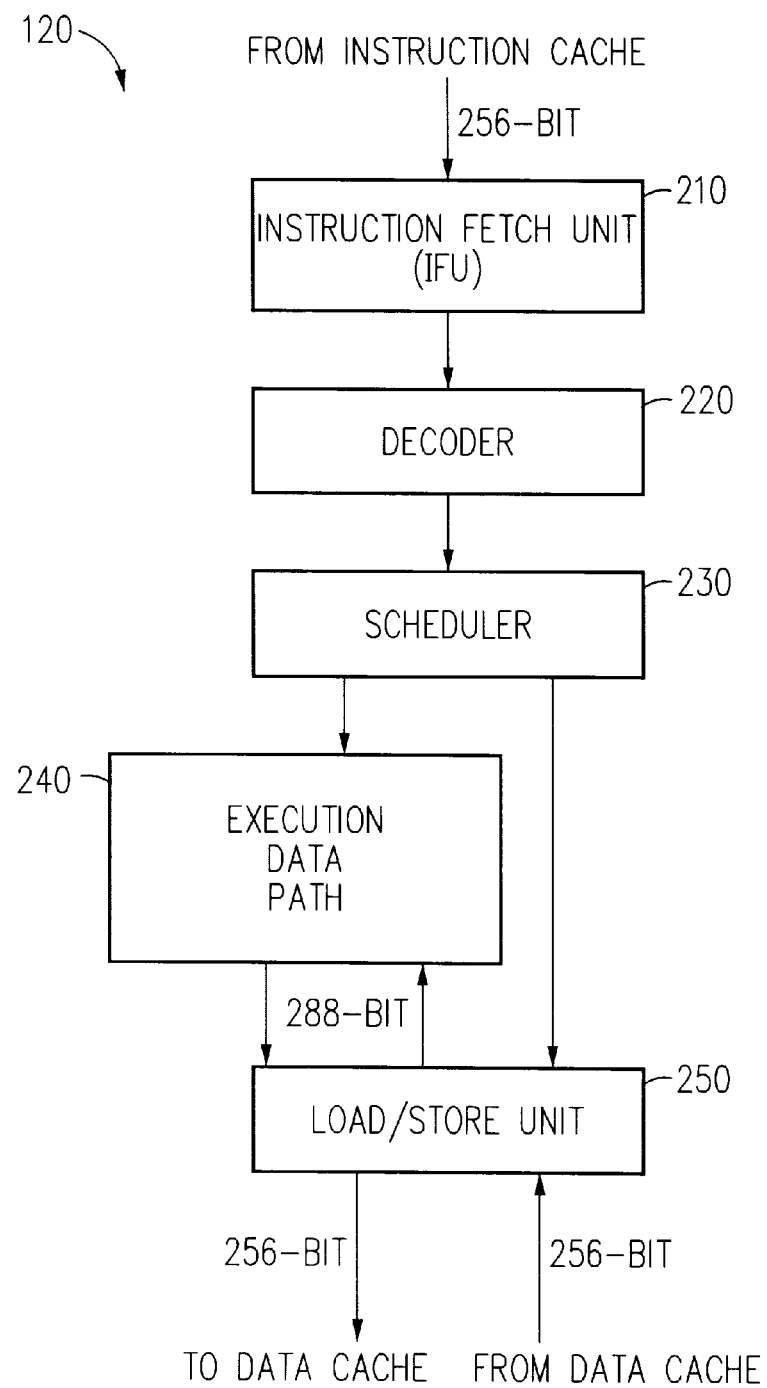
FIG. 2 is a block diagram of a vector processor for the multimedia processor of FIG. 1.

FIG. 2 shows the primary functional blocks of the exemplary embodiment of vector processor 120. Vector processor 120 includes an instruction fetch unit (IFU) 210, a decoder 220, a scheduler 230, an execution data path 240, and a load/store unit (LSU) 250. IFU 210 fetches instructions and processes flow control instructions such as branches. Instruction decoder 220 decodes one instruction per cycle in the order of arrival from IFU 210 and writes field values decoded from the instruction to a FIFO in scheduler 230. Scheduler 230 selects the field values which are issued to execution control registers as required for the execution stages of operations. Issue selection depends on operand dependency and the availability of processing resources such as execution data path 240 or load/store unit 250. Execution data path 240 executes logic/arithmetic instructions which manipulate vector or scalar data. Load/store unit 250 executes load/store instructions which access the address space of vector processor 120.

Figure 3:
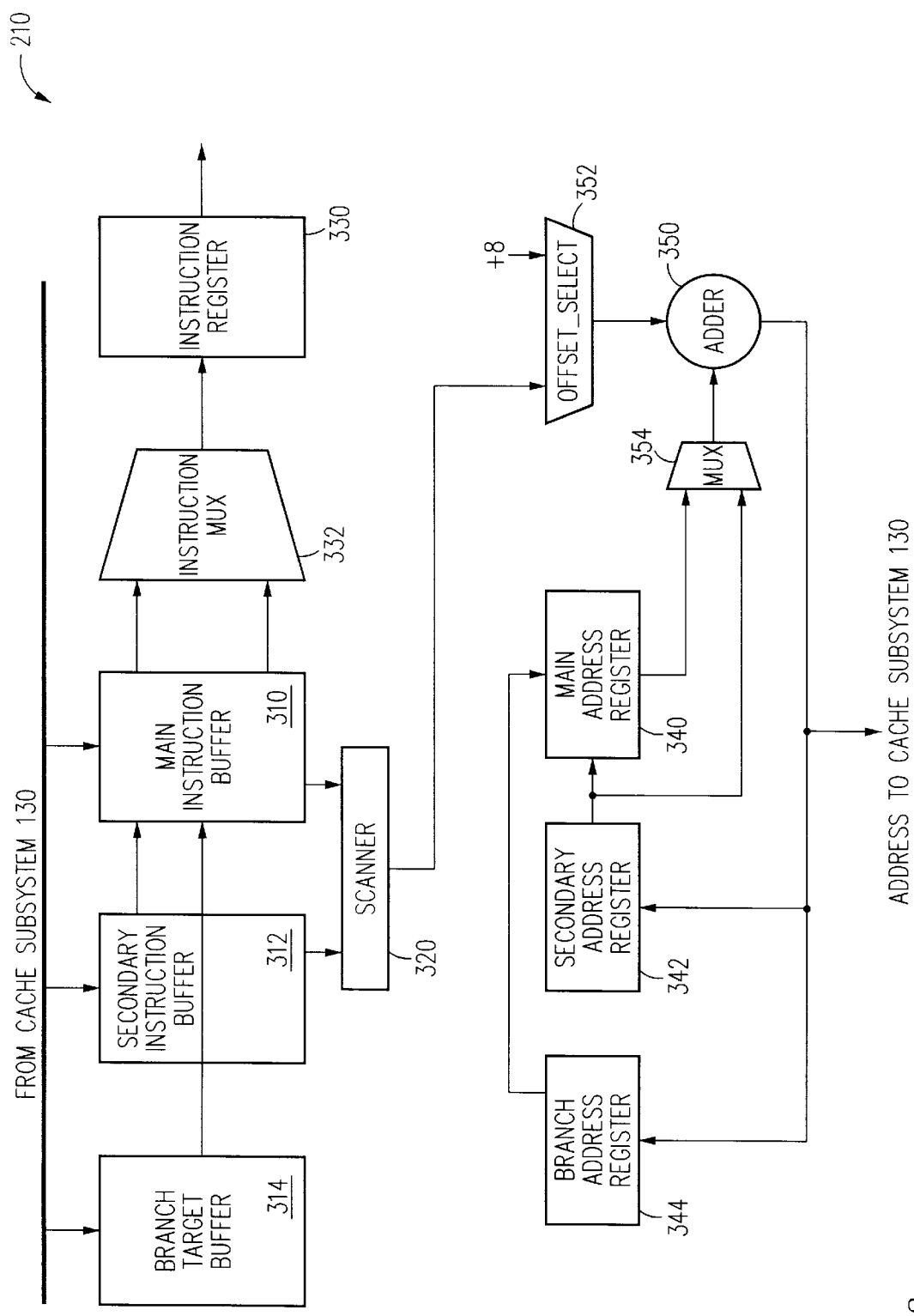
FIG. 3 is block diagram of an instruction fetch unit for the vector processor of FIG. 2.

FIG. 3 shows a block diagram of an embodiment of IFU 210 which contains an instruction buffer that is divided into a main instruction buffer 310 and a secondary instruction buffer 312. Main buffer 310 contains eight consecutive instructions including the instruction corresponding to the current program count. Secondary buffer 312 contains the eight instructions that immediately follow the instructions in buffer 310. IFU 210 also includes a branch target buffer 314 containing eight consecutive instructions including the target of the next flow control instruction in buffer 310 or 312. In the exemplary embodiment, vector processor 120 uses a RISC-type instruction set where each instruction is 32 bits long, and buffers 310, 312, and 314 are 8×32 bit buffers and connected to cache subsystem 130 through a 256-bit instruction bus. IFU 210 can load eight instructions from cache subsystem 130 into any of buffers 310, 312, or 314 in a single clock cycle. Registers 340, 342, and 344 respectively indicate base addresses for the instructions loaded in buffers 310, 312, and 314.

A multiplexer 332 selects the current instruction from main instruction buffer 310. If the current instruction is not a flow control instruction and an instruction stored in instruction register 330 is advancing to a decode stage of execution, the current instruction is stored into an instruction register 330, and the program count in incremented. After incrementing the program count selects the last instruction in buffer 310, the next set of eight instructions are loaded into buffer 310. If the buffer 312 contains the desired eight instructions, the contents of buffer 312 and register 342 are immediately moved to buffer 310 and register 340, and eight more instructions are prefetched from cache system 130 into secondary buffer 312. An adder 350 determines the address of the next set of instructions from the base address in register 342 and an offset selected by a multiplexer 352. The resulting address from adder 350 is stored in register 342 as or after the address from register 342 moves to register 340. The calculated address is also sent to cache subsystem 130 with the request for eight instructions. If a previous call to cache control system 130 has not yet provided the next eight instructions to buffer 312 when required by buffer 310, the instructions previously requested are immediately stored in buffer 310 when received from cache subsystem 130.

If the current instruction is a flow control instruction, IFU 210 handles the instruction by evaluating a condition for the flow control instruction and updating the program count following the flow control instruction. IFU 210 is held up if the condition is undetermined because a previous instruction which may change the condition has not completed. If a branch is not taken, the program counter is incremented, and next instruction is selected as described above. If a branch is taken and branch target buffer 314 contains the target of the branch, the contents of buffer 314 and register 344 are moved to buffer 310 and register 340 so that IFU 210 can continue providing instructions to decoder 220 without waiting for instructions from cache subsystem 130.

To prefetch instructions for branch target buffer 314, a scanner 320 scans buffers 310 and 312 to locate the next flow control instruction following the current program count. If a flow control instruction is found in buffer 310 or 312, scanner 320 determines the offset from the base address of the buffer 310 or 312 containing the instruction, to an aligned set of eight instructions including the target address of the flow control instruction. Multiplexers 352 and 354 provide the offset from the flow control instruction and the base address from register 340 or 342 to adder 350 which generates a new base address for buffer 314. The new base address is passed to cache subsystem 130 which subsequently provides the eight instructions for branch target buffer 314.

In handling flow control instructions such as "decrement and conditional branch" instructions VD1CBR, VD2CBR, and VD3CBR and "change control register" instruction VCHGCR, IFU 210 can change register values in addition to the program count. When IFU 210 finds an instruction that is not a flow control instruction, that instruction passes to instruction register 330 and from there to decoder 220.

Figure 4:
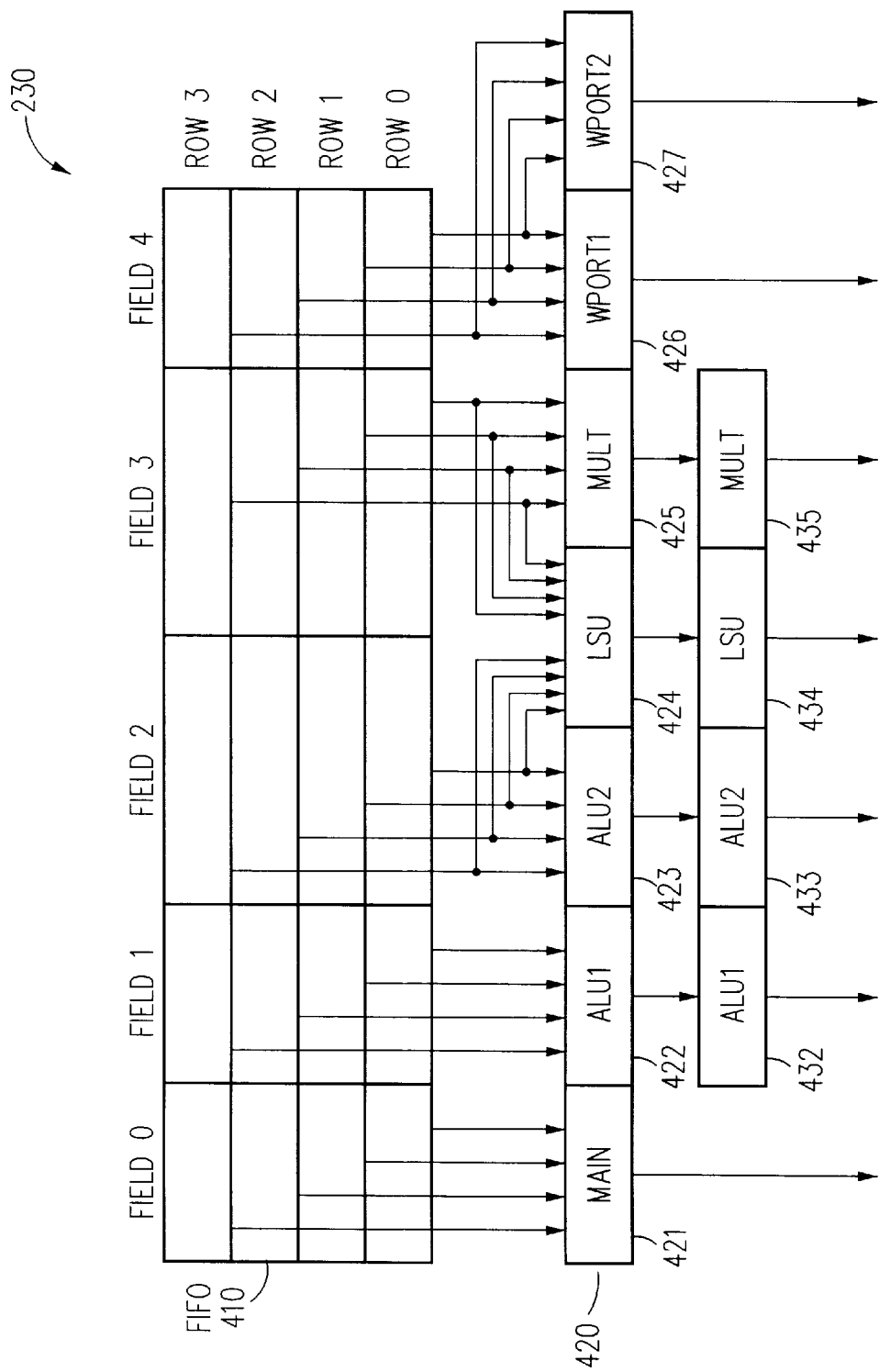
FIG. 4 is block diagram of a scheduler for the vector processor of FIG. 2.

Decoder 220 decodes an instruction by writing control values to the fields of a FIFO buffer 410 in scheduler 230 as shown in FIG. 4. FIFO buffer 410 contains four rows of flip-flops, each of which can contain five fields of information for controlling the execution of one instruction. Row 0 to 3 hold the information respectively for the oldest to newest instructions, and information in FIFO buffer 410 shifts down to lower rows when older information is removed as instructions complete. Scheduler 230 issues an instruction to an execution stage by selecting the necessary fields of the instruction to be loaded into a control pipe 420 including execution registers 421 to 427. Most instructions can be scheduled for out-of-order issue and execution. In particular, the order of logic/arithmetic operations relative and load/store operations is arbitrary unless there are oper- and dependencies between the load/store operations and the logic/arithmetic operations. Comparisons of the field values in FIFO buffer 410 indicate whether any operand dependencies exist.

Figure 5A:
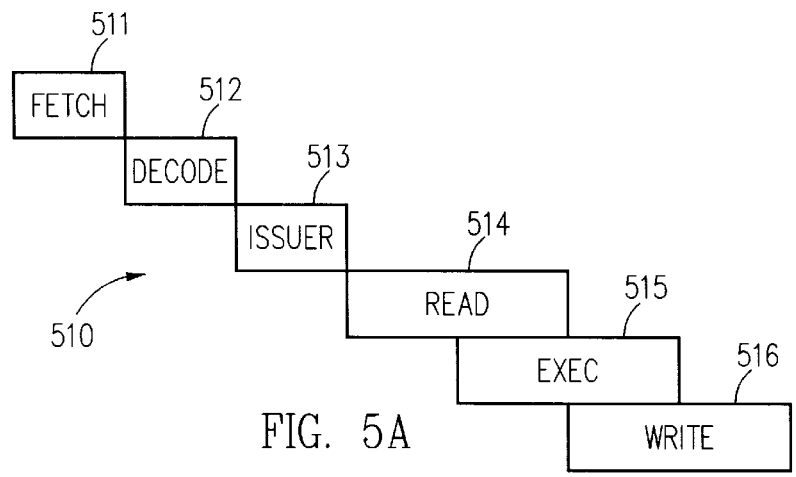
FIGS. 5A, 5B, and 5C show the stages of execution pipelines for a register-to-register instruction, a load instruction, and a store instruction for the vector processor of FIG. 2.

FIG. 5A illustrates a six stage execution pipeline for an instruction which performs a register-to-register operation without accessing the address space of vector processor 120. In an instruction fetch stage 511, IFU 210 fetches an instruction as described above. Fetch stage requires one clock cycle unless IFU 210 is held up by a pipeline delay, an unresolved branch condition, or a delay in cache subsystem 130 providing prefetched instructions. In decode stage 512, decoder 220 decodes the instruction from IFU 210 and writes information for the instruction to scheduler 230. Decode stage 512 also requires one clock cycle unless no rows in FIFO 410 are available for a new operation. The operation can be issued to control pipe 420 during the first cycle in FIFO 410, but may be delayed by issue of older operations.

Figure 6A:
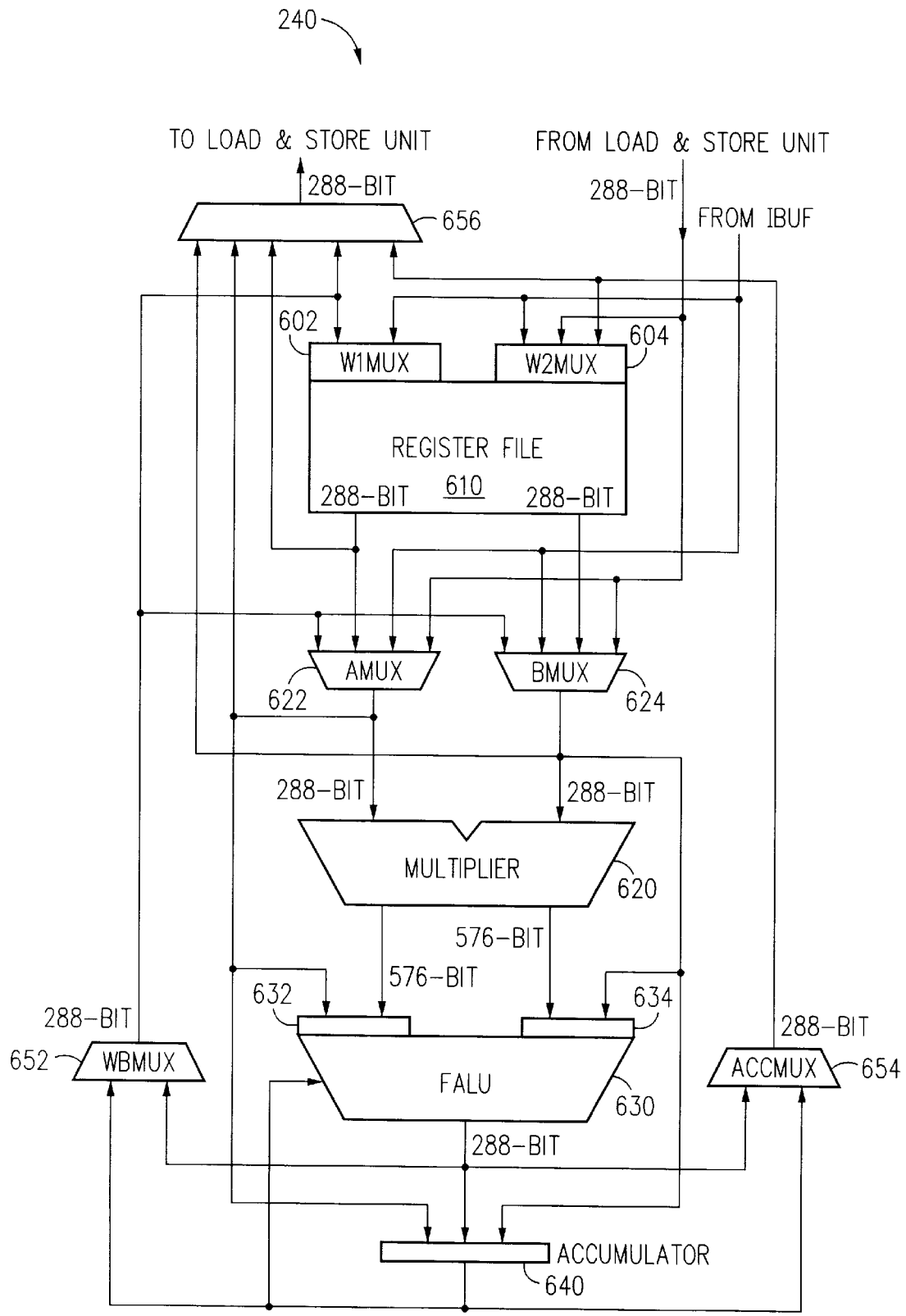
FIG. 6A is a block diagram for an execution data path for the vector processor of FIG. 2.
Figure 6B:
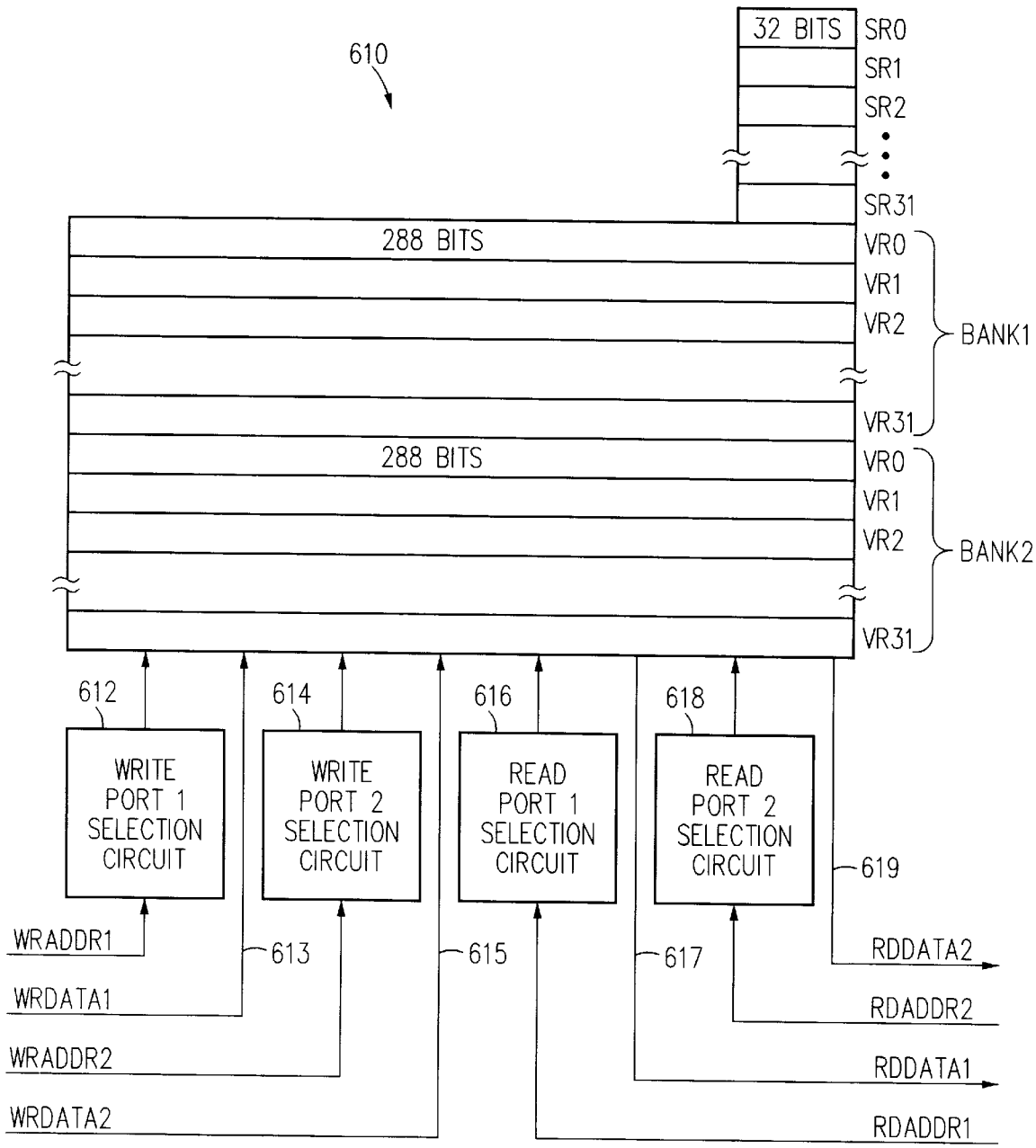
FIG. 6B is a block diagram of a register file for the execution data path of FIG. 6A.

Execution data path 240 performs register-to-register operations and provides data and addresses for load/store operations. FIG. 6A shows a block diagram of an embodiment of execution data path 240 and is described in conjunction with execution stages 514, 515, and 516. Execution register 421 provides signals identifying two registers in a register file 610 which are read in a clock cycle during read stage 514. Register file 610 includes 32 scalar registers and 64 vector registers. FIG. 6B is a block diagram of register file 610. Register file 610 has two read ports and two write ports to accommodate up to two reads and two writes each clock cycle. Each port includes a select circuit 612, 614, 616, or 618 and a 288-bit data bus 613, 615, 617, or 619. Selection circuits such as circuits 612, 614, 616, and 618 are well known in the art and use an address signal WRADDR1, WRADDR2, RDADDR1, or RDADDR2 which decoder 220 derives from a 5-bit register number which is typically extracted from an instruction, a bank bit from the instruction or control status register VCSR, and instruction syntax which indicates whether registers are vector registers or scalar registers. Data read can be routed through multiplexer 656 to load/store unit 250 or through multiplexers 622 and 624 through a multiplier 620, an arithmetic logic unit 620, or an accumulator 640. Most operation read two registers, and read stage 514 is completed in one cycle. However, some instructions such as multiply-and-add instruction VMAD and instructions that manipulate double-size vectors require data from more than two registers so that read stage 514 is longer than one clock cycle.

During execution stage 515, multiplier 620 arithmetic logic unit 630, and accumulator 640, process data previously read from register file 610. Execution stage 515 can overlap read stage 514 if multiple cycle are required to read the necessary data. The duration of execution stage 515 depends on the type data elements (integer or floating point) and amount (number of read cycles) of data processed. Signals from execution registers 422, 423, and 425 control input data to arithmetic logic unit 630, accumulator 640, and multiplier 620 for first operations performed during execution stage. Signals from execution registers 432, 433, and 435 control second operations performed during execution stage 515.

Figure 6C:
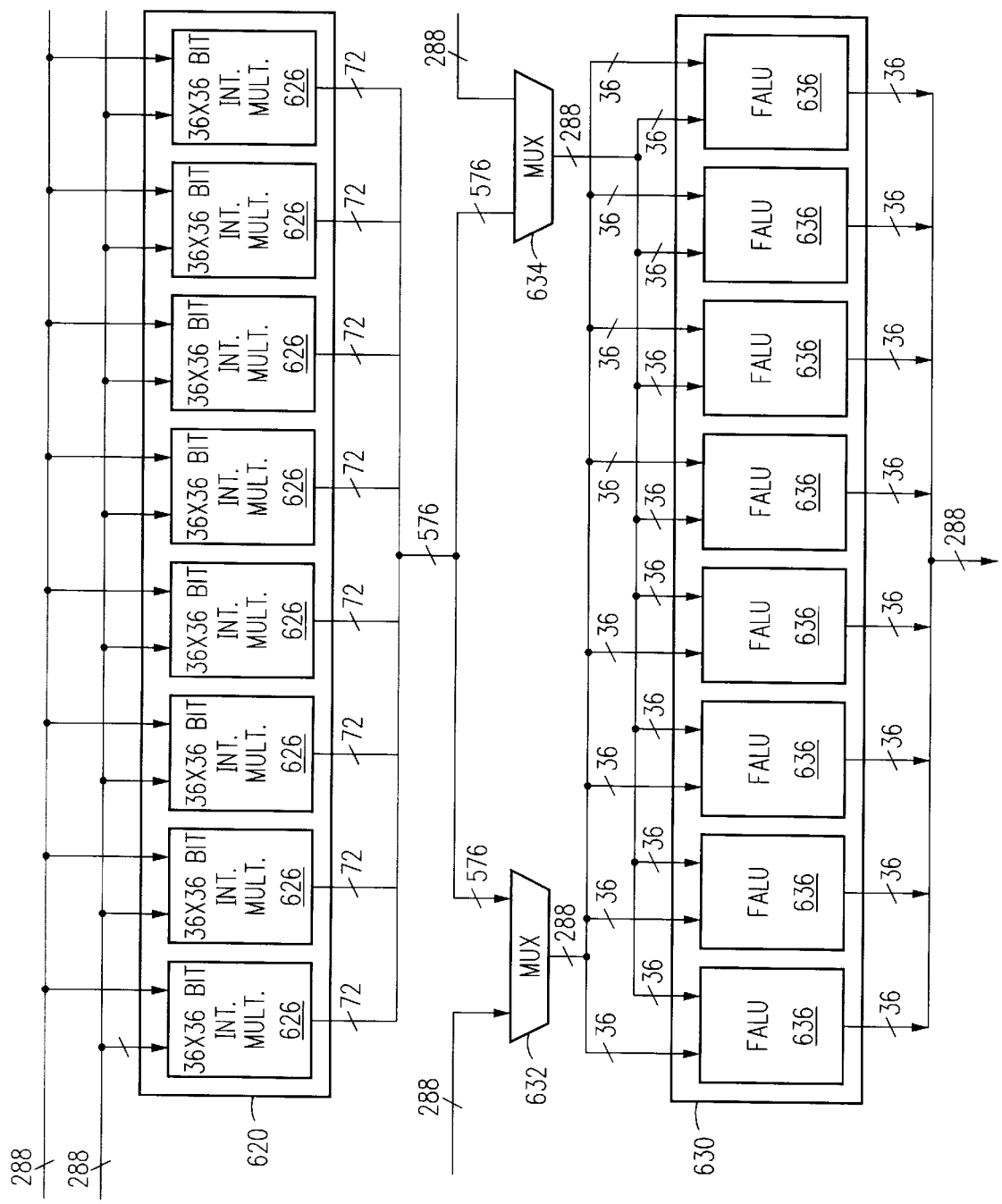
FIG. 6C is a block diagram for parallel processing logic units for the execution data path of FIG. 6A.

FIG. 6C shows a block diagram of an embodiment of multiplier 620 and ALU 630. Multiplier 620 is an integer multiplier which contains eight independent 36×36 bit multipliers 626. Each multiplier 626 contains four 9×9-bit multipliers which are connected together by control circuitry. For 8-bit and 9-bit data element size, control signals from scheduler 230 disconnect the four 9×9-bit multipliers from each other so that each multiplier 626 performs four multiplications, and multiplier 620 performs 32 independent multiplications during a cycle. For 16-bit data elements, control circuitry connects pairs of 9×9-bit multipliers to operate together, and multiplier 620 performs sixteen parallel multiplications. For the 32-bit integer data element type, eight multipliers 626 perform eight parallel multiplications per clock cycle. The results of a multiplication provides 576 bits result for 9-bit data element size and 512 bits for the other data sizes.

ALU 630 can process the resulting 576-bit or 512-bit result from multiplier 620 in two clock cycles. ALU 630 contains eight independent 36-bit ALUs 636. Each ALU 636 contains a 32×32 bit floating point unit for floating point adds and multiplies. Additional circuitry implements integer shift, arithmetic, and logic functions. For integer manipulations, each ALU 636 contains four units capable of independent 8-bit and 9-bit manipulations, and capable of being linked together in sets of two or four for 16-bit and 32-bit integer data elements.

Accumulator 640 accumulates results and includes two 576-bit registers for higher precision in intermediate results.

During write stage 516, results from the execution stage are stored in register file 610. Two registers can be written to during a single clock cycle, and input multiplexers 602 and 605 select two data values to be written. The duration of write stage 516 for an operation depends on the amount of data to be written as a result of the operation and competition from LSU 250 which may be completing a load instruction by writing to register file 610. Signals from execution registers 426 and 427 select the register to which data from logic unit 630, accumulator 640, and multiplier 620 is written.

Figure 5B:
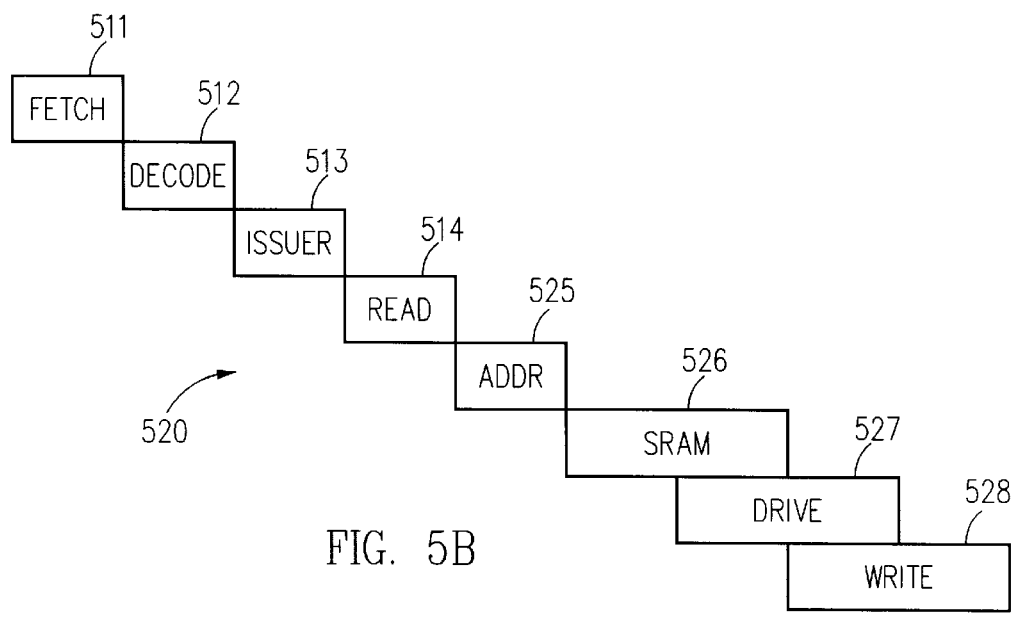

FIG. 5B shows an execution pipeline 520 for execution of a load instruction. The instruction fetch stage 511, decode stage 512, and issue stage 513 for execution pipeline 520 are the same as described for a register-to-register operation. The read stage 514 is also the same as described above except that the execution data path 240 uses data from register file 610 to determine an address for a call to cache subsystem 130. In address stage 525, multiplexers 652, 654, and 656 select the address which is provided to load/store unit 250 for execution stages 526 and 527. Information for the load operation remains in FIFO 410 during stages 526 and 527 while load/store unit 250 handles the operation.

Figure 7:
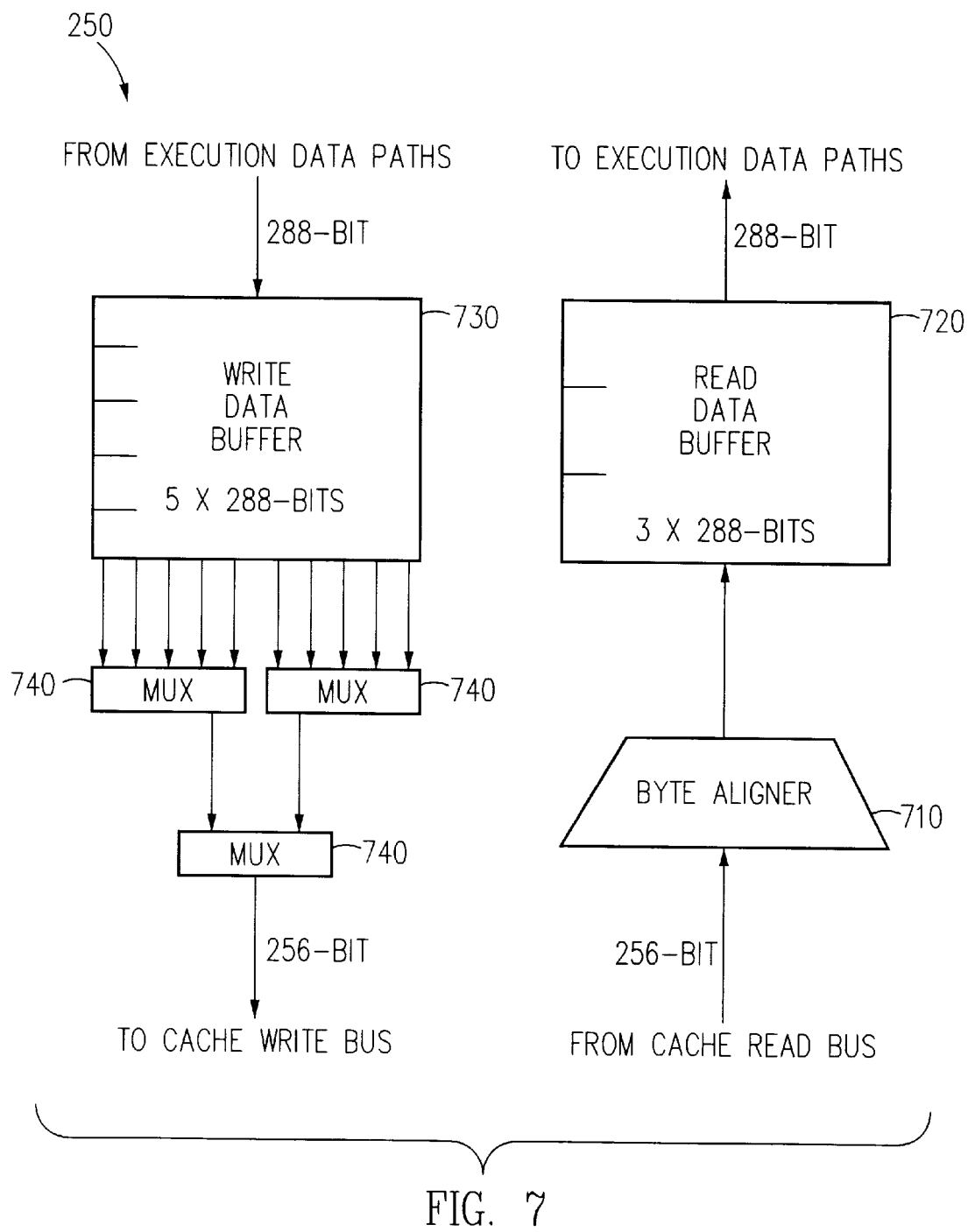
FIG. 7 is a block diagram for a load/store unit for the vector processor of FIG. 2.

FIG. 7 shows an embodiment of load/store unit 250. During stage 526, a call is made to cache subsystem 130 for data from the address determined in stage 525. The exemplary embodiment uses transaction based cache calls where multiple devices including processors 110 and 120 can access the local address space through cache subsystem 130. The requested data may not be available for several cycles after a call to cache subsystem 130, but load/store unit 250 can make calls to cache subsystem while other calls are pending. Accordingly, load/store unit 250 is not held up. The number of clock cycle required for cache subsystem 130 to provide the requested data depends on whether there is a hit or miss in data cache 194.

In drive stage 527, cache subsystem 130 asserts a data signal for load/store unit 250. Cache subsystem 130 can provide 256 bits (32 bytes) of data per cycle to load/store unit 250. A byte aligner 710 aligns each of the 32 bytes in a corresponding 9-bit storage location to provide a 288-bit value. The 288-bit format is convenient for multimedia applications such as MPEG encoding and decoding which sometimes use 9-bit data elements. The 288-bit value is written into a read data buffer 720. For write stage 528, scheduler 230 transfers field 4 from FIFO buffer 410 to execution register 426 or 427 to write the 288-bit quantity from data buffer 720 to register file 610.

Figure 5C:
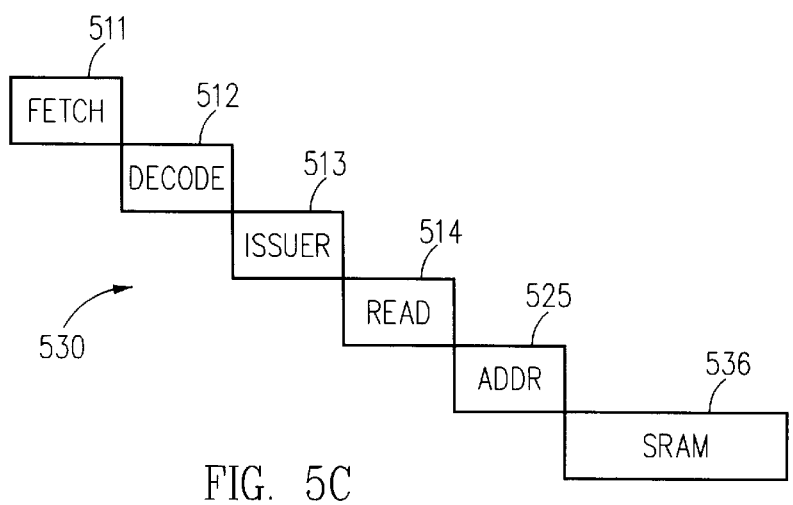

FIG. 5C shows an execution pipeline 530 for execution of a store instruction. The instruction fetch stage 511, decode stage 512, and issue stage 513 for execution pipeline 530 are the same as described above. The read stage 514 is also the same as described above except that the read stage reads data to be stored and data for address calculations. Data to be stored is written to write data buffer 730 in load/store unit 250. Multiplexers 740 convert the data which is in a format providing for 9-bit bytes into a conventional format having 8-bit bytes. The converted data from buffer 730 and the associated address from address calculation stage 525 are sent in parallel to cache subsystem 130 during SRAM stage 536.

Figure 8:
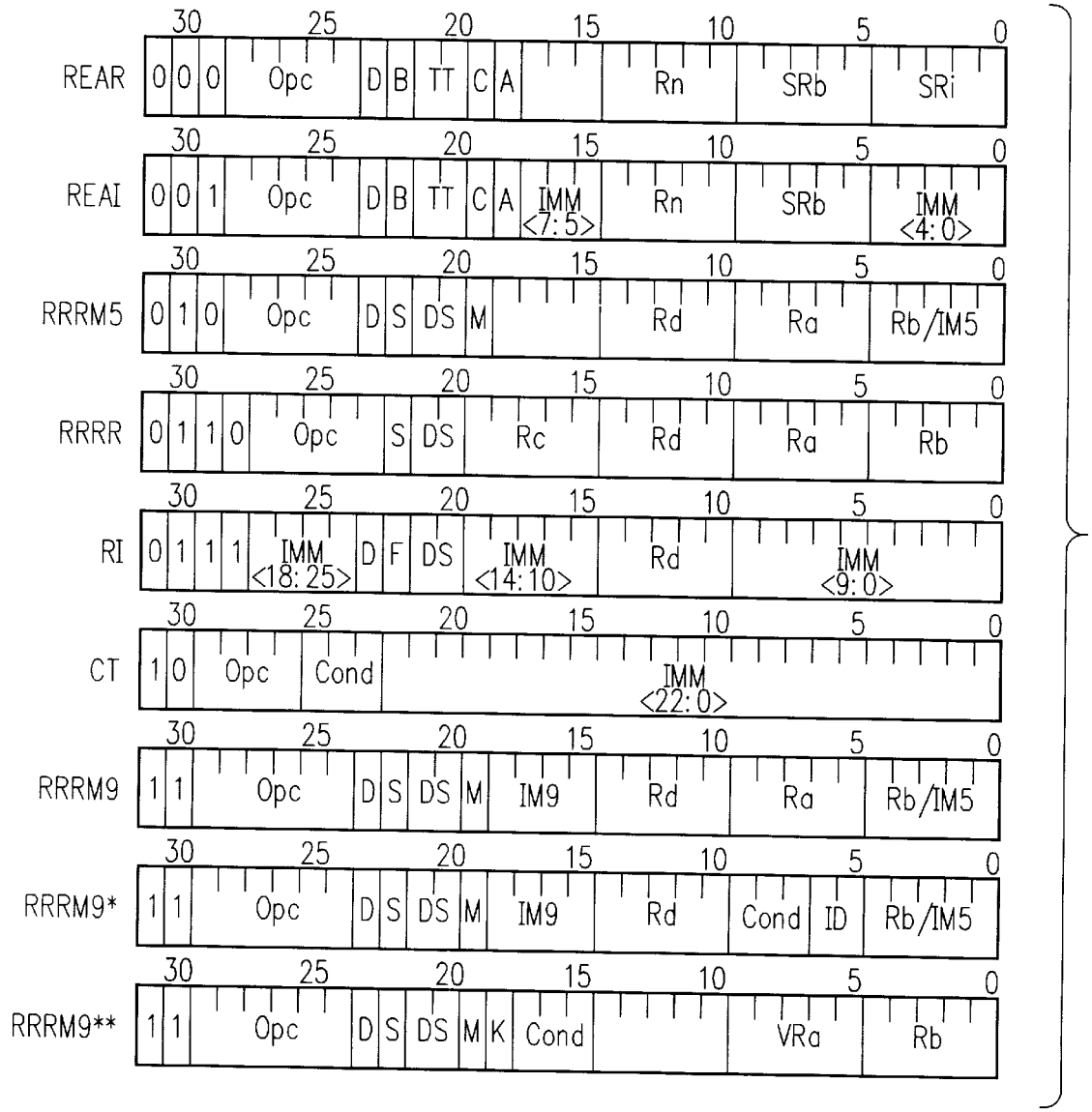
FIG. 8 illustrates formats for an instruction set of a vector processor in accordance with an embodiment of the invention.

In the exemplary embodiment of vector processor 120, each instruction is 32 bits long and has one of the nine formats shown in FIG. 8 and labeled REAR, REAI, RRRM5, RRRR, RI, CT, RRRM9, RRRM9*, and RRRM9**. Appendix E describes the instruction set for vector processor 120.

Some load, store, and cache operations which use scalar registers when determining an effective address have the REAR format. REAR-format instructions are identified by bits 29–31 being 000b and have three operands identified by two register numbers SRb and SRi for scalar registers and a register number Rn of a register which may be a scalar or vector register depending on a bit D. A bank bit B either identifies a bank for register Rn or indicates whether vector register Rn is a double-size vector register if the default vector register size is double-size. An op-code field Opc identifies the operation performed on the operands, and a field TT indicates a transfer type as load or store. A typical REAR-format instruction is instruction VL which loads register Rn from an address determined by adding the contents of scalar registers SRb and SRi. If a bit A is set the calculated address is stored in scalar register SRb.

REAI-format instructions are the same as REAR instructions except that an 8-bit immediate value from field IMM is used in place of the contents of scalar register SRi. REAR and REAI formats do not have a data element size field.

The RRRM5 format is for instructions having two source operands and one destination operand. These instructions have either three register operands or two register operands and a 5-bit immediate value. An encoding of fields D, S, and M as shown in Appendix E determines whether the first source operand Ra is a scalar or vector register; whether the second source operand Rb/IM5 is a scalar register, a vector register, or a 5-bit immediate value; and whether the destination register Rd is a scalar or vector register.

The RRRR format is for instructions having four register operands. Register numbers Ra and Rb indicated source registers. Register number Rd indicates a destination register, and register number Rc indicates either a source or a destination register depending on field Opc. All of the operands are vector registers unless bit S is set to indicate register Rb is a scalar register. Field DS indicates the data element size for the vector registers. Field Opc selects the data type for 32-bit data elements.

An RI-format instruction loads an immediate value into a register. Field IMM contains an immediate value of up to 18 bits. Register number Rd indicates the destination register which is either a vector register in the current bank or a scalar register depending on bit D. Fields DS and F respectively indicate a data element size and type. For 32-bit integer data elements, the 18-bit immediate value is sign extended before being loaded into register Rd. For floating point data elements, bit 18, bits 17 to 10, and bits 9 to 0 respectively indicate the sign, exponent, and mantissa of a 32-bit floating point value.

The CT format is for flow control instructions and includes an op-code field Opc, a condition field Cond, and a 23-bit immediate value IMM. A branch is taken when a condition indicated by the condition field is true. Possible condition codes are "always", "less than", "equal", "less than or equal", "greater than", "not equal", "greater than or equal", and "overflow". Bits GT, EQ, LT, and SO in status and control register VCSR are used to evaluate the conditions.

Format RRRM9 provides for either three register operands or two register operands and a 9-bit immediate value. A combination of bits D, S, and M indicate which of operands are vector registers, scalar registers, or 9-bit immediate values. Field DS indicates a data element size. The RRRM9* and RRRM9** formats are special cases of the RRRM9 format and distinguished by opcode field Opc. The RRRM9* format replaces a source register number Ra with a condition code Cond and an ID field. The RRRM9** format replaces most significant bits of the immediate value with a condition code Cond and a bit K. Further description of RRRM9* and RRRM9** is given in Appendix E in regard to conditional move instruction VCMOV, conditional move with element mask CMOVM, and compare and set mask CMPV instructions.

Although the invention has been described with reference to particular embodiments, the description is only an example of the invention's application and should not be taken as a limitation. Various adaptations and combinations of features of the embodiments disclosed are within the scope of the invention as defined by the following claims.

APPENDIX A

In the exemplary embodiment, processor 110 is a general-purpose processor which complies with the standard for an ARM7 processor. Refer to an ARM architecture document or the ARM7 Data Sheet (document number ARM DDI 0020C, issued December 1994) for the description of registers within the ARM7.

To interact with vector processor 120 processor 110: starts and stops vector processor; tests the vector processor state, including for synchronization; transfers data from a scalar/special-purpose register in vector processor 120 to a general register in processor 110; and transfers data from a general register to a vector processor scalar/special-purpose register. There is no direct means of transfer between a general register and a vector processor vector register. Such transfers require memory as an intermediary.

Table A.1 describes the extension to the ARM7 instruction set for vector processor interactions.

TABLE A.1

ARM7 Instruction Set Extension

| Instruction | Result |
|---|---|
| STARTVP | This instruction causes the vector processor to enter the VP_RUN state but has no affect if the vector processor is already in the VP_RUN state. STARTVP is implemented as the processor-data operation (CDP) class in the ARM7 architecture. No result is communicated back to ARM7, and the ARM7 continues its execution |
| INTVP | This instruction causes the vector processor to enter the VP_IDLE state but has no affect if the vector processor is already in the VP_IDLE state. INTVP is implemented as the processor data operation (CDP) class in the ARM7 architecture. No result is communicated back to ARM7, and the ARM7 continues its execution. |
| TESTSET | This instruction reads a user extended register and sets bit 30 of the register to 1 to provide producer/consumer type of synchronization between vector and ARM7 processors. TESTSET is implemented as the processor register transfer (MRC) class in the ARM7 architecture. The ARM7 is stalled until the instruction is executed (the register is transferred) |
| MFER | Moves from an extended register to an ARM general register. MFER is implemented as the processor register transfer (MRC) class in the ARM7 architecture. The ARM7 is stalled until the instruction is executed (the register is transferred) |

TABLE A.1-continued

ARM7 Instruction Set Extension

| Instruction | Result |
|---|---|
| MFVP | Moves from a vector processor scalar/special-purpose register to an ARM7 general register. Unlike the other ARM7 instructions; this instruction should be executed only when the vector processor is in the VP_IDLE state. The result is otherwise undefined. MFVP is implemented as the processor register transfer (MRC) class in the ARM7 architecture. The ARM7 is stalled until the instruction is executed (the register is transferred) |
| MTER | Moves to an extended register from an ARM7 general register. MTER is implemented as the coprocessor register transfer (MCR) class in the ARM7 architecture. The ARM7 is stalled until the instruction is executed (the register is transferred). |
| MTVP | Moves to a vector processor scalar/special-purpose register from an ARM7 general register. Unlike the other ARM7 instructions, this instruction should be expected only when the vector processor is in the VP_IDLE state. The result is otherwise undefined. MTVP is implemented as the coprocessor register transfer (MCR) class in the ARM7 architecture. The ARM7 is stalled until the instruction is executed (the register is transferred) |
| CACHE | Provides software management of the ARM7 data cache. |
| PFTCH | Prefetches one cache line into the ARM7 data cache. |
| WBACK | Writes back one cache line from the ARM7 data cache into memory. |

The Table A.2 lists ARM7 exceptions, which are detected and reported prior to executing the faulting instruction. The exception vector address is given in hexadecimal notation.

TABLE A.2

ARM7 Exceptions

| Exception Vector | Description |
|---|---|
| 0x00000000 | ARM7 Reset |
| 0x00000004 | ARM7 Undefined Instruction Exception |
| 0x00000004 | Vector Processor Unavailable Exception |
| 0x00000008 | ARM7 Software Interrupt |
| 0x0000000C | ARM7 Single Step Exception |
| 0x0000000C | ARM7 Instruction Address Breakpoint Exception |
| 0x00000010 | ARM7 Data Address Breakpoint Exception |
| 0x00000010 | ARM7 Invalid Data Address Exception |
| 0x00000018 | ARM7 Protection Violation Exception |

The follow describe the syntax of the extension to the ARM7 instruction set. Refer to an ARM architecture document or the ARM7 Data Sheet (document number ARM DDI 0020C, issued December 1994) for a nomenclature description and the instruction formats.

The ARM architecture provides three instruction formats for coprocessor interface:

1. coprocessor data operations (CDP)

2. coprocessor data transfers (LDC, STC)

3. coprocessor register transfers (MRC, MCR)

The MSP architectural extensions use all three forms.

The coprocessor data operations format (CDP) is used for the operations that need not communicate back to ARM7.

CDP format

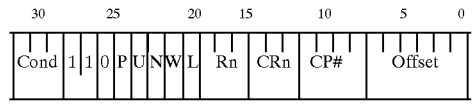

The fields in the CDP format have the following conventions:

| Field | Meaning |
|---|---|
| Cond | Condition field. This field specifies the condition in which the instruction is to execute. |
| Opc | Coprocessor operation code. |
| CRn | Coprocessor operand register |
| CRd | Coprocessor destination register |
| Cp# | Coprocessor number. The following coprocessor numbers are currently used:<br>1111 - ARM7 data cache<br>0111 - vector processor, extended registers |
| CP | Coprocessor information. |
| CPm | Coprocessor operand register. |

The coprocessor data transfer format (LDC, STC) is used to load or store a subset of the vector processor's registers directly to memory. The ARM7 processor is responsible for supplying the word address, and the vector processor supplies or accepts the data and controls the number of words transferred. Refer to the ARM7 Data Sheet for more detail.

LDC, STC format

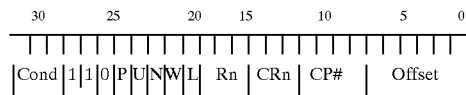

The fields in the format have the following conventions:

| Field | Meaning |
|---|---|
| Cond | Condition field. This field specifies the condition in which the instruction is to execute. |
| P | Pre/Post indexing bit. |
| U | Up/Down bit. |
| N | Transfer length. Due to not having enough bits in the CRd field, the N bit is used as a part of source or destination register identifier. |
| W | Write-back bit. |
| L | Load/store bit. |
| Rn | Base register. |
| CRn | Coprocessor source/destination register. |
| CP# | Coprocessor number. The following coprocessor numbers are currently used:<br>1111-ARM 7 data cache<br>0111-vector processor, extended registers |
| Offset | Unsigned 8 bit immediate offset. |

The coprocessor register transfer format (MRC, MCR) is used communicate information directly between ARM7 and the vector processor. This format is used to move between an ARM7 register and a vector processor scalar or special-purpose register.

MRC, MCR format

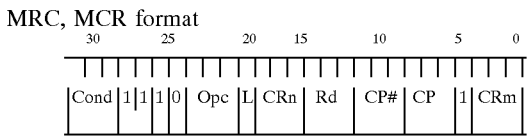

The fields in the format have the following conventions:

| Field | Meaning |
|---|---|
| Cond | Condition field. This field specifies the condition in which the instruction is to execute. |
| Opc | Coprocessor operation code. |
| L | Load/Store bit.<br>L=0 means move to vector processor<br>L=1 means move from vector processor |
| CRn:Crm | Coprocessor source/destination register. Only CRn<1:0>:CRm<3:0> are used. |
| Rd | ARM source/destination register |
| CP# | Coprocessor number. The following coprocessor numbers are currently used:<br>1111 - ARM 7 data cache<br>0111 - vector processor, extended registers |
| CP | Coprocessor information. |

EXTENDED ARM INSTRUCTION DESCRIPTION

The extended ARM instructions are described in alphabetical order.

CACHE Cache Operation

Format

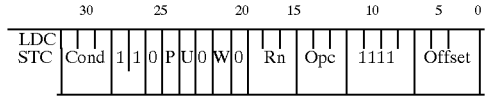

Assembler Syntax

STC{cond} p15,cOpc, <Address>
CACHE{cond} Opc, <Address> where cond={eq, he, Cs, cc, mi, pl, vs, vc, hi, Is, ge, It, gt, le, ai, nv} and Opc={0, 1, 3 }. Note that, since the CRn field of the LDC/STC format is used to specify the Opc, the decimal representation of the opcode must be preceded by the letter 'c' (i.e., use c0 instead of 0) in the first syntax. Refer to the ARM7 Data Sheet for the address mode syntax.

Description

This instruction is executed only if Cond is true. The Opc<3:0> specifies the following operations:

| Opc<3:0> | Meaning |
|---|---|
| 0000 | Writeback and invalidate the dirty cache line specified by the EA. If the matching line contains clean data, the line is invalidated without the writeback. If no cache line is found to contain the EA, the data cache remains intact. |
| 0001 | Writeback and invalidate the dirty cache line specified by the index of the EA. If the matching line contains clean data, the line is invalidated without the writeback. |
| 0010 | Used by PFTCH and WBACK instructions. |
| 0011 | Invalidate the cache line specifiedby the EA. The cache line is invalidated (without writeback) even if the line is dirty)<br>This is a privileged operation, and will cause ARM7 Protection Violation if attempted in the user mode. |
| others | reserved. |

Operation

Refer to the ARM7 Data Sheet on how the EA is calculated.

Exception

ARM7 Protection Violation.

INTVP Interrupt Vector Processor

Format

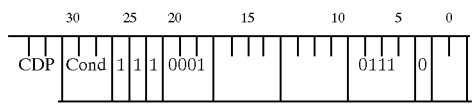

Assembler Syntax

CDP{cond} p7, 1, c0, c0, co
INTVP{cond} where cond={eq, ne, cs, cc, mi, pl, vs, vc, hi, ls, ge, lt, gt, le, al, ns}.

Description

This instruction is executed only is Cond is true. This instruction signals the vector processor to halt. ARM 7 continues to execute the next instruction without waiting for the vector processor to halt.

A MFER busy-wait loop should be used to see if the vector processor has halted after this instruction is executed. This instruction has no affect if the vector processor is already in the VP_IDLE state.

Bits 19:12, 7:15 and 3:0 are reserved.

Exception

Vector processor unavailable.

MFER Move From Extended Register

Format

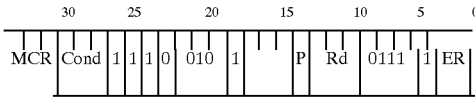

Assembler Syntax

MRC{cond} p7, 2, Rd, cP, cER, 0
MFER{cond} Rd, RNAME where cond={eq, he, cs, cc, mi, pl, rs, vc, hi, ls, ge, lt, gt, le, al, nv}, Rd={r0, . . . r15}, P={0, 1}, ER={0, . . . 15} and RNAME refers to the architecturally specified register mnemonic (i.e., PER0 or CSR).

Description

This instruction is executed only if Cond is true. The ARM7 register Rd is moved from the extended register ER specified with P:ER<3:0>, as shown in table below. Refer to Section 1.2 for extended register descriptions.

| ER<3:0> | P = 0 | P = 1 |
|---|---|---|
| 0000 | UER0 | PER0 |
| 0001 | UER1 | PER1 |
| 0010 | UER2 | PER2 |
| 0011 | UER3 | PER3 |
| 0100 | UER4 | PER4 |
| 0101 | UER5 | PER5 |
| 0110 | UER6 | PER6 |
| 0111 | UER7 | PER7 |
| 1000 | UER8 | PER8 |
| 1001 | UER9 | PER9 |
| 1010 | UER10 | PER10 |
| 1011 | UER11 | PER11 |
| 1100 | UER12 | PER12 |

-continued

| ER<3:0> | P = 0 | P = 1 |
|---|---|---|
| 1101 | UER13 | PER13 |
| 1110 | UER14 | PER14 |
| 1111 | UER15 | PER15 |

Bits 19:17 and 7:5 are reserved.

Exception

Protection violation when attempt to access PERx while in user mode.

MFVP Move from Vector Processor

Format

Assembler Syntax

MRC{cond} p7.1.Rd.Crn.CRm.0

MFVP{cond} Rd.RNAME where cond={eq, ne, cs, cc, mi, pl, vs, vc, hi, ls, ge, lt, gt, le, al, nv}, Rd={r0, . . . r15}, CRn=({c0, . . . c15}, CRm={c0, . . . c15} and RNAME refers to the architecturally specified register mnemonic (i.e., SP0 or VCS).

Description

This instruction is executed only if Cond is true. The ARM7 register Rd is moved from the vector processor's scalar/special-purpose register CRn<1:0>:CRm<3:0>. Refer to Section 3.2.3 for vector processor register number assignment for register transfers.

Bits 7.5 as well as CRn<3:2> are reserved.

The vector processor register map is shown below. Refer to Table 15 for the vector processor special-purpose registers (SP0–SP15).

| CRM <3:0> | CRn <1:0> = 00 | CRn <1:0> = 01 | CRn <1:0> = 10 | CRn <1:0> = 111 |
|---|---|---|---|---|
| 0000 | SR0 | SR16 | SP0 | RASR0 |
| 0001 | SR1 | SR17 | SP0 | RASR1 |
| 0010 | SR2 | SR18 | SP0 | RASR2 |
| 0011 | SR3 | SR19 | SP0 | RASR3 |
| 0100 | SR4 | SR20 | SP0 | RASR4 |
| 0101 | SR5 | SR21 | SP0 | RASR5 |
| 0110 | SR6 | SR22 | SP0 | RASR6 |
| 0111 | SR7 | SR23 | SP0 | RASR7 |
| 1000 | SR8 | SR24 | SP0 | RASR8 |
| 1001 | SR9 | SR25 | SP0 | RASR9 |
| 1010 | SR10 | SR26 | SP0 | RASR10 |
| 1011 | SR11 | SR27 | SP0 | RASR11 |
| 1100 | SR12 | SR28 | SP0 | RASR12 |
| 1101 | SR13 | SR29 | SP0 | RASR13 |
| 1110 | SR14 | SR30 | SP0 | RASR14 |
| 1111 | SR15 | SR31 | SP0 | RASR15 |

SR0 always reads as 32 bits of zeros and a write to it is ignored.

Exception

Vector processor unavailable.

MTER Move To Extended Register

Format

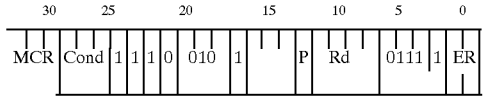

Assembler Syntax

MRC{cond} p7, 2, Rd, cP, cER, 0

MFER{cond} Rd, RNAME where cond={eq, he, cs, cc, mi, pl, rs, vc, hi, ls, ge, lt, gt, le, al, nv}, Rd={r0, . . . r15}, P={0, 1}, ER={0, . . . 15} and RNAME refers to the architecturally specified register mnemonic (i.e., PER0 or CSR).

Description

This instruction is executed only if Cond is true. The ARM7 register Rd is moved from the extended register ER specified with P:ER<3:0>, as shown in table below.

| ER<3:0> | P = 0 | P = 1 |
|---|---|---|
| 0000 | UER0 | PER0 |
| 0001 | UER1 | PER1 |
| 0010 | UER2 | PER2 |
| 0011 | UER3 | PER3 |
| 0100 | UER4 | PER4 |
| 0101 | UER5 | PER5 |
| 0110 | UER6 | PER6 |
| 0111 | UER7 | PER7 |
| 1000 | UER8 | PER8 |
| 1001 | UER9 | PER9 |
| 1010 | UER10 | PER10 |
| 1011 | UER11 | PER11 |
| 1100 | UER12 | PER12 |
| 1101 | UER13 | PER13 |
| 1110 | UER14 | PER14 |
| 1111 | UER15 | PER15 |

Bits 19:17 and 7:5 are reserved.

Exception

Protection violation when attempt to access PERx while in user mode.

MTVP Move To Vector Processor

Format

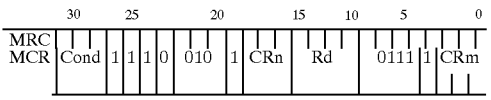

Assembler Syntax

MRC{cond} p7.1.Rd.Crn.CRm.0

MFVP{cond} Rd.RNAME where cond={eq, ne, cs, cc, mi, pl, vs, vc, hi, ls, ge, lt, gt, le, al, nv}, Rd={r0, . . . r15}, CRn=({c0, . . . c15}, CRm={c0, . . . c15} and RNAME refers to the architecturally specified register mnemonic (i.e., SP0 or VCS).

Description

This instruction is executed only if Cond is true. The ARM7 register Rd is moved from the vector processor's scalar/special-purpose register CRn<1:0>:CRm<3:0>.

Bits 7:5 as well as CRn<3:2> are reserved.

The vector processor register map is shown below.

| CRM<3:0> | CRn<1:0>= 00 | CRn<1:0>= 01 | CRn<1:0>= 10 | CRn<1:0>= 111 |
|---|---|---|---|---|
| 0000 | SR0 | SR16 | SP0 | RASR0 |
| 0001 | SR1 | SR17 | SP0 | RASR1 |
| 0010 | SR2 | SR18 | SP0 | RASR2 |
| 0011 | SR3 | SR19 | SP0 | RASR3 |
| 0100 | SR4 | SR20 | SP0 | RASR4 |
| 0101 | SR5 | SR21 | SP0 | RASR5 |
| 0110 | SR6 | SR22 | SP0 | RASR6 |
| 0111 | SR7 | SR23 | SP0 | RASR7 |
| 1000 | SR8 | SR24 | SP0 | RASR8 |
| 1001 | SR9 | SR25 | SP0 | RASR9 |
| 1010 | SR10 | SR26 | SP0 | RASR10 |
| 1011 | SR11 | SR27 | SP0 | RASR11 |
| 1100 | SR12 | SR28 | SP0 | RASR12 |
| 1101 | SR13 | SR29 | SP0 | RASR13 |
| 1110 | SR14 | SR30 | SP0 | RASR14 |
| 1111 | SR15 | SR31 | SP0 | RASR15 |

Exception
 Vector processor unavailable.
PFTCH Prefetch
Format

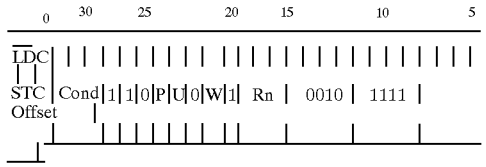

Assembler Syntax
 LDC{cond} p15, 2, <Address>
 PFTCH{cond} <Address>
 where cond={ eq, he, cs, cc, mi, pl, rs, vc, hi, Is, ge, lt, gt, le, al, nv}. Refer to the ARM7 Data Sheet for the address mode syntax.
Description
 This instruction is executed only if Cond is true. The cache line specified by the EA is prefetched into the ARM7 data cache.
Operation
 Refer to the ARM7 Data Sheet on how the EA is calculated.
Exception: None.
STARTVP Start Vector Processor
Format

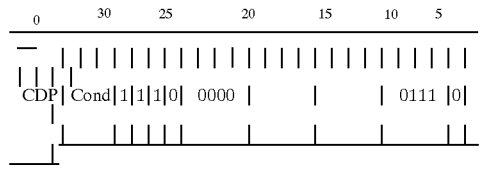

Assembler Syntax
 CDP{cond} p7, 0, cO, cO, cO
 STARTVP {cond}
 where cond={eq, he, as, cc, mi, pl, vs, vc, hi, Is, ge, it, gt, le, al, nv}.

Description
 This instruction is executed only if Cond is true. This instruction signals the vector processor to start execution and automatically clears VISRC<vjp> and VISRC<vip>. ARM7 continues to execute the next instruction without waiting for the vector processor to start execution.
 The vector processor's state must be initialized to the desired state before this instruction is executed. This instruction has no affect if the vector processor is already in the VP_RUN state.
 Bits 19:12, 7:5 and 3:0 are reserved.
Exception
 Vector processor unavailable.
TESTSET Test and Set
Format

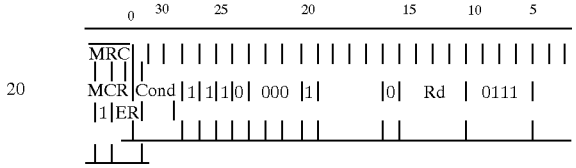

Assembler Syntax
 MRC{cond} p7, 0, Rd, cO, cER, 0
 TESTSET{cond} Rd, RNAME
 where cond={eq, he, cs, cc, mi, pl, rs, re, hi, ls, ge, It, gt, le, al, nv}, Rd={r0, . . . r15}, ER={0, . . . 15} and RNAME refers to the architecturally specified register mnemonic (i.e., UER1 or VASYNC).
Description
 This instruction is executed only if Cond is true. This instruction returns the contents of UERx to RD and sets UERx<30> to 1. If the ARM7 register 15 is specified as the destination register, the UERx<30> is returned at the Z bit of CPSR such that a short busywait loop can be implemented.
 Currently, only UER1 is defined to work with this instruction.
 Bits 19:17 and 7:5 are reserved.
Exception: None

APPENDIX B

The architecture of multimedia processor 100 defines extended registers that processor 110 accesses with the MFER and MTER instructions. The extended registers include privileged extended registers and user extended registers.

The privileged extended registers are used mostly for controlling the operation of the Multimedia Signal Processor. They are shown in Table B.1.

TABLE B.1

| Privileged extended registers | | |
|---|---|---|
| Number | Mnemonic | Description |
| PER0 | CTR | Control Register |
| PER1 | PVR | Processor Version Register |
| PER2 | VIMSK | Vector Interrupt Mask Register |
| PER3 | AIABR | ARM7 Instruction Address Breakpoint Register |
| PER4 | ADABR | ARM7 Data Address Breakpoint Register |
| PER5 | SPREG | Scratch Pad Register |
| PER6 | STR | Status Register |

The Control Register controls the operation of the MSP 100. All bits in CTR are cleared upon reset. The register definition is shown in Table B.2.

TABLE B.2

CTR definition

| Bit | Mnemonic | Description |
|---|---|---|
| 31–13 | | reserved - always read as 0s. |
| 12 | VDCI | Vector Data Cache Invalidate bit. When set, causes the entire vector processor data cache to become invalid. Since the cache invalidation operation usually conflicts with normal cache operations, only one invalidation code sequence is supported. |
| 11 | VDE | Vector Data Cache Enable bit. When clear disables the vector processor data cache. |
| 10 | VICI | Vector Instruction Cache Invalidate bit. When set, causes the entire vector processor instruction cache to become invalid. Since the cache invalidation operation usually conflicts with normal cache operations, only one invalidation code sequence is supported. |
| 9 | VICE | Vector Instruction Cache Enable bit. When clear disables the vector processor instruction cache. |
| 8 | ADCI | ARM7 Data Cache Invalidate bit. When set, causes the entire ARM7 data cache to become invalid. Since the cache invalidation operation usually conflicts with normal cache operations, only one invalidation code sequence is supported. |
| 7 | ADCE | ARM7 Data Cache Enable bit. When clear disables the ARM7 data cache. |
| 6 | AICI | ARM7 Instruction cache Invalidate bit. When set, causes the entire ARM7 instruction cache to become invalid. Since the cache invalidation operation usually conflicts with normal cache operations, only one invalidation code sequence is supported. |
| 5 | AICE | ARM7 Instruction Cache Enable bit. When clear, disables the ARM7 instruction cache. |
| 4 | APSE | ARM7 Processor Single Step Enable bit. When set, cause the ARM7 processor to take the ARM7 Processor Single Step Exception after executing one instruction. The single step function is available only in the User or Supervisor mode. |
| 3 | SPAE | Scratch Pad Access Enable bit. When set, permits an ARM7 process to load from or store to the scratch pad. When clear, a load or store attempt to the scratch pad causes ARM7 Invalid Data Address exception. |
| 2 | VPSE | Vector Processor Single Step Enable bit. When set, cause the vector processor to take the Vector Processor Single Step Exception after executing one instruction. |
| 1 | VPPE | Vector Processor Pipeline Enable bit. When clear, configures the vector processor to operate in a non-pipelined mode, in which only one instruction is active in the vector processor execution pipeline. |
| 0 | VPAE | Vector Processor Access Enable bit. When set, permits an ARM7 process to execute the extended ARM7 instructions, described above. When clear, prevents an ARM7 process from executing the extended ARM7 instructions. Such an attempt causes Vector Processor Unavailable exception. |

The Status Register indicates the status of MSP 100. All bits in field STR are cleared upon reset. The register definition is shown in Table B.3.

TABLE B.3

STR definition

| Bit | Mnemonic | Description |
|---|---|---|
| 31:23 | | reserved - always read as 0s |
| 22 | ADAB | ARM7 Data Address Breakpoint exception bit is set when an ARM7 data address breakpoint match occurs. This exception is reported through Data Abort interrupt. |
| 21 | AIDA | ARM7 Invalid Data Address exception occurs when an ARM7 load or store instruction tries to access an address that is not defined or implemented for a particular version of MSP or when it tries to access the scratch pad when not permitted. This exception is report through Data Abort interrupt. |
| 20 | AIAB | ARM7 Instruction Address Breakpoint exception bit is set when an ARM7 instruction address breakpoint match occurs. This exception is reported through Prefetch Abort interrupt. |
| 19 | AIIA | ARM7 Invalid Instruction Address exception. This exception is reported through Prefetch Abort interrupt. |
| 18 | ASTP | ARM7 Single Step exception. This exception is reported through Prefetch Abort interrupt. |
| 17 | APV | ARM7 Protection Violation. This exception is reported through IRQ interrupt. |
| 16 | VPUA | Vector Processor Unavailable exception. This exception is reported through Coprocessor Unavailable interrupt. |
| 15–0 | | reserved - always read as 0s. |

The Processor Version Register identifies the particular version of the particular processor of the Multimedia Signal Processor family of processors.

Vector Processor Interrupt Mask Register VIMSK controls reporting of vector processor exceptions to processor 110. Each bit in VIMSK, when set along with the corresponding bit in the VISRC register, enables the exception to interrupt the ARM7. It does not affect how the vector processor exception is detected but only affects whether the exception should interrupt the ARM7. All bits in VIMSK are clear upon reset. The register definition is shown in Table B.4.

TABLE B.4

VIMSK definition

| Bit | Mnemonic | Description |
|---|---|---|
| 31 | DABE | Data Address Breakpoint Interrupt Enable |
| 30 | IABE | Instruction Address Breakpoint Interrupt Enable |
| 29 | SSTPE | Single Step Interrupt Enable |
| 28–14 | | reserved - always read as 0s. |
| 13 | FOVE | Floating Point Overflow Interrupt Enable |
| 12 | FINVE | Floating Point Invalid Operand Interrupt Enable |
| 11 | FDIVE | Floating Point Divide by Zero Interrupt Enable |
| 10 | IOVE | Integer Overflow Interrupt Enable |
| 9 | IDIVE | Integer Divide by Zero Interrupt Enable |
| 8–7 | | reserved - always read as 0. |
| 6 | VIE | VCINT Interrupt Enable |
| 5 | VJE | VCJOIN Interrupt Enable |
| 4–1 | | reserved - always read as 0. |
| 0 | CSE | Context Switch Enable |

The ARM7 Instruction Address Breakpoint Register aids in debugging ARM7 programs. The register definition is shown in Table B.5.

TABLE B.5

AIABR definition

| Bit | Mnemonic | Description |
|---|---|---|
| 31–2 | IADR | ARM7 Instruction Address |
| 1 | | reserved - always reads as 0. |
| 0 | IABE | Instruction Address Breakpoint Enable. Clear upon reset. If set, causes the ARM7 Instruction Address Breakpoint exception to occur when an ARM7 instruction access address matches the AIABR<31:2> and VCSR<AIAB> is clear. The VCSR<AIAB> is set to indicate the exception. If VCSR<AIAB> is already set when the match occurs, the VCSR<AIAB> is cleared and a match is ignored. The exception is reported before the instruction is executed. |

The ARM7 Data Address Breakpoint Register aids in debugging ARM7 programs. The register definition is shown in Table B.6.

TABLE B.6

ADABR definition

| Bit | Mnemonic | Description |
|---|---|---|
| 31–2 | DADR | ARM Data Address. Undefined upon reset. |
| 1 | SABE | Store Address Breakpoint Enable. Clear upon reset. If set, causes the ARM7 Data Address Breakpoint exception to occur when the upper 30 bits of an ARM7 store access address matches the ADABR<31:2> and VCSR<ADAB> is clear. The VCSR<ADAB> is set to indicate the exception. If VCSR<ADAB> is already set when a match occurs, the VCSR<ADAB> is cleared and the match is ignored. The exception is reported before the store instruction is executed. |
| 0 | LABE | Load Address Breakpoint Enable. Clear upon reset. If set, causes the ARM7 Data Address Breakpoint exception to occur when the upper 30 bits of an ARM7 load access address matches the ADABR<31:2> and VCSR<ADAB> is clear. The VCSR<ADAB> is set to indicate the exception. If VCSR<ADAB> is already set when a match occurs, VCSR<ADAB> is cleared and the match is ignored. The exception is reported before the load instruction is executed. |

The Scratch Pad Register configures the address and size of the scratch pad formed using SRAM in cache subsystem 130. The register definition is shown in Table B.7.

TABLE B.7

SPREG definition

| Bit | Mnemonic | Description |
|---|---|---|
| 31–11 | SPBASE | Scratch Pad Base indicates the upper 21 bit of the starting address of the scratch pad. This value must be the 4M byte offset from the value in the MSP_BASE register. |
| 10-2 | reserved | |
| 1–0 | SPSIZE | Scratch Pad Size.<br>00->0K (with 4K vector processor data cache)<br>01->2K (with 2K vector processor data cache)<br>10->3K (with 1K vector processor data cache)<br>11->4K (with no vector processor data cache) |

The user extended registers are used mostly for synchronization of processors 110 and 120. The user extended registers are currently defined to have only one bit, mapped to bit 30, and instructions such as "MFER R15, UERx", for example, returns the bit value into the Z flag. The bits UERx<31> and UERx<29:0> are always read as zeros. The user extended registers are described in Table B.8.

TABLE B.8

User Extended Registers

| Number | Mnemonic | Description |
|---|---|---|
| UER0 | VPSTATE | Vector Processor State flag. Bit 30 when set indicates that the vector processor is in VP_RUN state, executing instructions. If clear, indicates that the vector processor is in VP_IDLE state, and has halted with VPC addressing the next instruction to execute. The VPSTATE<30> is clear upon reset. |
| UER1 | VASYNC | Vector and ARM7 synchronization flag. Bit 30 is provided for producer-consumer type of synchronization between the vector and ARM7 processors 120 and 110. Vector processor 120 can set or cleared this flag using the VMOV instruction. This flag can also be set or cleared by an ARM7 process using a MFER or MTER instruction. In addition, the flag can be read and set using a TESTSET instruction. |

Table B.9 shows the extended registers' states upon a power-on reset.

TABLE B.9

Extended Register Power-on State

| Register | Reset State |
|---|---|
| CTR | 0 |
| PVR | TBD |
| VIMSK | 0 |
| AIABR | AIABR<0>=0, all others are undefined |
| ADABR | ADABR<1:0>=0, all others are undefined |
| STR | 0 |
| VPSTATE | VPSTATE<30>=0, all others are undefined |
| VASYNC | VASYNC<30>=0, all others are undefined |

APPENDIX C

The architectural state of vector processor 120 includes: 32 32-bit scalar registers; 2 banks of 32 288-bit vector registers; a pair of 576-bit vector accumulator registers; a set of 32-bit special-purpose registers. The scalar, vector and accumulator registers are intended for general-purpose programming, and support many different data types.

The following notations are used in this and subsequent sections: VR indicates a vector register; VRi indicates the ith vector register (zero offset); VR[i] indicates the ith data element in a vector register VR; VR<a:b> indicates bits a to b in a vector register VR; and VR[i]<a:b> indicates bits a to b of the ith data element in a vector register VR.

A vector architecture has an added dimension of data types and sizes for the multiple elements within one vector register. Since a vector register is of a fixed size, the number of data elements it can hold depends on the size of the elements. The MSP architecture defines five element sizes as shown in Table C.1.

TABLE C.1

Data Element Sizes

| Size Name | Size Width (bits) |
|---|---|
| Boolean | 1 |
| Byte | 8 |
| Byte9 | 9 |
| Halfword | 16 |
| Word | 32 |

The MSP architecture interprets vector data according to the specified data type and size in an instruction. Currently, two's complement (integer) formats are supported for the byte, byte9, halfword and word element sizes on most arithmetic instructions. In addition, the IEEE 754 single precision format is supported with the word element size for most arithmetic instructions.

A programmer is free to interpret the data in any desired manner as long as the instruction sequence produces a meaningful result. For instance, the programmer is free to use the byte9 size to store 8-bit unsigned numbers and is equally free to store 8-bit unsigned numbers in the byte size data elements and operate on them using the provided two's complement arithmetic instructions, as long as the program can deal with "false" overflow results.

There are 32 scalar registers that are referred to as SR0 through SR31. The scalar registers are 32 bits wide and can contain one data element of any one of the defined sizes. Scalar register SR0 is special in that register SR0 always reads as 32 bits of zeros and a write to register SR0 is ignored. The byte, byte9 and halfword data types are stored in the least significant bits of scalar registers with the most significant bits having undefined values.

Since the registers do not have data type indicators, programmers must know the data type for the registers being used for each instruction. This is different from other architectures where a 32-bit register is assumed to contain a 32-bit value. The MSP architecture specifies that a result of a data type A correctly modify only the bits defined for the data type A. For instance, the result of a byte9 addition only modifies the lower 9-bits of the 32-bit destination scalar register. The values of the upper 23 bits are undefined unless stated otherwise for an instruction.

The 64 vector registers are organized into 2 banks, each with 32 registers. Bank 0 contains the first 32 registers and the bank 1 contains the second 32 registers. The two banks are used in a manner where one bank is set as the current bank and the other is set as the alternate bank. All vector instructions use the registers in the current bank by default, except the load/store and register move instructions which can access vector registers in the alternate bank. The CBANK bit in Vector Control and Status Register VCSR is used to set the bank 0 or bank 1 to be the current bank. (The other bank becomes the alternate banks.) The vector registers in the current bank are referred to as VR0 through VR31 and in the alternate bank are referred to as VRA0 through VRA31.

Alternatively, the two banks can be conceptually merged to provide 32 double-size vector registers of 576 bits each. The VEC64 bit in control register VCSR specifies this mode. In the VEC64 mode, there are no current and alternate banks, and a vector register number denotes a corresponding pair of 288-bit vector registers from the two banks. That is, $VRi<575:0>=VR_1i<287:0>:VR_0i<287:0>$ where $VR_0i$ and $VR_1Li$ denote the vector registers having register number VRi in bank 1 and in bank 0, respectively.

The double-size vector registers are referenced as VR0 through VR31.

The vector registers can accommodate multiple elements of the byte, byte9, halfword or word sizes as shown in Table C.2.

TABLE C.2

Number of Elements per Vector Register

| Element Size | Element Length (bits) | Max Number of Elements | Total Number of Bits Used |
|---|---|---|---|
| Byte9 | 9 | 32 | 288 |
| Byte | 8 | 32 | 256 |
| Halfword | 16 | 16 | 256 |
| Word | 32 | 8 | 256 |

Mixing of element sizes within one vector register is not supported. Except for the byte9 element size, only 256 of the 288 bits are used. In particular, every ninth bit is unused. The unused 32 bits in byte, halfword and word sizes are reserved, and programmers should not make any assumptions on their values.

The vector accumulator register is intended to provide storage for an intermediate result that has higher degree of precision than the result in a destination register. The vector accumulator register consists of four 288-bit registers, named VAC1H, VAC1L, VAC0H and VAC0L. The VAC0H:VAC0L pair is used by the three instructions by default. Only in VEC64 mode, the VAC1H:VAC1L pair is used to emulate the 64 byte9 vector operations. Even when the bank 1 is set to be the current bank in VEC32 mode, the VAC0H:VAC0L pair is used.

To produce an extended precision result with the same number of elements as in the source vector registers, extended precision elements are saved across a pair of registers, as shown in Table C.3.

TABLE C.3

Vector Accumulator Format

| Element Size | Logical View | VAC Format |
|---|---|---|
| Byte9 | VAC[i]<17:0> | VAC0H[i]<8>: VAC0L[i]<8:0> for i=0 . . . 31 and VAC1H[i–32]<8:0>: VAC1L[i–32]<8:0>for i=32 . . . 63 |
| Byte | VAC[i]<15:0> | VAC0H(i]<7:0>: VAC0L[i]<7:0> for i=0 . . . 31 and VAC1H[i–32]<7:0>: VAC1L[i–32]<7:0> for i = 32 . . . 63 |
| Halfword | VAC[i]<31:0> | VAC0H[i]<15:0>: VAC0L[i]<15:0> for i=0 . . . 15 and VAC1H[i–16]<15:0>: VAC1L[i–16] for i=16 . . . 31 |
| Word | VAC[i]<63:0> | VAC0H[i]<31:0>: VAC0L[i]<31:0> for i=0.7 and VAC1H[i-8]<31:0>: VAC1L[i–8]<31:0> for i=8 . . . 15 |

The VAC1H:VAC1L pair is used only in the VEC64 mode where the number of elements can be as many as 64, 32, or 16 for the Byte9 (and Byte), Halfword, and Word, respectively.

There are 33 special-purpose registers that and cannot be loaded directly from memory or stored directly to memory. Sixteen special-purpose registers, referred to as RASR0 to RASR15, form an internal return address stack and are used by the subroutine call and return instructions. Seventeen more 32-bit special-purpose registers are shown in Table C.4.

TABLE C.4

Special-purpose registers

| Number | Mnemonic | Description |
|---|---|---|
| SP0 | VCSR | Vector Control and Status Register |
| SP1 | VPC | Vector Program Counter |
| SP2 | VEPC | Vector Exception Program Counter |
| SP3 | VISRC | Vector Interrupt Source Register |
| SP4 | VIINS | Vector Interrupt Instruction Register |
| SP5 | VCR1 | Vector Count Register 1 |
| SP6 | VCR2 | Vector Count Register 2 |
| SP7 | VCR3 | Vector Count Register 3 |
| SP8 | VGMR0 | Vector Global Mask Register 0 |
| SP9 | VGMR1 | Vector Global Mask Register 1 |
| SP10 | VOR0 | Vector Overflow Register 0 |
| SP11 | VOR1 | Vector Overflow Register 1 |
| SP12 | VIABR | Vector Instruction Address Breakpoint Reg. |
| SP13 | VDABR | Vector Data Address Breakpoint Register |
| SP14 | VMMR0 | Vector Move Mask Register 0 |
| SP15 | VMMR1 | Vector Move Mask Register 1 |
| SP16 | VASYNC | Vector & ARM7 Synchronization Register |

Vector control and status register VCSR definition is shown in Table C.5.

TABLE C.5

VCSR definition

| Bit | Mnemonic | Description |
|---|---|---|
| 31:18 | reserved | |
| 17:13 | VSP<4:0> | Return address stack pointer. VSP is used by the jump to subroutine and return from subroutine instructions to keep track of the top of the internal return address stack. There are only 16 entries in the return address stack - VSP<4> is used for detecting stack overflow condition. |
| 12 | SO | The summary overflow status flag. This bit is set when an arithmetic operation results in overflow. This bit is sticky - once set, it remains set until cleared by writing 0 to this bit. |
| 11 | GT | The greater than status flag. This bit gets set by the VSUBS instruction when SRa>SRb. |
| 10 | EQ | The equal status flag. This bit gets set by the VSUBS instruction when SRa=SRb. |
| 9 | LT | The less than status flag. This bit gets set by the VSUBS instruction when SRa<SRb. |
| 8 | SMM | Select Move Mask. When this bit is set, the VMMR0/1 pair becomes the element mask for the arithmetic operations. |
| 7 | CEM | complement Element Mask. When this bit is set, the element mask is defined to be one's complement of the VGMR0/1 or VMMR0/1, whichever is configured to be the element mask for arithmetic operation. This bit does not change the contents of the VGMR0/1 or VMMR0/1 - it only changes the use of these registers. The SMM:CEM encodings specify: 00 - use VGMR0/1 as the element mask for all but VCMOVM 01 - use ~VGMR0/1 as the element mask for all but VCMOVM 10 - use VMMR0/1 as the element mask for all but VCMOVM 11 - use ~VMMR0/1 as the element mask for all but VCMOVM |
| 6 | OED | Overflow Exception Disable. When this bit is set, processor 120 continues with execution upon detecting an overflow condition. |
| 5 | ISAT | Integer saturation mode. The combination of OED:ISAT bits specify: 00 - no saturation of OED:ISAT bits specify: 00 - no saturation, report when overflow exception occurs |
| | | x1 - saturation, cannot cause overflow 10 - no saturation, do not report when overflow exception occurs |
| 4:3 | RMODE | Rounding mode for IEEE 754 floating point operations 00 round toward −infinity 01 round toward zero 10 round toward nearest 11 round toward +infinity |
| 2 | FSAT | Floating point saturation (fast IEEE mode) mode bit |
| 1 | CBANK | Current Bank bit. When set indicates that bank 1 is the current bank. When clear indicates that bank 0 is the current bank. CBANK is ignored when the VEC64 bit is set. |
| 0 | VEC64 | 64 byte9 vector mode bit. When set specifies that the vector registers and accumulators are to have 576 bits. The default mode specifies 32 of byte9 size, referred to as the VEC32 mode. |

Vector Program Counter Register VPC is the address of the next instruction to be executed by vector processor 120. ARM7 processor 110 should load register VPC before issuing the STARTVP instruction to start operation of vector processor 120

Vector Exception Program Counter VEPC specifies the address of the instruction that is most likely to have caused the most recent exception. MSP 100 does not support precise exceptions, hence the term "most likely".

Vector Interrupt Source Register VISRC indicates the interrupt sources to ARM7 processor 110. The appropriate bit(s) are set by hardware upon detection of exception(s). Software must clear register VISRC before vector processor 120 can resume execution. Any bit set in register VISRC causes vector processor 120 to enter state VP_IDLE. If the corresponding interrupt enable bit is set in VIMSK, an interrupt to processor 110 is signaled. Table C.6 defines the contents of register VISRC.

TABLE C.6

VISRC definition

| Bit | Mnemonic | Description |
|---|---|---|
| 31 | DAB | Data Address Breakpoint exception |
| 30 | IAB | Instruction address breakpoint exception |
| 29 | SSTP | Single Step exception |
| 28–18 | | reserved |
| 17 | IIA | Invalid Instruction Address exception |
| 16 | IINS | Invalid Instruction exception |
| 15 | IDA | Invalid Data Address exception |
| 14 | UDA | Unaligned Data Access exception |
| 13 | FOV | Floating Point Overflow exception |
| 12 | FINV | Floating Point Invalid Operand exception |
| 11 | FDIV | Floating Point Divide by Zero exception |
| 10 | IOV | Integer Overflow exception |
| 9 | IDIV | Integer Divide by Zero exception |
| 48 | RASO | Return Address Stack Overflow exception |
| 7 | RASU | Return Address Stack Underflow exception |
| 6 | VIP | VCINT exception pending. Executing STARTVP instruction clears this bit. |
| 5 | VJP | VCJOIN exception pending. Executing STARTVP instruction clears this bit. |
| 4–0 | VPEV | Vector Processor Exception Vector. |

Vector Interrupt Instruction Register VIINS is updated with the VCINT or VCJOIN instruction when the VCINT or VCJOIN instruction is executed to interrupt ARM7 processor 110.

Vector Count Registers VCR1, VCR2, and VCR3 are for Decrement And Branch instruction VD1CBR, VD2CBR, and VD3CBR and are initialized with counts of loops to be executed. When instruction VD1CBR is executed, register VCR1 is decremented by 1. If the count value is not zero and the condition specified in the instruction matches the VFLAG, then the branch is taken. If not, the branch is not taken. Register VCR1 is decremented by 1 in either case. Registers VCR2 and VCR3 are used in the same fashion.

Vector Global Mask Register VGMR0 indicates the elements of the destination vector register that are to be affected in the VEC32 mode and the elements within VR<287:0> in the VEC64 mode. Each bit in VGMR0 controls the update of 9 bits in the vector destination register. Specifically, VGMR0<i> controls the update of VRd<9i+8:9i> in the VEC32 mode and of $VR_0d<9i+8:9i>$ in the VEC64 mode. Note that $VR_0d$ denotes the destination register in bank 0 in the VEC64 mode and that VRd refers to the destination register in the current bank, which can either be the bank 0 or bank 1, in the VEC32 mode. Vector global mask register VGMR0 is used in execution of all instructions except the VCMOVM instruction.

Vector Global Mask Register VGMR1 indicates the elements within VR<575:288> that are affected in the VEC64 mode. Each bit in register VGMR1 controls the update of 9 bits in the vector destination register in bank 1. Specifically, VGMR1<i> controls the update of $VR_1d<9i+8:9i>$. Register VGMR1 is not used in the VEC32 mode but, in VEC64 mode, affects execution all instructions except the VCMOVM instruction.

Vector Overflow Register VOR0 indicates the elements in the VEC32 mode and the elements within VR<287:0> in the VEC64 mode that contain overflow results after a vector arithmetic operation. This register is not modified by a scalar arithmetic operation. Bit VOR0<i> being set indicates that the ith element of the byte or byte9, the (i idiv 2)th element of the halfword, or the (i idiv 4)th element of the word data type operation contains an overflow result. For instance, bit 1 and bit 3 would be set to indicate overflow of the first halfword and word element, respectively. This mapping of bits in VOR0 is different from the mapping of the bits in VGMR0 or VGMR1.

Vector Overflow Register VOR1 is used to indicate the elements within VR<575:288> in the VEC64 mode that contains overflow results after a vector arithmetic operation. Register VOR1 is not used in the VEC32 mode nor modified by a scalar arithmetic operation. Bit VOR1<i> being set indicates that the ith element of the byte or byte9, the (i idiv 2)th element of the halfword, or the (i idiv 4)th element of the word data type operation contains an overflow result. For instance, bit 1 and bit 3 would be set to indicate overflow of the first halfword and word element, respectively in VR<575:288>. The mapping of bits in VOR1 is different from the mapping of the bits in VGMR0 or VGMR1.

Vector Instruction Address Breakpoint Register VIABR aids in debugging vector programs. The register definition is shown in Table C.7.

TABLE C.7

| Bit | Mnemonic | VIABR definition Description |
|---|---|---|
| 31–2 | IADR | Vector Instruction Address. Undefined upon reset |
| 1 | | reserved |

TABLE C.7-continued

| Bit | Mnemonic | VIABR definition Description |
|---|---|---|
| 0 | IABE | Instruction Address Breakpoint Enable. Undefined upon reset. If set, causes the Vector Instruction Address Breakpoint exception to occur when a vector instruction access address matches the VIABR<31:2>. Bit VISRC<IAB> is set to indicate the exception. The exception is reported before the instruction is executed. |

Vector Data Address Breakpoint Register VDABR aids in debugging vector programs. The register definition is shown in Table C.8.

TABLE C.8

| Bit | Mnemonic | VDABR definition Description |
|---|---|---|
| 31–2 | DADR | Vector Data Address. Undefined upon reset. |
| 1 | SABE | Store Address Breakpoint Enable. Undefined upon reset. If set, causes the Vector Data Address Breakpoint exception to occur when a vector store access address matches the VDABR<31:2>. Bit VISRC<DAB> is set to indicate the exception. The exception is reported before the store instruction is executed. |
| 0 | LABE | Load Address Breakpoint Enable. Clear upon reset. If set, causes the Vector Data Address Breakpoint exception to occur when a vector load access address matches the VDABR<31:2>. The VISRC<DAB> is set to indicate the exception. The exception is reported before the load instruction is executed. |

Vector Move Mask Register VMMR0 is used by the VCMOVM instruction at all times as well as when VCSR<SMM>=1 for all instructions. Register VMMR0 indicates the elements of the destination vector register that are to be affected in the VEC32 mode and the elements within VR<287:0> in the VEC64 mode. Each bit in VMMR0 controls the update of 9 bits in the vector destination register. Specifically, VMMR0<i> controls the update of VRd<9i+8:9i> in the VEC32 mode and of $VR_0d<9i+8:9i>$ in the VEC64 mode. VR0d denotes the destination register in bank 0 in the VEC64 mode and that VRd refers to the destination register in the current bank, which can either be the bank 0 or bank 1. in the VEC32 mode.

Vector Move Mask Register VMMR1 is used by the VCMOVM instruction at all times as well as when VCSR<SMM>=1 for all instructions. Register VMMR1 indicates the elements within VR<575:288> that are to be affected in the VEC64 mode. Each bit in VMMR1 controls the update of 9 bits in the vector destination register in bank 1. Specifically, VGMR1<i> controls the update of VR1d<9i+8:9i>. Register VGMR1 is not used in the VEC32 mode.

Vector and ARM7 Synchronization Register VASYNC provides producer/consumer type of synchronization between processes 110 and 120. Currently, only bit 30 is defined. An ARM7 process can access register VASYNC using instructions MFER, MTER, and TESTSET while vector processor 120 is in state VP_RUN or state VP_IDLE. Register VASYNC is not accessible to an ARM7 process through TVP or MFVP instructions since these instructions cannot access beyond the first 16 vector processor's special purpose registers. A vector process can access register VASYNC through a VMOV instruction.

Table C.9 shows the vector processor's state upon a power-on reset.

TABLE C.9

| Vector Processor Power-on Reset State | |
|---|---|
| Register | Reset State |
| SR0 | 0 |
| all others | undefined |

The special-purpose registers are initialized by ARM7 processor 110 before the vector processor can execute an instruction.

APPENDIX D

Each instruction either implies or specifies the data type of the source and destination operands. Some instructions have semantics that apply equally to more than one data type. Some instructions have semantics that take one data type for the source and produce a different data type for the result. This appendix describes the data types supported by the exemplary embodiment. Table 1 in the application describes the data types int8, int9, int16, int32 and float which are supported. Unsigned integer formats are not supported and that an unsigned integer value must first be converted to a 2's complement format before being used. The programmer is free to use arithmetic instructions with unsigned integer or any other formats of his choice as long as overflows are handled properly. The architecture defines overflows of only 2's complement integer and 32-bit floating point data types. The architecture does not detect carry out of 8, 9, 16 or 32-bit operations that is necessary to detect unsigned overflows.

Table D.1 shows the data sizes supported by the load operations.

TABLE D.1

| Data Sizes Supported by Load Operations | | |
|---|---|---|
| Data Size in Memory | Data Size in Register | Load Operation |
| 8-bit | 9-bit | load 8-bits, sign-extend to 9-bits (for loading 8-bit two's complement) |
| 8-bit | 9-bit | load 8-bits. zero-extend to 9-bits (for loading 8-bit unsigned) |
| 16-bit | 16-bit | load 16-bits (for loading 16-bit unsigned or two's complement) |
| 32-bit | 32-bit | load 32-bits (for loading 32-bit unsigned, two's complement integer or 32-bit floating point) |

The architecture specifies the memory address alignment to be on data type boundaries. That is, for a byte there is no alignment requirement. For a halfword, the alignment requirement is halfword boundary. For a word, the alignment requirement is word boundary.

Table D.2 shows the data sizes supported by the store operations.

TABLE D.2:

| Data Sizes Supported by Store Operations | | |
|---|---|---|
| Data Size in Register | Data Size in Memory | Store Operation |
| 8-bit | 8-bit | store 8-bits (stores 8-bit unsigned or two's complement) |
| 9-bit | 8-bit | truncate to lower 8-bits, store 8-bits (stores 9-bit two's complement having value between 0 and 255 - unsigned) |
| 16-bit | 16-bit | store 16-bits (store 16-bit unsigned or two's complement) |
| 32-bit | 32-bit | store 32-bits |

Since more than one dam type is mapped to a register, be it scalar or vector, there may be bits in the destination register that have no defined result for some data types. In fact, other than for the byte9 data size operation on a vector destination register and for the word data size operation on a scalar destination register, there are bits in a destination register whose values are not defined by the operation. For these bits, the architecture specifies that their values be undefined. Table D.3 shows the bits that are undefined for each data size.

TABLE D.3:

| Undefined Bits for the Data Sizes | | |
|---|---|---|
| Data Size | Vector Destination Register | Scalar Destination Register |
| byte | VR<9i+8>, for i=0 to 31 | SR<31:8> |
| byte9 | none | SR<31:9> |
| halfword | VR<9i+8>, for i=0 to 31 | SR<31:16> |
| word | VR<9i+8>, for i=0 to 31 | none |

Programmers must be aware of the data types of the source and destination registers or memory when programming. A data type conversion from one element size to another potentially results in different number of elements being stored in a vector register. For instance, the conversion of a vector register from the halfword to the word data type requires two vector registers to store the same number of converted elements. Conversely, a conversion from the word data type, which may have a user-defined format in the vector register, to the halfword format produces the same number of elements in one-half of a vector register and the residual bits in the other half. In either cases, data type conversions create an architectural issue with the arrangement of the converted elements that are of different size from the source elements.

As a principle, the MSP architecture does not provide operations that implicitly change the number of elements as the result. The architecture views that the programmer must be aware of the consequences of changing the number of elements in the destination register. The architecture only provides operations that convert from one data type to another data type of the same size, and requires the programmer to adjust for the differences in data sizes when converting from one data type to another of different size.

Special instructions such as VSHFLL and VUNSHFLL as described in Appendix E simplify the conversion of a vector having a first data size to a second vector having a second data size. The basic steps involved in converting two's complement data type from a smaller element size, int8 for instance, in vector $VR_a$ to a larger size, int16 for instance, are:

1. Shuffle the elements in $VR_a$ with another vector $VR_b$ into two vectors $VR_c:VR_d$ using the byte data type. The elements in $VR_a$ are moved to the lower bytes of int16 data elements in a double-size register $VR_c:VR_d$, and the elements of $VR_b$, whose values are irrelevant, are moved to the upper bytes of $VR_c:VR_d$. This operation effectively moves one half of the elements of $VR_a$ into $VR_c$ and the other half into $VR_d$ while doubling the size of each element from byte to halfword.
2. Arithmetic shift the elements in $VR_c:VR_d$ by 8 bits to sign-extend them.

The basic steps involved in converting two's complement data type from a larger element size, int16 for instance, in vector $VR_a$ to a smaller size, int8 for instance, are:

1. Check to ensure that the each element in the int16 data type are representable in the byte size. If necessary, saturate the elements at both ends to fit in the smaller size.
2. Unshuffle the elements in $VR_a$ with another vector $VR_b$ into two vectors $VR_c:VR_d$. The upper halves of each element in $VR_a$ and $VR_b$ are moved to $VR_c$ and the lower halves are moved to $VR_d$. This effectively collects the lower halves of all elements in $VR_a$ in the lower half of $VR_d$.

Special instructions are provided for the following data type conversions: int32 to single precision floating point; single precision floating point to fixed point (X.Y notation); single precision floating point to int32; int8 to int9; int9 to int16; and int16 to int9.

To provide flexibility in vector programming, most vector instructions use an element mask to operate only on the selected elements within a vector. The Vector Global Mask Registers VGMR0 and VGMR1 identify the elements that are modified in the destination register and the vector accumulator by the vector instructions. For byte and byte9 data size operations, each of the 32 bits in the VGMR0 (or VGMR1) identifies an element to be operated on. Bit VGMR0<i> being set indicates that the element i of byte size is to be affected, i being 0 to 31. For halfword data size operations, each pair of the 32 bits in VGMR0 (or VGMR1) identifies an element to be operated on. Bits VGMR0<2i:2i+1> being set indicates that the element i is to be affected, i being 0 to 15. If only one bit of a pair in VGMR0 is set for an halfword data size operation, only the bits in the corresponding byte are modified. For word data size operations, each set of four bits in VGMR0 (or VGMR1) identifies an element to be operated on. Bits VGMR0<4i:4i+3> being set indicates that the element i is to be affected, i being 0 to 7. If not all bits in a set of four in VGMR0 are set for a word data size operation, only the bits in the corresponding byte are modified.

The VGMR0 and VGMR1 can be set by comparing a vector register with a vector or scalar register or with an immediate value using the VCMPV instruction. This instruction properly sets the mask according to the specified data size. Since a scalar register is defined to contain only one data element, the scalar operations (that is, the destination registers are scalar) are not affected by the element mask.

For flexibility in vector programming, most MSP instructions support three forms of vector and scalar operations. They are:

1. vector=vector op vector
2. vector=vector op scalar
3. scalar=scalar op scalar For the case 2 where a scalar register is specified as the B operand, the single element in the scalar register is replicated as many as needed to match the number of elements within the vector A operand. The replicated elements are of the same value as the element in the specified scalar operand. The scalar operand can be from a scalar register or from the instruction, in the form of immediate operand. In case of an immediate operand, the appropriate sign-extension is applied if the specified data type uses a larger data size than available with the immediate field size.

In many multimedia applications, special attention must be paid to the precision of the source, intermediate and final result. In addition, the integer multiply instructions produce "double precision" intermediate results that can be stored in two vector registers.

The MSP architecture currently supports two's complement integer formats for 8, 9, 16 and 32-bit elements and the IEEE 754 single precision format for 32-bit elements. An overflow is defined to be a result that is beyond the most positive or the most negative value representable by the specified data type. When an overflow occurs, the value written to the destination register is not a valid number. An underflow is defined only for the floating point operations.

Unless state otherwise, all floating point operations use one of the four rounding modes specified in bits VCSR<RMODE>. Some instructions use what is known as round away from zero (round even) rounding mode. These instructions are explicitly stated.

Saturation is an important function in many multimedia applications. The MSP architecture supports saturation in all four integer and the floating point operations. bit ISAT in register VCSR specifies the integer saturation mode. The floating point saturation mode, which is also known as fast IEEE mode, is specified with FSAT bit in the VCSR. When saturation mode is enabled, a result that is beyond the most positive or the most negative values is set to the most positive or the most negative values, respectively. An overflow cannot occur in this case, and an overflow bit cannot be set.

Table D.4 lists precise exceptions, which are detected and reported prior to executing the faulting instruction. The exception vector address is given in hexadecimal notation.

TABLE D.4

Precise Exceptions

| Exception Vector | Description |
| --- | --- |
| 0x00000018 | Vector Processor Instruction Address Breakpoint Exception |
| 0x00000018 | Vector Processor Data Address Breakpoint Exception |
| 0x00000018 | Vector Processor Invalid Instruction Exception |
| 0x00000018 | Vector Processor Single Step Exception |
| 0x00000018 | Vector Processor Return Address Stack Overflow Exception |
| 0x00000018 | Vector Processor Return Address Stack Underflow Exception |
| 0x00000018 | Vector Processor VCINT Exception |
| 0x00000018 | Vector Processor VCJOIN Exception |

Table D.5 lists imprecise exceptions, which are detected and reported after executing some number of instruction that are later in program order than the faulting instruction.

TABLE D.5:

Imprecise Exceptions

| Exception Vector | Description |
|---|---|
| 0x00000018 | Vector Processor Invalid Instruction Address Exception |
| 0x00000018 | Vector Processor Invalid Data Address Exception |
| 0x00000018 | Vector Processor Unaligned Data Access Exception |
| 0x00000018 | Vector Processor Integer Overflow Exception |
| 0x00000018 | Vector Processor Floating Point Overflow Exception |
| 0x00000018 | Vector Processor Floating Point Invalid Operand Exception |
| 0x00000018 | Vector Processor Floating Point Divide by Zero Exception |
| 0x00000018 | Vector Processor Integer Divide by Zero Exception |

APPENDIX E

The instruction set for vector processor includes eleven classification as shown in Table E.1.

TABLE E.1

Vector instruction class summary

| Class | Description |
|---|---|
| Control Flow | This class includes the instructions that control the program flow including branch and ARM7 interface instructions. |
| Logical (bit-wise, mask) | This class includes the bit-wise logical instructions. Although the (bit-wise, mask) data type is Boolean, the Logical instructions use the element mask to modify the results, and therefore requires data type. |
| Shift & Rotate (element-wise, mask) | This class includes the instructions that shift and rotate the bits mask) within each element. This class differentiates the element sizes, and is affected by the element mask. |
| Arithmetic (element-wise, mask) | This class includes the element-wise arithmetic instructions. That (element-wise, mask) is, the result of ith element is computed from the ith elements of the sources. This class differentiates the element types, and is affected by the element mask. |
| Multimedia (element wise-mask) | This class includes instructions that are optimized for multimedia (element-wise, mask) applications. This class differentiates the element types, and is affected by the element mask. |
| Data Type Conversion (element-wise, no mask) | This class includes instructions that convert elements from one (element-wise, no mask) data type to another. Instructions in this class support a specific set of data types, and are not subject to the element mask since the architecture does not support having more than one data type in a register. |
| Inter-element Arithmetic | This class includes instructions that take two elements from different positions in the vectors to produce arithmetic results. |
| Inter-element Move | This class includes instructions that take two elements from different positions in the vectors to rearrange the elements. |
| Load/Store | This class includes instructions that load or store registers. These instructions are not affected by the element mask. |
| Cache Operation | This class includes instructions that control instruction and data caches. These instructions are not affected by the element mask. |

TABLE E.1-continued

Vector instruction class summary

| Class | Description |
|---|---|
| Register Move | This class includes instructions that transfer data between two registers. These instructions are normally not affected by the element mask, but some have the option to use the element mask. |

Table E.2 lists the flow control instructions.

TABLE E.2

Flow Control Instructions

| Mnemonic | Description |
|---|---|
| VCBR | Conditional Branch |
| VCBRI | Conditional Branch Indirect |
| VDICBR | Decrement VCR1 and Conditional Branch |
| VD2CBR | Decrement VCR2 and Conditional Branch |
| VD3CBR | Decrement VCR3 and Conditional Branch |
| VCJSR | Conditional Jump to Subroutine |
| VCJSRI | Conditional Jump to Subroutine Indirect |
| VCRSR | Conditional Return from Subroutine |
| VCINT | Conditional Interrupt ARM7 |
| VCJOIN | Conditional Join With ARM7 |
| VCCS | Conditional Context Switch |
| VCBARR | Conditional Barrier |
| VCHGCR | Change Control Register (VCSR) |

The logical class supports the Boolean data types, and are affected by the element mask. Table E.3 lists the flow control instructions.

TABLE E.3

Logic Instructions

| Mnemonia | Description |
|---|---|
| VNOT | NOT - ~ B |
| VAND | AND - (A & B) |
| VCAND | Complement AND - (~A & B) |
| VANDC | AND Complement - (A & ~B) |
| VNAND | NAND - ~ (A & B) |
| VOR | OR - (A \| B) |
| VCOR | Complement OR - (~A \| B) |
| VORC | OR Complement - (A \| ~B) |
| VNOR | NOR - ~ (A \| B) |
| VXOR | Exclusive OR - (A B) |
| VXNOR | Exclusive NOR - ~ (A B) |

The shift/rotate class instructions operate on the int8, int9, int16 and int32 data types (no float data type), and are affected by the element mask. Table E.4 lists the Shift/rotate class instructions.

TABLE E.4

Shift & Rotate class

| Mnemonic | Description |
|---|---|
| VDIV2N | Divide by Power of 2 |
| VLSL | Logical Shift Left |
| VLSR | Logical Shift Right |
| VROL | Rotate Left |
| VROR | Rotate Right |

The arithmetic class instructions, in general, support the int8, int9, int16, int32, and float data types, and are affected by the element mask. For specific limitations on unsupported data types, refer to detail description of each instruction below. The VCMPV instruction is not affected by the element mask, since it operates on element mask. Table E.5 lists the arithmetic class instructions.

TABLE E.5

Arithmetic Class

| Mnemonic | Description |
|---|---|
| VASR | Arithmetic Shift Right |
| VADD | Add |
| VAVG | Average |
| VSUB | Subtract |
| VASUB | Absolute of Subtract |
| VMUL | Multiply |
| VMULA | Multiply to Accumulator |
| VMULAF | Multiply to Accumulator Fraction |
| VMULF | Multiply Fraction |
| VMULFR | Multiply Fraction and Round |
| VMULL | Multiply Low |
| VMAD | Multiply and Add |
| VMADL | Multiply and Add Low |
| VADAC | Add and Accumulate |
| VADACL | Add and Accumulate Low |
| VMAC | Multiply and Accumulate |
| VMACF | Multiply and Accumulate Fraction |
| VMACL | Multiply and Accumulate Low |
| VMAS | Multiply and Subtract from Accumulator |
| VMASF | Multiply and Subtract from Accumulator Fraction |
| VMASL | Multiply and Subtract from Accumulator Low |
| VSATU | Saturate To Upper Limit |
| VSATL | Saturate to Lower Limit |
| VSUBS | Subtract Scalar and Set Condition |
| VCMPV | Compare Vector and Set Mask |
| VDIVI | Divide Initialize |
| VDIVS | Divide Step |
| VASL | Arithmetic Shift Left |
| VASA | Arithmetic Shift Accumulator by 1 bit |

The MPEG instructions are a class of instructions specially suited for MPEG encoding and decoding, but can be used in a variety of manners. The MPEG instructions support the int8, int9, int16 and int32 data types, and are affected by the element mask. Table E.6 lists the MPEG instructions.

TABLE E.6

MPEG class

| Mnemonic | Description |
|---|---|
| VAAS3 | Add and Add Sign of (−1, 0, 1) |
| VASS3 | Add and Subtract Sign of (−1, 0, 1) |
| VEXTSGN2 | Extract Sign of (−1, 1) |
| VEXTSGN3 | Extract Sign of (−1, 0, 1) |
| VXORALL | XOR the least-significant-bit of all elements |

Each data type conversion instruction supports specific data types, and is not affected by the element mask since the architecture does not support more than one data type in a register. Table E.7 list the data type conversion instructions.

TABLE E.7

Data Type Conversion Class

| Mnemonic | Description |
|---|---|
| VCVTIF | Convert Integer to Floating point |
| VCVTFF | Convert Floating Point to Fixed Point |
| VROUND | Round Floating Point to Integer (supports 4 IEEE rounding modes) |
| VCNTLZ | Count Leading Zeroes |
| VCVTB9 | Convert Byte9 Data Type |

The inter-element arithmetic class of instructions support the int8, int9, int16, int32 and float data types. Table E.8 lists instructions in the inter-element arithmetic class.

TABLE E.8

Inter-element Arithmetic Class

| Mnemonic | Description |
|---|---|
| VADDH | Add Two Adjacent Elements |
| VAVGH | Average Two Adjacent Elements |
| VAVGQ | Average Quad Elements |
| VMAXE | Maximum Exchange Even/Odd Elements |

The inter-element move class of instructions support byte, byte9, halfword and word data sizes. Table E.9 lists the inter-element move class of instructions.

TABLE E.9

Inter-element Move Class

| Mnemonic | Description |
|---|---|
| VESL | Element Shift Left by 1 |
| VESR | Element Shift Right by 1 |
| VSHFL | Shuffle to Even/Odd Elements |
| VSHFL | Shuffle to Even/Odd Elements |
| VSHFLH | Shuffle to Even/Odd Elements High |
| VSHFLL | Shuffle to Even/Odd Elements Low |
| VUNSHFL | Unshuffle to Even/Odd Elements |
| VUNSHFLH | Unshuffle to Even/Odd Elements High |
| VUNSHFLL | Unshuffle to Even/Odd Elements Low |

The load/store instructions support, in addition to byte, halfword, and word data sizes, special byte9 related data size operations, and are not affected by the element mask. Table E.10 lists instructions in the load/store class.

TABLE E.10

Load/Store Class

| Mnemonic | Description |
|---|---|
| VL | Load |
| VLD | Load Double |
| VLQ | Load Quad |
| VLCB | Load From Circular Buffer |
| VLR | Load Reverse Element Order |
| VLWS | Load With Stride |
| VST | Store |
| VSTD | Store Double |
| VSTQ | Store Quad |
| VSTCB | Store To Circular Buffer |
| VSTR | Store Reverse Element Order |
| VSTWS | Store With Stride |

The most register move instructions support the int8, int9, int16, int32 and float data types, and are not affected by the element mask. Only the VCMOVM instruction is affected by the element mask. Table E.11 lists the register move class of instructions.

TABLE E.11

Register Move Class

| Mnemonic | Description |
|---|---|
| VLI | Load Immediate |
| VMOV | Move |
| VCMOV | Conditional Move |
| VCMOVM | Conditional Move with Element Mask |
| VEXTRT | Extract An Element |
| VINSERT | Insert An Element |

Table E.12 list instructions in the Cache Operation Class which control cache subsystem 130.

TABLE E.12

Cache Operation Class

| Mnemonic | Description |
|---|---|
| VCACHE | Cache operation to data or instruction cache |
| VPFTCH | Prefetch into data cache |
| VWBACK | Writeback from data cache |

INSTRUCTION DESCRIPTION NOMENCLATURE

To simplify the specification of the instruction set, special terminology is used throughout the appendices. For example, instruction operands are signed two's-complement integers of byte, byte9, halfword or word sizes, unless otherwise noted. The term "register" is used to denote a general-purpose (scalar or vector) register. Other types of registers are described explicitly. In the assembly-language syntax, suffixes b, b9, h and w denote both the data sizes (byte, byte9, halfword, and word) and the integer data types(int8, int9, int16 and int32). Further, terminology and symbols used to describe instruction operands, operations, and the assembly-language syntax are as follows.

| Rd | destination register (vector, scalar or special-purpose) |
|---|---|
| Ra, Rb | source registers a and b (vector, scalar or special-purpose) |
| Rc | source or destination register c (vector or scalar) |
| Rs | store data source register (vector or scalar) |
| S | 32-bit scalar or special-purpose register |
| VR | current bank vector register |
| VRA | alternate bank vector register |
| $VR_0$ | bank 0 vector register |
| $VR_1$ | bank 1 vector register |
| VRd | vector destination register (default to current bank unless VRA is specified). |
| VRa, VRb | vector source registers a and b |
| VRc | vector source or destination register c |
| VRs | vector store data source register |
| VAC0H | Vector Accumulator Register 0 High |
| VAC0L | Vector Accumulator Register 0 Low |
| VAC1H | Vector Accumulator Register 1 High |
| VAC1L | Vector Accumulator Register 1 Low |
| SRd | scalar destination register |
| SRa, SRb | scalar source registers a and b |
| SRb+ | update the base register with the effective address |
| SRs | scalar store data source register |
| SP | special-purpose register |
| VR[i] | ith element in vector register VR |
| VR[i]<a:b> | bits a to b of the ith element in vector register VR |
| VR[i]<msb> | the most-significant-bit of the ith element in vector register VR |
| EA | effective address for memory access |
| MEM | memory |
| BYTE[EA] | one byte in memory addressed by EA |
| HALF[EA] | the halfword in memory addressed by EA. Bits <15:8> are addressed by EA + 1. |
| WORD[EA] | a word in memory addressed by EA. Bits <31:24> are addressed by EA + 3. |
| NumElem | denotes the number of elements for a given data type. It is 32, 16 or 8 for byte and byte9, halfword, or word data sizes, respectively, in the VEC32 mode. It is 64, 32 or 16 for the byte and byte9, halfword, or word data sizes, respectively, in the VEC64 mode. For scalar operations, NumElem is 0. |
| EMASK[i] | denotes the element mask for the ith element. It represents 1, 2, or 4 bits in the VGMR0/1, ~VGMR0/1, VMMR0/1 or ~VMMR0/1 for byte and byte9, halfword or word data sizes, respectively. For scalar operations, the element mask is assumed to be set, even if EMASK[i] = 0. |
| MMASK[i] | denotes the element mask for the ith element. It represents 1, 2, or 4 bits in the VMMR0 or VMMR1 for byte and byte9, halfword, or word data sizes, respectively. |
| VCSR | The Vector Control and Status Register |
| VCSR<x> | Denotes a bit or bits in VCSR. The "x" is a field name. |
| VPC | vector processor program counter |
| VECSIZE | vector register size is 32 in VEC32 and 64 in VEC64 mode. |
| SPAD | scratch pad |

The C programming constructs are used to describe the control-flow of the operations. Exceptions are noted below:

| = | assignment |
|---|---|
| : | concatenation |
| {x ‖ y} | indicates a selection between x or y (not a logical or) |
| sex | sign-extend to specified data size |
| sex_dp | sign-extend to double precision of specified data size |
| sign>> | sign-extended (arithmetic) shift right |
| zex | zero-extend to specified data size |
| zero>> | zero-extended (logical) shift right |
| << | shift left (zero fill in) |
| trnc7 | truncate leading 7 bits (from a halfword) |
| trnc1 | truncate leading 1 bit (from byte9) |
| % | modulo operator |
| \| expression \| | absolute value of the expression |
| / | divide (for float data type, use one of the four IEEE rounding mode) |
| // | divide (uses the round away from zero rounding mode) |
| saturate( ) | saturate to the most negative or most positive value, instead of generating overflow, for integer data types. For float data type, the saturation can be to the positive infinity, positive zero, negative zero, or negative infinity. |

General instruction formats are shown in FIG. 8 and described below.

REAR format is used by the load, store and cache operation instructions, and the fields in the REAR format have the following meanings as given in Table E.13.

TABLE E.13

REAR format

| Field | Meaning |
|---|---|
| Opc<4:0> | Opcode |
| B | Bank identifier for the Rn register. |
| D | Destination/source scalar register. When set, Rn<4:0> denotes a scalar register. |
| | The legal values for B:D encodings in the VEC32 mode are: |
| | 00    Rn is a vector register in the current bank |
| | 01    Rn is a scalar register (in the current bank) |
| | 10    Rn is a vector register in the alternate bank |
| | 11    undefined |
| | The legal values for B:D encodings in the VEC64 mode are: |
| | 00    Only 4, 8, 16 or 32 bytes in the vector register Rn is used |
| | 01    Rn is a scalar register |
| | 10    All 64 bytes of vector register Rn is used |
| | 11    undefined |
| TT<1:0> | Transfer Type indicates a specific load or store operation. See the LT and ST encoding tables below. |
| C | Cache off. Set this bit to bypass data cache for load. This bit is set with cache-off mnemonics of the load & store instructions (concatenate OFF to the mnemonic). |
| A | Address update. Set this bit to update SRb with the effective address. The effective address is calculated as SRb + SRi. |
| Rn<4:0> | Destination/source register number. |
| SRb<4:0> | Scalar base register number. |
| SRi<4:0> | Scalar index register number. |

Bits 17:15 are reserved and should be zeros to ensure compatibility with future extensions in the architecture. Certain encodings of the B:D and TT fields are undefined.

Programmer should not use these encodings since the architecture does not specify the expected result when such an encoding is used. Table E.14 shows scalar load operations supported (encoded in the TT field as LT) in both VEC32 and VEC64 modes.

TABLE E.14

REAR Load Ops in VEC32 and VEC64 Modes

| D:LT | Mnemonic | Meaning |
|---|---|---|
| 1 00 | .bs9 | load 8-bit into byte9 size, sign-extend |
| 1 01 | .h | load 16 bits into halfword size |
| 1 10 | .bz9 | load 8-bits into byte9 size, zero-extended |
| 1 11 | .w | load 32 bits into word size |

Table E.15 shows vector load operations supported (encoded in the TT field as LT) in VEC32 mode, which is when bit VCSR<0> is clear.

TABLE E.15

REAR Load Ops in VEC32 Mode

| D:LT | Mnemonic | Meaning |
|---|---|---|
| 0 00 | .4 | Load 4 bytes from memory into lower 4 byte9s in register and leave the remaining byte9s unmodified. Every 9th bit of the 4 byte9s are sign-extended from the corresponding 8th bit. |
| 0 01 | .8 | Load 8 bytes from memory into lower 8 byte9s in register and leave the remaining byte9s unmodified. Every 9th bit of the 8 byte9s are sign-extended from the corresponding 8th bit. |
| 0 10 | .16 | Load 16 bytes from memory into lower 16 byte9s in register and leave the remaining byte9s unmodified. Every 9th bit of the 16 byte9s are sign-extended from the corresponding 8th bit. |
| 0 11 | .32 | Load 32 bytes from memory into lower 32 byte9s in register and leave the remaining byte9s unmodified. Every 9th bit of the 32 byte9s are sign-extended from the corresponding 8th bit. |

B bit is used to indicate current or alternate bank.

Table E.16 shows vector load operations supported (encoded in TT field as LT) in VEC64 mode, which is when VCSR<0> bit is set.

TABLE E.16

REAR Load Ops in VEC32 Mode

| B:D:LT | Mnemonic | Meaning |
|---|---|---|
| 0 0 00 | .4 | Load 4 bytes from memory into lower 4 byte9s in register and leave the remaining byte9s unmodified. Every 9th bit of the 4 byte9s are sign-extended from the corresponding 8th bit. |
| 0 0 01 | .8 | Load 8 bytes from memory into lower 8 byte9s in register and leave the remaining byte9s unmodified. Every 9th bit of the 8 byte9s are sign-extended from the corresponding 8th bit. |
| 0 0 10 | .16 | Load 16 bytes from memory into lower 16 byte9s in register and leave the remaining byte9s unmodified. Every 9th bit of the 16 byte9s are sign-extended from the corresponding 8th bit. |
| 0 0 11 | .32 | Load 32 bytes from memory into lower 32 byte9s in register and leave the remaining byte9s unmodified. Every 9th bit of the 32 byte9s are sign-extended from the corresponding 8th bit. |
| 1 0 00 | | undefined |
| 1 0 01 | | undefined |
| 1 0 10 | | undefined |
| 1 0 11 | .64 | Load 64 bytes from memory into lower 64 byte9s in register and leave the remaining byte9s unmodified. Every 9th bit of the 64 byte9s are sign-extended from the corresponding 8th bit. |

Bit B is used to indicate 64 byte vector operation, since the concept of current and alternate bank does not exist in VEC64 mode.

Table E.17 lists scalar store operations supported (encoded in the TT field as ST) in both VEC32 and VEC64 modes.

TABLE E.17

REAR Scalar Store Operations

| D:ST | Mnemonic | Meaning |
|---|---|---|
| 1 00 | .b | store byte or byte9 sizes into 8-bits (truncate 1 bit from byte9) |
| 1 01 | .h | store halfword size into 16-bits |
| 1 10 | | undefined |
| 1 11 | .w | store word size into 32-bits |

Table E.18 lists the vector store operations supported (encoded in the TT field as ST) in VEC32 mode, which is when VCSR<0> bit is clear.

TABLE E.18

REAR Veator Store Operations in VEC32 Mode

| D:ST | | Mnemonic | Meaning |
|---|---|---|---|
| 0 | 00 | .4 | Store 4 bytes from register to memory. Every 9th bit of the 4 byte9s in register are ignored. |
| 0 | 01 | .8 | Store 8 bytes from register to memory. Every 9th bit of the 8 byte9s in register are ignored. |
| 0 | 10 | .16 | Store 16 bytes from register to memory. Every 9th bit of the 16 byte9s in register are ignored. |
| 0 | 11 | .32 | Store 32 bytes from register to memory. Every 9th bit of the 32 byte9s in register are ignored. |

Table E.19 lists vector store operations supported (encoded in the TT field as ST) in VEC64 mode, which is when VCSR<0> bit is set.

TABLE E.19

REAR Vector Store Operations in VEC32 Mode

| B:D:ST | | | Mnemonic | Meaning |
|---|---|---|---|---|
| 0 | 0 | 00 | .4 | Store 4 bytes from register to memory. Every 9th bit of the 4 byte9s in register are ignored. |
| 0 | 0 | 01 | .8 | Store 8 bytes from register to memory. Every 9th bit of the 8 byte9s in register are ignored. |
| 0 | 0 | 10 | .16 | Store 16 bytes from register to memory. Every 9th bit of the 16 byte9s in register are ignored. |
| 0 | 0 | 11 | .32 | Store 32 bytes from register to memory. Every 9th bit of the 32 byte9s in register are ignored. |
| 1 | 0 | 00 | | undefined |
| 1 | 0 | 01 | | undefined |
| 1 | 0 | 10 | | undefined |
| 1 | 0 | 11 | .64 | Store 64 bytes from register to memory. Every 9th bit of the 64 byte9s in register are ignored. |

Bit B is used to indicate 64 byte vector operation, since the concept of current and alternate bank does not exist in VEC64 mode.

REAI format is used by the load, store and cache operation instructions. Table E.20 shows the meanings of the fields in the REAI format.

TABLE E.20

REAI format

| Field | Meaning |
|---|---|
| Opc<4:0> | Opcode |
| B | Bank identifier from the Rn register. When set in VEC32 mode, Rn<4:0> denotes a vector register number in the alternate bank. When set in VEC64 mode, denotes a full vector (64 byte) operation. |
| D | Destination/source scalar register. When set, Rn<4:0> denotes a scalar register. The legal values for B:D encodings in VEC32 mode are: 00 Rn is a vector register in the current bank 01 Rn is a scalar register (in the current bank) 10 Rn is a vector register in the alternate bank 11 undefined The legal values for B:D encodings in VEC64 mode are: 00 Only 4, 8, 16 or 32 bytes of the vector register Rn is used 01 Rn is a scalar register 10 All 64 bytes of vector register Rn is used 11 undefined |
| TT<1:0> | Transfer Type indicates a specific load or store operation. See the LT and ST encoding tables below. |
| C | Cache off. Set this bit to bypass data cache for load. This bit is set with the cache-off mnemonics of the load & store instructions (concatenate OFF to the mnemonic) |
| A | Address update. Set this bit to update SRb with the effective address. The effective address is calculated as SRb + IMM<7:0>. |
| Rn<4:0> | Destination/source register number. |
| SRb<4:0> | Scalar base register number. |
| IMM<7:0> | An 8-bit immediate offset, interpreted as a two's complement number. |

The REAR and REAI formats use identical encodings for the transfer types. Refer to the REAR format for further encoding detail.

RRRM5 format provides three register or two registers and a 5-bit immediate operands. Table E.21 defines the filed for the RRRM5 format.

TABLE E.21

RRRM5 Format

| Field | Meaning |
|---|---|
| Op<4:0> | Opcode |
| D | Destination scalar register. When set, Rd<4:0> denotes a scalar register. When clear, Rd<4:0> denotes a vector register. |
| S | Scalar Rb register. When set indicates that Rb<4:0> is a scalar register. When clear, Rb<4:0> is a vector register. |
| DS<1:0> | Data Size. The encodings are: 00 byte (used by int8 data type) 01 byte9 (used by int9 data type) 10 halfword (used by int16 data type) 11 word (used by int32 or float data type) |
| M | Modifier for the D:S bits. See the D:S:M encoding table below. |
| Rd<4:0> | Destination D register number. |
| Ra<4:0> | Source A register number. |
| Rb<4:0> or 1M5<4:0> | Source B register number or a 5-bit immediate, determined by the D:S:M encoding. The 5-bit immediate is interpreted as an unsigned number. |

Bits 19:15 are reserved and must be zeros to ensure compatibility with future extensions in the architecture.

All vector register operands refer to the current bank (which could either be bank 0 or bank 1) unless stated otherwise. Table E.22 lists the D:S:M encodings when DS<1:0> is 00, 01 or 10.

TABLE E.22

RRRM5 D:S:M Encodings for DS not equal 11

| Encoding | Rd | Ra | Rb/IMS | Comments |
|---|---|---|---|---|
| 000 | VRd | VRa | VRb | Three vector register operands |
| 001 | | | | undefined |
| 010 | VRd | VRa | sRb | B operand is a scalar register |
| 011 | VRd | VRa | IMS | B operand is a 5bit immediate |
| 100 | | | | undefined |
| 101 | | | | undefined |
| 110 | SRd | SRa | SRb | Three scalar register operands |
| 111 | SRd | SRa | IMS | B operand is 5-bit immediate |

The D:S:M encodings have the following meanings when DS<1:0> is 11:

TABLE E.23

RRRM5 D:S:M Encodings for DS equal 11

| Encoding | Rd | Ra | Rb/IMS | Comments |
|---|---|---|---|---|
| 000 | VRd | VRa | VRb | Three vector register operands (int32) |
| 001 | VRd | VRa | VRb | Three vector register operands (float) |
| 010 | VRd | VRa | SRb | B operand is a scalar register (int32) |
| 011 | VRd | VRa | IMS | B operand is 5-bit immediate (int32) |
| 100 | VRd | VRa | SRb | B operand is a scalar register (float) |
| 101 | SRb | SRa | SRb | Three scalar register operands (float) |
| 110 | SRd | SRa | SRb | Three scalar register operands (int32) |
| 111 | SRd | SRa | 1M5 | B operand is 5-bit immediate (int32) |

RRRR format provides four register operands. Table E.24 shows the fields in the RRRR format.

TABLE E.24

RRRR Format

| Field | Meaning |
|---|---|
| Op<4:0> | Opcode |
| 5 | Scalar Rb register. When set indicates that Rb<4:0> is a scalar register. When clear, Rb<4:0> is a vector register. |
| DS<1:0> | Data Size. The encodings are:<br>00 byte (used by int8 data type)<br>01 byte9 (used by int9 data type)<br>10 halfword (used by int16 data type)<br>11 word (used by int32 or float data type) |
| Rc<4:0> | Source/destination C register number. |
| Rd<4:0> | Destination D register number. |
| Rd<4:0> | Source A register number. |
| Rb<4:0> | Source B register number. |

All vector register operands refer to the current bank (which could either be bank 0 or bank 1) unless stated otherwise.

RI Format is used only by the load immediate instruction. Table E.25 indicates the fields in the RI format.

TABLE E.25

RI Format

| Field | Meaning |
|---|---|
| D | Destination scalar register. When set1 Rd<4:0> denotes a scalar register. When clear1 Rd<4:0> denotes a vector register in the current bank. |
| F | Float data type. When set, denotes the floating point data type, and requires DS<1:0> to be 11. |
| DS<1:0> | Data Size. The encodings are:<br>00 byte (used by int8 data type)<br>01 byte9 (used by int9 data type)<br>10 halfword (used by int16 data type)<br>11 word (used by int32 or float data type) |
| Rd<4:0> | Destination D register number. |
| IMM<18:0> | A 19-bit immediate value. |

Certain encodings of the F:DS<1:0> field are undefined. Programmer should not use these encodings since the architecture does not specify the expected result when such an encoding is used. The value loaded into Rd depends on the data type, as shown in Table E.26.

TABLE E.26

RI Format Loaded Values

| Format | Data type | Register operand |
|---|---|---|
| .b | byte (8-bit) | Rd<7:0>:=Imm<7:0> |
| .b9 | byte9 (9-bit) | Rd<8:0>:=Imm<8:0> |
| .h | halfword (16-bit) | Rd<15:0>:=Imm<15:0> |
| .w | word (32-bit) | Rd<31:0>:=sign − extend Imm<18:0> |
| .f | floating point (32-bit) | Rd<31>:=Imm<18>(sign)<br>Rd<30:23>:=Imm<17:0>(exponent)<br>Rd<22:13>:=Imm<9:0> (mantissa)<br>Rd<12:0>:=zeroes |

CT Format includes the fields shown in Table E.27.

TABLE E.27

CT Format

| Field | Meaning |
|---|---|
| Opa<3:0> | Opcode |
| Cond<2:0> | Branch condition:<br>000 always<br>001 less than<br>010 equal<br>011 less than or equal<br>100 greater than<br>101 not equal<br>110 greater than or equal<br>111 overflow |
| IMM<22:0> | A 23-bit immediate word offset, interpreted as a two's complement number. |

The branch conditions use VCSR[GT:EQ:LT] field. The overflow condition uses the VCSR[SO] bit, which precedes the GT, EQ and LT bits when set. The VCCS and VCBARR interprets the Cond<2:0> field differently than as described detail. Refer to their instruction description detail.

RRRM9 format specifies three registers or two registers and a 9-bit immediate operands. Table E.28 indicates the fields of the RRRM9 format.

TABLE E.28

RRRM9 Format

| Field | Meaning |
|---|---|
| Opc<5:0> | Opcode |
| D | Destination scalar register. When set, Rd<4:0> denotes a scalar register. When clear, Rd<4:0> denotes a vector register. |
| S | Scalar Rb register. When set indicates that Rb<4:0> is a scalar register. When clear, Rb<4:0> is a vector register. |
| DS<1:0> | Data Size. The encodings are:<br>00 byte (used by int8 data type)<br>01 byte9 (used by int9 data type)<br>10 halfword (used by int16 data type)<br>11 word (used by int32 or float data type) |
| M | Modifier for the D:S bits. See the D:S:M encoding table below. |
| Rd<4:0> | Destination register number. |
| Ra<4:0> | Source A register number. |
| Rb<4:0> or IM5<4:0> | Source B register number or a 5-bit immediate, determined by the D:S:M encoding. |
| IM9<3:0> | Together with IMS<4:0> provides a 9-bit immediate, determined by the D:S:M encoding. |

Bits 19:15 are reserved when the D:S:M encoding does not specify an immediate operand and must be zeros to ensure future compatibility.

All vector register operands refer to the current bank (which could either be bank 0 or bank 1) unless stated otherwise. D:S:M encodings are identical to those shown in Tables E.22 and E.23 for the RRRM5 format except that immediate values extracted from the immediate field depends on the DS<1:0> encoding, as shown in Table E.29.

TABLE E.29

Immediate Values in RRRM9 Format

| DS | Matching Data Type | B Operand |
|---|---|---|
| 00 | int8 | Source B<7:0>:=1M9<2:0>:1M5<4:0> |
| 01 | int9 | Source B<8:0>:=1M9<3:0>:1M5<4:0> |
| 10 | int16 | Source B<15:0>:=sex(1M9<3:0>:1M5<4:0>) |
| 11 | int32 | Source B <31:0>:=sex (1M9<3:0>:1M5<4:0>) |

The immediate format is not available with the float data type.

In the following, the MSP vector instructions appear in the alphabetical order. Note:

1. An instruction is affected by the element mask, unless noted otherwise. CT format instructions are not affected by the element mask. REAR and REAI format instructions, which consists of the load, store and cache instructions, are also not affected by the element mask.

2. The 9-bit immediate operand is not available with float data type.

3. In the Operation description, only the vector form is given. For scalar operation, assume only one, the 0th, element is defined.

4. For RRRM5 and RRRM9 formats, the following encodings are used for integer data types (b, b9, h, w):

| D:S:M | 000 | 010 | 011 | 110 | 111 |
|---|---|---|---|---|---|
| DS | 00 | 01 | 10 | 11 | |

5. For RRRM5 and RRRM9 formats, the following encodings are used for float data type:

| D:S:M | 001 | 100 | n/a | 101 | n/a |
|---|---|---|---|---|---|
| DS | | | | 11 | |

6. For all instructions that can cause an overflow, saturation to int8, int9, int16, int32 maximum or minimum limits are applied when VCSR<ISAT> bit is set. Correspondingly, floating point result is saturated to −infinity, −zero, +zero or +infinity when VCSR<FSAT> bit is set.

7. Syntactically, .n may be used instead of .b9 to denote the byte9 data size.

8. For all instructions, the floating point result returned to the destination register or to the vector accumulator is of the IEEE 754 single precision format. The floating point result is written to the lower portion of the accumulator and the upper portion is not modified.

VAAS3 — Add And Add Sign of (-1, 0, 1)

Format

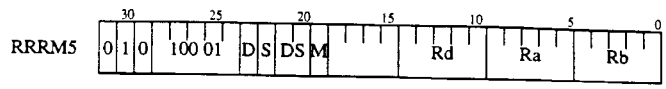

RRRM5  | 0 | 1 | 0 | 100 01 | D | S | DS | M | Rd | Ra | Rb |

Assembler Syntax

VAAS3.dt    VRd, VRa, VRb
VAAS3.dt    VRd, VRa, SKb
VAAS3.dt    SRd, SRa, SRb where dt = {b, b9, h, w}.

Supported Modes

| D:S:M | V <- V @ V | V <- V @ S | | S <- S @ S | |
|---|---|---|---|---|---|
| DS | int8 (b) | int9 (b9) | int16 (h) | int32 (w) | |

Description

The content of vector/scalar register Ra is added to Rb to produce an intermediate result, the intermediate result is then added with the sign of Ra; and the final result stored in vector/scalar register Rd.

Operation

```
for (i = 0 ; i < NumElem && EMASK[i] ; i++) {
    if (Ra[i] > 0)      extsgn3 = 1 ;
    else if (Ra[i] < 0) extsgn3 = -1 ;
    else                extsgn3 = 0 ;
    Rd[i] = Ra[i] + Rb[i] + extsgn3 ;
}
```

Exception

Overflow.

VADAC — Add and Accumulate

Format

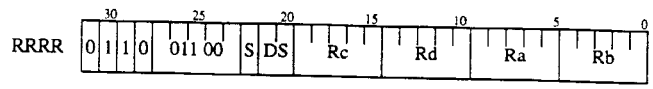

Assembler Syntax

VADAC.dt    VRc, VRd, VRa, VRb
VADAC.dt    SRc, SRd, SRa, SRb where dt = {b, b9, h, w}.

Supported Modes

| S | VR | SR | | |
|---|---|---|---|---|
| DS | int8 (b) | int9 (b9) | int16 (h) | int32 (w) |

Description

Add each element of Ra and Rb operands with each double precision element of vector accumulator; store the double precision sum of each element to both the vector accumulator and destination registers Rc and Rd. The Ra and Rb use the specified data type, where as the VAC use the appropriate double precision data type (16, 18, 32 and 64 bits for int8, int9, int16 and int32, respectively). The upper portions of each double precision element are stored in VACH and Rc. If Rc = Rd, the result in Rc is undefined.

Operation

```
for (i = 0 ; i < NumElem && EMASK[i] ; i++) {
    Aop[i] = {VRa[i] || SRa} ;
    Bop[i] = {VRb[i] || SRb} ;
    VACH[i]:VACL[i] = sex(Aop[i] + Bop[i]) + VACH[i]:VACL[i] ;
    Rc[i] = VACH[i] ;
    Rd[i] = VACL[i] ;
}
```

VADACL         Add and Accumulate Low

Format

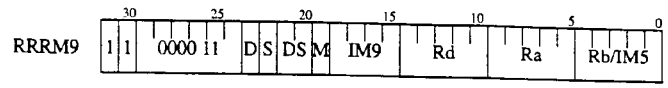

Assembler Syntax

| | |
|---|---|
| VADACL.dt | VRd, VRa, VRb |
| VADACL.dt | VRd, VRa, SRb |
| VADACL.dt | VRd, VRa, #IMM |
| VADACL.dt | SRd, SRa, SRb |
| VADACL.dt | SRd, SRa, #IMM | where dt = {b, b9, h, w}.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Add each element of Ra and Rb/immediate operands with each extended precision element of the vector accumulator; store the extended precision sum to the vector accumulator; return the lower precision to the destination register Rd. The Ra and Rb/immediate use the specified data type, where as the VAC use the appropriate double precision data type (16, 18, 32 and 64 bits for int8, int9, int16 and int32, respectively). The upper portions of each extended precision element are stored in VACH.

Operation

```
for (i = 0 ; i < NumElem && EMASK[i] ; i++) {
    Bop[i] = {VRb[i] || SRb || sex(IMM<8:0>)} ;
    VACH[i]:VACL[i] = sex(Ra[i] + Bop[i]) + VACH[i]:VACL[i] ;
    Rd[i] = VACL[i] ;
}
```

VADD — Add

Format

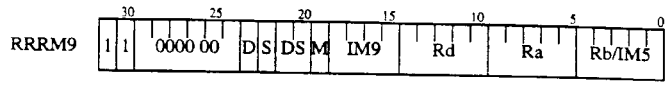

RRRM9

Assembler Syntax

```
VADD.dt    VRd, VRa, VRb
VADD.dt    VRd, VRa, SRb
VADD.dt    VRd, VRa, #IMM
VADD.dt    SRd, SRa, SRb
VADD.dt    SRd, SRa, #IMM
``` where dt = {b, b9, h, w, f}.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | float (f) |

Description

Add Ra and Rb/immediate operands and return the sum to the destination register Rd.

Operation

```
for (i = 0 ; i < NumElem && EMASK[i] ; i++) {
    Bop[i] = {VRb[i] || SRb || sex(IMM<8:0>)} ;
    Rd[i] = Ra[i] + Bop[i] ;
}
```

Exception

Overflow, Floating point invalid operand.

VADDH      Add Two Adjacent Elements

Format

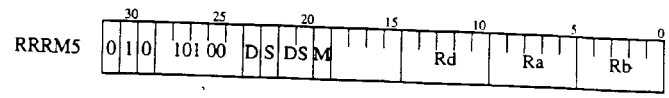

Assembler Syntax

VADDH.dt     VRd, VRa, VRb
    VADDH.dt     VRd, VRa, SRb where dt = {b, b9, h, w, f}.

Supported Modes

| D:S:M | V <- V @ V | V <- V @ S | | | |
|---|---|---|---|---|---|
| DS | int8 (b) | int9 (b9) | int16 (h) | int32 (w) | float (f) |

Description

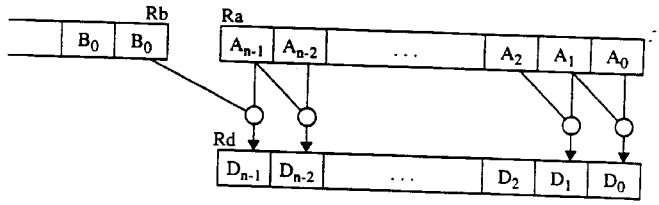

Operation

```
for (i = 0 ; i < NumElem -1 ; i++) {
    Rd[i] = Ra[i] + Ra[i+1] ;
}
Rd[NumElem-1] = Ra[NumElem-1] + {VRb[0] || SRb} ;
```

Exception

Overflow, Floating point invalid operand.

Programming Note

This instruction is not affected by the element mask.

-98-

VAND      AND

Format

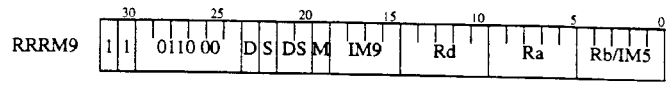

RRRM9

Assembler Syntax

| VAND.dt | VRd, VRa, VRb |
| VAND.dt | VRd, VRa, SRb |
| VAND.dt | VRd, VRa, #IMM |
| VAND.dt | SRd, SRa, SRb |
| VAND.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically AND Ra and Rb/immediate operands and return the result to the destination register Rd.

Operation

```
for (i = 0 ; i < NumElem && EMASK[i] ; i++) {
    Bop[i] = {VRb[i] || SRb || sex(IMM<8:0>)} ;
    Rd[i]<k> = Ra[i]<k> & Bop[i]<k>, k = for all bits in element i ;
}
```

Exception

None.

VANDC     AND Complement

Format

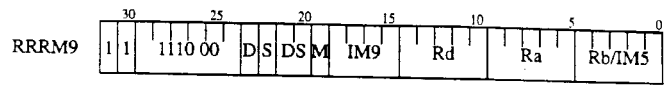

RRRM9

Assembler Syntax

| VANDC.dt | VRd, VRa, VRb |
|---|---|
| VANDC.dt | VRd, VRa, SRb |
| VANDC.dt | VRd, VRa, #IMM |
| VANDC.dt | SRd, SRa, SRb |
| VANDC.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically AND Ra and complement of Rb/immediate operands and return the result to the destination register Rd.

Operation

```
for (i = 0 ; i < NumElem && EMASK[i] ; i++) {
    Bop[i] = {VRb[i] || SRb || sex(IMM<8:0>)} ;
    Rd[i]<k> = Ra[i]<k> & ~Bop[i]<k>, k = for all bits in element i ;
}
```

Exception

None.

VASA — Arithmetic Shift Accumulator

Format

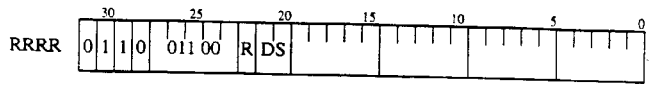

RRRR

Assembler Syntax

VASAL.dt
VASAR.dt where dt = {b, b9, h, w} and R denotes the shift direction of left or right.

Supported Modes

| R | left | right | | |
|---|---|---|---|---|
| DS | int8 (b) | int9 (b9) | int16 (h) | int32 (w) |

Description

Each data element of the vector accumulator register is shifted to the left by one bit position with zero filling in from the right (if R=0) or to the right by one bit position with sign-extension (if R=1). The result is stored in the vector accumulator.

Operation

```
for (i = 0 ; i < NumElem && EMASK[i] ; i++) {
    if (R == 1)
        VAC0H[i]:VAC0L[i] = VAC0H[i]:VAC0L[i] sign>> 1 ;
    else
        VAC0H[i]:VAC0L[i] = VAC0H[i]:VAC0L[i] << 1 ;
}
```

Exception

Overflow.

VASL — Arithmetic Shift Left

Format

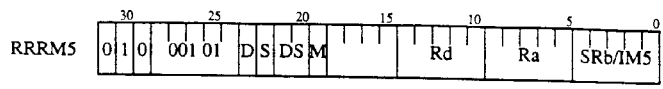

Assembler Syntax

VASL.dt    VRd, VRa, SRb
VASL.dt    VRd, VRa, #IMM
VASL.dt    SRd, SRa, SRb
VASL.dt    SRd, SRa, #IMM where dt = {b, b9, h, w}.

Supported Modes

| D:S:M | | V <- V @ S | V <- V @ I | S <- S @ S | S <- S @ I |
|---|---|---|---|---|---|
| DS | int8 (b) | int9 (b9) | int16 (h) | int32 (w) | |

Description

Each data element of vector/scalar register Ra is shifted to the left, with zero filling in from the right, by the shift amount given in the scalar register Rb or IMM field and the result is stored in vector/scalar register Rd. For those elements that incur overflow, the result is saturated to the most positive or most negative value, depending on their sign. The shift amount is defined to be *unsigned* integer.

Operation

```
shift_amount = {SRb % 32 || IMM<4:0>} ;
for (i = 0 ; i < NumElem && EMASK[i] ; i++) {
    Rd[i] = saturate(Ra[i] << shift_amount) ;
}
```

Exception

None

Programming Note

Note that the shift_amount is taken as a 5-bit number from SRb or IMM<4:0>. For the byte, byte9, halfword data types, the programmer is responsible for correctly specifying the shift amount that is less than or equal to the number of bits in the data size. If the shift amount is larger than the specified data size, the elements will be filled with zeroes.

VASR — Arithmetic Shift Right

Format

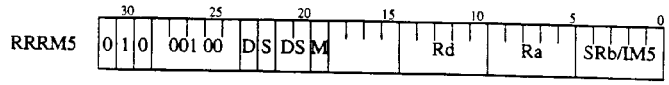

Assembler Syntax

| | |
|---|---|
| VASR.dt | VRd, VRa, SRb |
| VASR.dt | VRd, VRa, #IMM |
| VASR.dt | SRd, SRa, SRb |
| VASR.dt | SRd, SRa, #IMM | where dt = {b, b9, h, w}.

Supported Modes

| D:S:M | | V <- V @ S | V <- V @ I | S <- S @ S | S <- S @ I |
|---|---|---|---|---|---|
| DS | int8 (b) | int9 (b9) | int16 (h) | int32 (w) | |

Description

Each data element of vector/scalar register Ra is arithmetically shifted to the right, with sign-extended in at the Most-Significant-Bit locations, by the shift amount given in the Least-Significant-Bit of scalar register Rb or IMM field and the result is stored in vector/scalar register Rd. The shift amount is defined to be *unsigned* integer.

Operation

```
shift_amount = {SRb % 32 || IMM<4:0>} ;
for (i = 0 ; i < NumElem && EMASK[i] ; i++) {
    Rd[i] = Ra[i] sign>> shift_amount ;
}
```

Exception

None.

Programming Note

Note that the shift_amount is taken as a 5-bit number from SRb or IMM<4:0>. For the byte, byte9, halfword data types, the programmer is responsible for correctly specifying the shift amount that is less than or equal to the number of bits in the data size. If the shift amount is larger than the specified data size, the elements will be filled with the sign bits.

Format

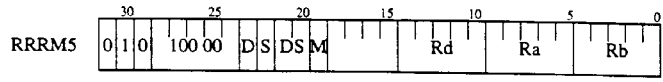

Assembler Syntax

VASS3.dt    VRd, VRa, VRb
VASS3.dt    VRd, VRa, SRb
VASS3.dt    SRd, SRa, SRb where dt = {b, b9, h, w}.

Supported Modes

| D:S:M | V <- V @ V | V <- V @ S | | S <- S @ S | |
|-------|------------|------------|----------|------------|--|
| DS    | int8 (b)   | int9 (b9)  | int16 (h)| int32 (w)  |  |

Description

The content of vector/scalar register Ra is added to Rb to produce an intermediate result, the sign of Ra is then subtracted from the intermediate result; and the final result stored in vector/scalar register Rd.

Operation

```
for (i = 0 ; i < NumElem && EMASK[i] ; i++) {
    if (Ra[i] > 0)      extsgn3 = 1 ;
    else if (Ra[i] < 0) extsgn3 = -1 ;
    else                extsgn3 = 0 ;
    Rd[i] = Ra[i] + Rb[i] - extsgn3 ;
}
```

Exception

Overflow.

VASUB — Absolute Of Subtract

Format

RRRM9 | 1 1 001000 D S DS M IM9 Rd Ra Rb/IM5

Assembler Syntax

| | |
|---|---|
| VASUB.dt | VRd, VRa, VRb |
| VASUB.dt | VRd, VRa, SRb |
| VASUB.dt | VRd, VRa, #IMM |
| VASUB.dt | SRd, SRa, SRb |
| VASUB.dt | SRd, SRa, #IMM | where dt = {b, b9, h, w, f}.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | float (f) |

Description

The content of vector/scalar register Rb or IMM field is subtracted from the content of vector/scalar register Ra and the absolute result is stored in vector/scalar register Rd.

Operation

```
for (i = 0 ; i < NumElem && EMASK[i] ; i++) {
    Bop[i] = {Rb[i] || SRb || sex(IMM<8:0>)} ;
    Rd[i] = | Ra[i] - Bop[i] | ;
}
```

Exception

Overflow, Floating point invalid operand.

Programming Note

If the result of subtraction is the most negative number, then an overflow will occur after the absolute operation. If saturation mode is enabled, the result of absolute operation will be the most positive number.

VAVG — Average Two Elements

Format

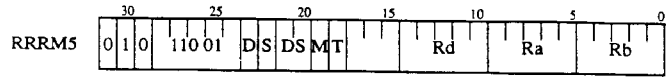

RRRM5 | 0 1 0 | 110 01 | D S | DS | M | T | Rd | Ra | Rb

Assembler Syntax

VAVG.dt     VRd, VRa, VRb
VAVG.dt     VRd, VRa, SRb
VAVG.dt     SRd, SRa, SRb where dt = {b, b9, h, w, f}. Use VAVGT to specify "truncate" rounding mode for integer data types.

Supported Modes

| D:S:M | V <- V @ V | V <- V @ S |  | S <- S @ S |  |
|---|---|---|---|---|---|
| DS | int8 (b) | int9 (b9) | int16 (h) | int32 (w) | float (f) |

Description

The content of vector/scalar register Ra is added to the content of vector/scalar register Rb to produce an intermediate result; the intermediate result is then divided by 2 and the final result is stored in vector/scalar register Rd. For integer data types, the rounding mode is truncate if T=1 and round away from zero if T=0 (default). For the float data type, the rounding mode is specified in VCSR<RMODE>.

Operation

```
for (i = 0 ; i < NumElem && EMASK[i] ; i++) {
    Bop[i] = {Rb[i] || SRb || sex(IMM<8:0>)} ;
    Rd[i] = (Ra[i] + Bop[i]) // 2;
}
```

Exception

None.

| VAVGH | Average Two Adjacent Elements |

Format

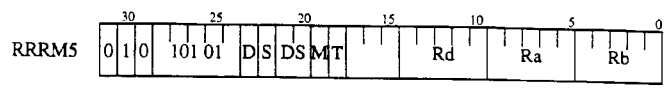

Assembler Syntax

VAVGH.dt    VRd, VRa, VRb
    VAVGH.dt    VRd, VRa, SRb where dt = {b, b9, h, w, f}. Use VAVGHT to specify "truncate" rounding mode for integer data types.

Supported Modes

| D:S:M | V <- V @ V | V <- V @ S | | | |
|---|---|---|---|---|---|
| DS | int8 (b) | int9 (b9) | int16 (h) | int32 (w) | float (f) |

Description

For each element, average two adjacent pair of elements. For integer data types, the rounding mode is truncate if T=1 and round away from zero if T=0 (default). For the float data type, the rounding mode is specified in VCSR<RMODE>.

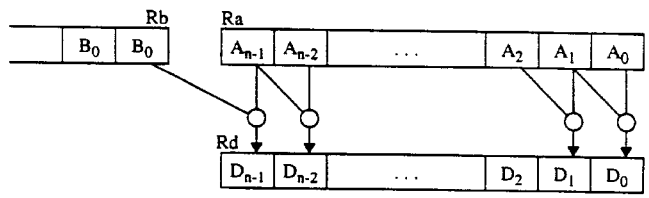

Operation

```
for (i = 0 ; i < NumElem -1 ; i++) {
    Rd[i] = (Ra[i] + Ra[i+1]) // 2;
}
Rd[NumElem-1] = (Ra[NumElem-1] + {VRb[0] || SRb}) // 2 ;
```

Exception

None.

Programming Note

This instruction is not affected by the element mask.

VAVGQ  Average Quad

Format

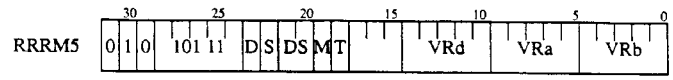

Assembler Syntax

VAVGQ.dt   VRd, VRa, VRb where dt = {b, b9, h, w}. Use VAVGQT to specify "truncate" rounding mode for integer data types.

Supported Modes

| D:S:M | V <- V @ V | | | |
|---|---|---|---|---|
| DS | int8 (b) | int9 (b9) | int16 (h) | int32 (w) |

Description

This instruction is not supported in the VEC64 mode.

Calculate the average of four elements, as shown in the diagram below, using the specified rounding mode in T (1 for truncate and 0 for round away from zero, the default). Note that the left most element ($D_{n-1}$) is undefined.

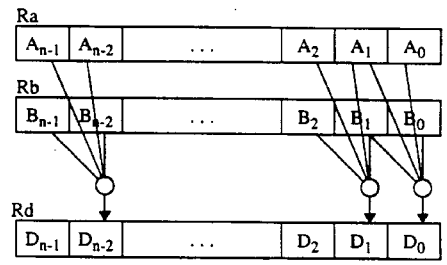

Operation

```
for (i = 0 ; i < NumElem-1 ; i++) {
    Rd[i] = (Ra[i] + Rb[i] + Ra[i+1] + Rb[i+1]) // 4;
}
```

Exception

None.

VCACHE — Cache Operation

Format

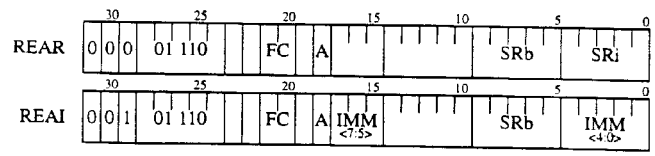

Assembler Syntax

VCACHE.fc  SRb, SRi
VCACHE.fc  SRb, #IMM
VCACHE.fc  SRb+, SRi
VCACHE.fc  SRb+, #IMM where fc = {0, 1}.

Description

This instruction is provided for software management of the vector data cache. When a portion or all of the data cache is configured as scratch pad, this instruction has no affect on the scratch pad.

The following options are supported:

| FC<2:0> | Meaning |
|---|---|
| 000 | Writeback and invalidate the dirty cache line ~~specified by~~ whose tag matches the EA. If the matching line contains clean data, the line is invalidated without the writeback. If no cache line is found to contain the EA, the data cache remains intact. |
| 001 | Writeback and invalidate the dirty cache line specified by the index of the EA. If the matching line contains clean data, the line is invalidated without the writeback. |
| others | *undefined* |

Operation

Exception

None.

Programming Note

This instruction is not affected by the element mask.

VCAND — Complement AND

Format

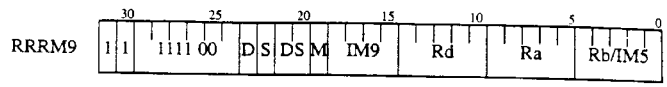

RRRM9

Assembler Syntax

| | |
|---|---|
| VCAND.dt | VRd, VRa, VRb |
| VCAND.dt | VRd, VRa, SRb |
| VCAND.dt | VRd, VRa, #IMM |
| VCAND.dt | SRd, SRa, SRb |
| VCAND.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically AND complement of Ra and Rb/immediate operands and return the result to the destination register Rd.

Operation

```
for (i = 0 ; i < NumElem && EMASK[i] ; i++) {
    Bop[i] = {VRb[i] || SRb || sex(IMM<8:0>)} ;
    Rd[i]<k> = ~Ra[i]<k> & Bop[i]<k>, k = for all bits in element i ;
}
```

Exception

None.

VCBARR — Conditional Barrier

Format

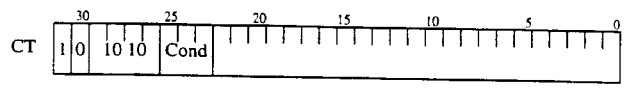

Assembler Syntax

VCBARR.cond where cond = {0 - 7}. Each condition will later be given a mnemonic.

Description

Stall the instruction and all later instructions (those that appear later in the program order) as long as the condition holds. The Cond<2:0> field is interpreted differently than the other conditional instructions in the CT format.

The following conditions are *currently* defined :

| Cond<2:0> | Meaning |
|---|---|
| 000 | Wait for all earlier instructions (those that appear earlier in the program order) to complete execution before executing any of the later instructions. |
| others | *undefined* |

Operation while (Cond == true)
    stall all later instructoins ;

Exception

None.

Programming Note

This instruction is provided for software to enforce serialization of instruction execution. This instruction can be used to force precise reporting of an imprecise exception. For instance, if this instruction is used immediately after an arithmetic instruction that could cause an exception, the exception will be reported with the program counter addressing this instruction.

| VCBR | Conditional Branch |
Format
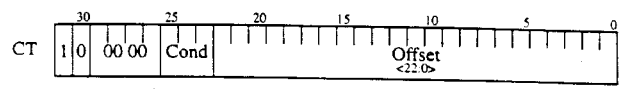
Assembler Syntax
VCBR.cond   #Offset
where cond = {un, lt, eq, le, gt, ne, ge, ov}.
Description
Branch if Cond is true. This is not a delayed branch.
Operation
If ( (Cond == VCSR[SO,GT,EQ,LT]) | (Cond == un) )
    VPC = VPC + sex(Offset<22:0> * 4);
else VPC = VPC + 4;
Exception
Invalid instruction address.

VCBRI — Conditional Branch Indirect
Format
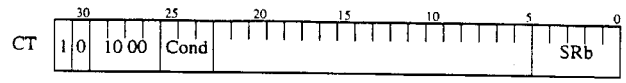
CT | 1 0 | 10 00 | Cond | | SRb
Assembler Syntax
VCBRI.cond  SRb
where cond = {un, lt, eq, le, gt, ne, ge, ov}.
Description
Branch indirect if Cond is true. This is not a delayed branch.
Operation
If ( (Cond == VCSR[SO,GT,EQ,LT]) | (Cond == un) )
   VPC = SRb<31:2> : b'00 ;
else VPC = VPC + 4;
Exception
Invalid instruction address.

| VCCS | Conditional Context Switch |
|---|---|

Format

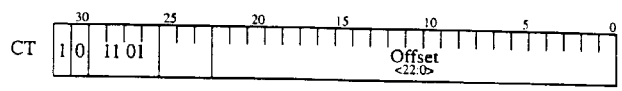

Assembler Syntax

VCCS     #Offset

Description

Jump to context switch subroutine if VIMSK<cse> is true. This is not a delayed branch.

If VIMSK<cse> is true, VPC + 4 (the return address) is saved onto the return address stack. If not, the execution continues with VPC + 4.

Operation

```
If (VIMSK<cse> == 1) {
    if (VSP<4> > 15) {
        VISRC<RASO> = 1 ;
        signal ARM7 with RASO exception ;
        VP_STATE = VP_IDLE ;
    } else {
        RSTACK[VSP<3:0>] = VPC + 4 ;
        VSP<4:0> = VSP<4:0> + 1 ;
        VPC = VPC + sex(Offset<22:0> * 4) ;
    }
} else VPC = VPC + 4;
```

Exception

Return address stack overflow.

VCHGCR — Change Control Register

Format

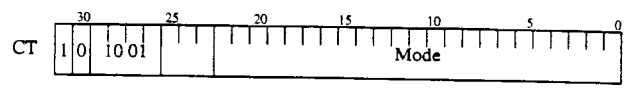

Assembler Syntax

VCHGCR    Mode

Description

This instruction changes the operating mode of the vector processor.

Each bit in Mode specify the following:

| Mode | Meaning |
|---|---|
| bit 1:0 | These two bits control the VCSR<CBANK> bit. The encodings specify:<br>00 - do not change<br>01 - clear VCSR<CBANK> bit<br>10 - set VCSR<CBANK> bit<br>11 - toggle VCSR<CBANK> bit |
| bits 3:2 | These two bits control the VCSR<SMM> bit. The encodings specify:<br>00 - do not change<br>01 - clear VCSR<SMM> bit<br>10 - set VCSR<SMM> bit<br>11 - toggle VCSR<SMM> bit |
| bit 5:4 | These two bits control the VCSR<CEM> bit. The encodings specify:<br>00 - do not change<br>01 - clear VCSR<CEM> bit<br>10 - set VCSR<CEM> bit<br>11 - toggle VCSR<CEM> bit |
| others | *undefined* |

Operation

Exception

None.

Programming Note

This instruction is provided for hardware to change the control bits in VCSR in a more efficient manner than possible with a VMOV instruction.

| VCINT | Conditional Interrupt ARM7 |

Format

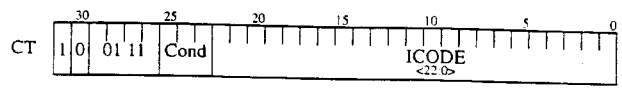

Assembler Syntax

VCINT.cond   #ICODE where cond = {un, lt, eq, le, gt, ne, ge, ov}.

Description

If Cond is true, halt execution and interrupt ARM7, if enabled.

Operation

```
If ( (Cond == VCSR[SO,GT,EQ,LT]) | (Cond == un) ) {
    VISRC<vip> =    1 ;
    VIINS = [VCINT.cond #ICODE instruction] ;
    VEPC = VPC;
    if (VIMSK<vie> == 1) signal ARM7 interrupt ;
    VP_STATE = VP_IDLE;
}
else VPC = VPC + 4;
```

Exception

VCINT interrupt.

VCJOIN — Conditional Join With ARM7 Task

Format

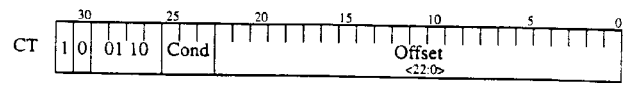

Assembler Syntax

VCJOIN.cond #Offset where cond = {un, lt, eq, le, gt, ne, ge, ov}.

Description

If Cond is true, halt execution and interrupt ARM7, if enabled.

Operation

```
If ( (Cond == VCSR[SO,GT,EQ,LT]) | (Cond == un) ) {
    VISRC<vjp> = - 1;
    VIINS = [VCJOIN.cond #Offset instruction] ;
    VEPC = VPC;
    if (VIMSK<vje> == 1) signal ARM7 interrupt ;
    VP_STATE = VP_IDLE;
}
else VPC = VPC + 4;
```

Exception

VCJOIN interrupt.

VCJSR — Conditional Jump to Subroutine

Format

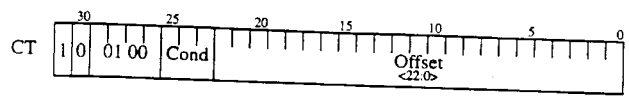

Assembler Syntax

VCJSR.cond  #Offset where cond = {un, lt, eq, le, gt, ne, ge, ov}.

Description

Jump to subroutine if Cond is true. This is not a delayed branch.

If Cond is true, VPC + 4 (the return address) is saved onto the return address stack. If not, the execution continues with VPC + 4.

Operation

```
If ( (Cond == VCSR[SO,GT,EQ,LT]) | (Cond == un) ) {
    if (VSP<4> > 15) {
        VISRC<RASO> = 1 ;
        signal ARM7 with RASO exception ;
        VP_STATE = VP_IDLE ;
    } else {
        RSTACK[VSP<3:0>] = VPC + 4 ;
        VSP<4:0> = VSP<4:0> + 1 ;
        VPC = VPC + sex(Offset<22:0> * 4) ;
    }
} else VPC = VPC + 4;
```

Exception

Return address stack overflow.

VCJSRI — Conditional Jump to Subroutine Indirect

Format

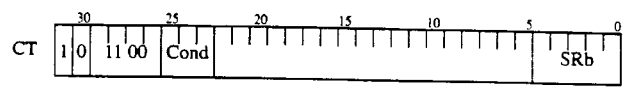

Assembler Syntax

VCJSRI.cond SRb where cond = {un, lt, eq, le, gt, ne, ge, ov}.

Description

Jump indirect to subroutine if Cond is true. This is not a delayed branch.

If Cond is true, VPC + 4 (the return address) is saved onto the return address stack. If not, the execution continues with VPC + 4.

Operation

```
If ( (Cond == VCSR[SO,GT,EQ,LT]) | (Cond == un) ) {
    if (VSP<4:0> > 15) {
        VISRC<RASO> = 1 ;
        signal ARM7 with RASO exception ;
        VP_STATE = VP_IDLE ;
    } else {
        RSTACK[VSP<3:0>] = VPC + 4 ;
        VSP<4:0> = VSP<4:0> + 1 ;
        VPC = SRb<31:2> : b'00 ;
    }
} else VPC = VPC + 4;
```

Exception

Return address stack overflow.

VCMOV — Conditional Move

Format

RRRM9* 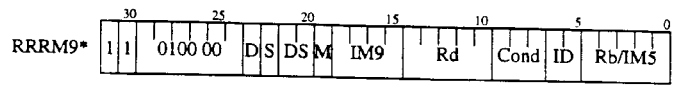

Assembler Syntax

VCMOV.dt    Rd, Rb, cond
VCMOV.dt    Rd, #IMM, cond where dt = {b, b9, h, w, f}, cond = {un, lt, eq, le, gt, ne, ge, ov}. Note that .f and .w specify the same operation, except that the .f data type is not supported with 9-bit immediate operand.

Supported Modes

| D:S:M | V <- V | V <- S | V <- I | S <- S | S <- I |
|---|---|---|---|---|---|
| DS | int8 (b) | int9 (b9) | int16 (h) | int32 (w) | |

Description

If Cond is true, the content of register Rb is moved to register Rd. The ID<1:0> further specifies the source and destination registers:

VR     current bank vector register
SR     scalar register
SY     synchronization register
VAC    vector accumulator register (refer to VMOV description for VAC register encoding)

| D:S:M | ID<1:0> = 00 | ID<1:0> = 01 | ID<1:0> = 10 | ID<1:0> = 11 |
|---|---|---|---|---|
| V <- V | VR <- VR | VR <- VAC | VAC <- VR | |
| V <- S | VR <- SR | | VAC <- SR | |
| V <- I | VR <- I | | | |
| S <- S | SR <- SR | | | |
| S <- I | SR <- I | | | |

Operation

If ( (Cond == VCSR[SOV,GT,EQ,LT]) | (Cond == un) )
    for (i = 0 ; i < NumElem ; i++)
        Rd[i] = {Rb[i] || SRb || sex(IMM<8:0>)} ;

Exception

None.

Programming Note

This instruction is not affected by the element mask - VCMOVM is affected by the element mask.

The extended floating point precision representation in the vector accumulator uses all 576 bits for the 8 elements. Therefore, a vector register move involving the accumulator must specify the .b9 data size.

VCMOVM — Conditional Move With Element Mask

Format

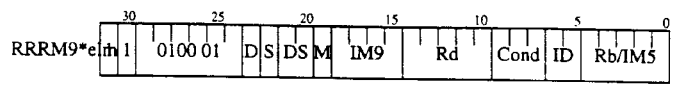

Assembler Syntax

VCMOVM.dt Rd, Rb, cond
VCMOVM.dt Rd, #IMM, cond where dt = {b, b9, h, w, f}, cond = {un, lt, eq, le, gt, ne, ge, ov}. Note that .f and .w specify the same operation, except that .f data type is not supported with 9-bit immediate operand.

Supported Modes

| D:S:M | V <- V | V <- S | V <- I | | |
|---|---|---|---|---|---|
| DS | int8 (b) | int9 (b9) | int16 (h) | int32 (w) | |

Description

The content of register Rb is moved to register Rd if Cond is true. The ID<1:0> further specifies the source and destination registers:

VR        current bank vector register
SR        scalar register
VAC       vector accumulator register (refer to VMOV description for VAC register encoding)

| D:S:M | ID<1:0> = 00 | ID<1:0> = 01 | ID<1:0> = 10 | ID<1:0> = 11 |
|---|---|---|---|---|
| V <- V | VR <- VR | VR <- VAC | VAC <- VR | |
| V <- S | VR <- SR | | VAC <- SR | |
| V <- I | V <- I | | | |
| S <- S | | | | |
| S <- I | | | | |

Operation

```
If ( (Cond == VCSR[SO,GT,EQ,LT]) | (Cond == un) )
    for (i = 0 ; i < NumElem && MMASK[i] ; i++)
        Rd[i] = {Rb[i] || SRb || sex(IMM<8:0>)} ;
```

Exception

None.

Programming Note

This instruction is affected by the VMMR element mask - VCMOV is not affected by the element mask.

The extended floating point precision representation in the vector accumulator uses all 576 bits for the 8 elements. Therefore, a vector register move involving the accumulator must specify the .b9 data size.

VCMPV — Compare And Set Mask

Format

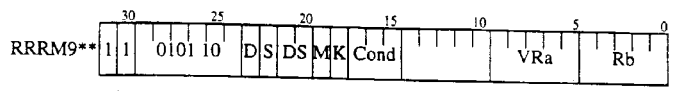

Assembler Syntax

VCMPV.dt    VRa, VRb, cond, mask
VCMPV.dt    VRa, SRb, cond, mask where dt = {b, b9, h, w, f}, cond = {lt, eq, le, gt, ne, ge}, mask = {VGMR, VMMR}. If no mask is specified, VGMR is assumed.

Supported Modes

| D:S:M | M <- V @ V | M <- V @ S | | | |
|---|---|---|---|---|---|
| DS | int8 (b) | int9 (b9) | int16 (h) | int32 (w) | float (f) |

Description

The contents of vector registers VRa and VRb are compared element wise by performing subtract operation (VRa[i] - VRb[i]), and the corresponding bit #i in the VGMR (if K=0) or VMMR (if K=1) register is set if the result of the comparison matched the Cond field of the VCMPV instruction. For example, if the Cond field is less than (LT), the VGMR[i] (or VMMR[i]) bit will be set if VRa[i] < VRb[i].

Operation

```
for (i = 0 ; i < NumElem ; i++) {
    Bop[i] = {Rb[i] || SRb || sex(IMM<8:0>)} ;
    relationship[i] = Ra[i] ? Bop[i] ;
    if (K == 1)
        MMASK[i] = (relationship[i] == Cond) ? True : False ;
    else
        EMASK[i] = (relationship[i] == Cond) ? True : False ;
}
```

Exception

None.

Programming Note

This instruction is not affected by the element mask.

VCNTLZ  Count Leading Zeroes

Format

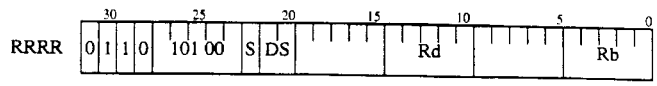

Assembler Syntax

VCNTLZ.dt    VRd, VRb
VCNTLZ.dt    SRd, SRb where dt = {b, b9, h, w}.

Supported Modes

| S | V <- V | S <- S | | |
|---|---|---|---|---|
| DS | int8 (b) | int9 (b9) | int16 (h) | int32 (w) |

Description

For each element in Rb, count the number of leading zeroes; return the count in Rd.

Operation

```
for (i = 0 ; i < NumElem && EMASK[i] ; i++) {
    Rd[i] = number of leading zeroes (Rb[i]) ;
}
```

Exception

None.

Programming Note

If all bits in an element are zeroes, then the result is equal to the element size (8, 9, 16 or 32 for byte, byte9, halfword or word, respectively).

The count of leading zeroes has an inverse relationship with the index of element positions (if used after the VCMPR instruction). To convert to an element position, subtract the result of VCNTLZ from NumElem for the given data type.

VCOR — Complement OR

Format

RRRM9 | 1 1 1111 11 | D | S | DS | M | IM9 | Rd | Ra | Rb/IM5

(bit positions: 30, 25, 20, 15, 10, 5, 0)

Assembler Syntax

| VCOR.dt | VRd, VRa, VRb |
| VCOR.dt | VRd, VRa, SRb |
| VCOR.dt | VRd, VRa, #IMM |
| VCOR.dt | SRd, SRa, SRb |
| VCOR.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically OR complement of Ra and Rb/immediate operands and return the result to the destination register Rd.

Operation

```
for (i = 0 ; i < NumElem && EMASK[i] ; i++) {
    Bop[i] = {VRb[i] || SRb || sex(IMM<8:0>)} ;
    Rd[i]<k> = ~Ra[i]<k> | Bop[i]<k>, k = for all bits in element i ;
}
```

Exception

None.

VCRSR             Conditional Return From Subroutine

Format

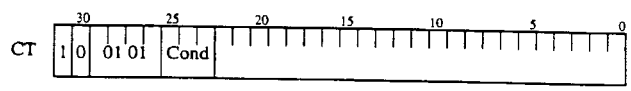

Assembler Syntax

VCRSR.cond where cond = {un, lt, eq, le, gt, ne, ge, ov}.

Description

Return from subroutine if Cond is true. This is not a delayed branch.

If Cond is true, execution continues from the return address saved in the return address stack. If not, the execution continues with VPC + 4.

Operation

```
If ( (Cond == VCSR[SO,GT,EQ,LT]) | (Cond == un) ) {
    if (VSP<4:0> == 0) {
        VISRC<RASU> = 1 ;
        signal ARM7 with RASU exception ;
        VP_STATE = VP_IDLE ;
    } else {
        VSP<4:0> = VSP<4:0> - 1 ;
        VPC = RSTACK[VSP<3:0>] ;
        VPC<1:0> = b'00 ;
    }
} else VPC = VPC + 4;
```

Exception

Invalid instruction address, return address stack underflow.

VCVTB9 — Convert Byte9 Data Type

Format

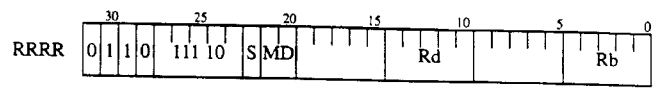

Assembler Syntax

VCVTB9.md VRd, VRb
VCVTB9.md SRd, SRb where md = {bb9, b9h, hb9}.

Supported Modes

| S  | V <- V | S <- S |     |     |
|----|--------|--------|-----|-----|
| MD | bb9    |        | b9h | hb9 |

Description

Each element in Rb is converted from byte to byte9 (bb9), byte9 to halfword (b9h) or halfword to byte9 (hb9).

Operation

```
if (md<1:0> == 0) {            // bb9 for byte to byte9 conversion
    VRd = VRb ;
    VRd<9i+8> = VRb<9i+7>, i = 0 to 31 (or 63 in VEC64 mode) }
else if (md<1:0> == 2) {       // b9h for byte9 to halfword conversion
    VRd = VRb ;
    VRd<18i+16 : 18i+9> = VRb<18i+8>, i = 0 to 15 (or 31 in VEC64 mode) }
else if (md<1:0> == 3)         // hb9 for halfword to byte9 conversion
    VRd<18i+8> = VRb<18i+9>, i = 0 to 15 (or 31 in VEC64 mode)
else VRd = undefined ;
```

Exception

None.

Programming Note

Before using this instruction with the b9h mode, programmer is required to adjust for the decreased number of elements in the vector register with a shuffle operation.
After using this instruction with the hb9 mode, programmer is required to adjust for the increased number of elements in the destination vector register with an unshuffle operation. This instruction is not affected by the element mask.

VCVTFF — Convert Floating Point To Fixed Point

Format

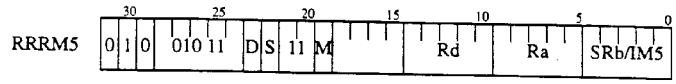

Assembler Syntax

| | |
|---|---|
| VCVTFF | VRd, VRa, SRb |
| VCVTFF | VRd, VRa, #IMM |
| VCVTFF | SRd, SRa, SRb |
| VCVTFF | SRd, SRa, #IMM |

Supported Modes

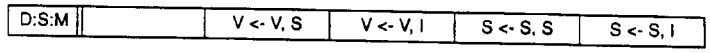

Description

The contents of vector/scalar register Ra is converted from 32-bit floating point to a fixed point real number of the format <X.Y>, where the width of Y is specified by Rb (modulo 32) or the IMM field and the width of X is defined by (32 - width of Y). The X denotes the integer part, and the Y denotes the fraction part. The result is stored in the vector/scalar register Rd.

Operation

```
Y_size = { SRb % 32 || IMM<4:0> } ;
for (i = 0 ; i < NumElem ; i++) {
    Rd[i] = convert to <32-Y_size.Y_size> format (Ra[i]) ;
}
```

Exception

Overflow.

Programming Note

This instruction supports only the word data size. This instruction does not use the element mask since the architecture does not support multiple data types within a register. This instruction uses the round away from zero rounding mode for the integer data types.

VCVTIF — Convert Integer To Floating Point

Format

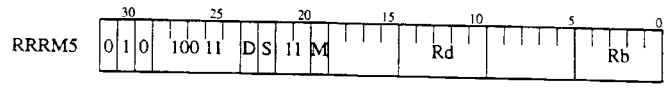

RRRM5 | 0 1 0 | 100 11 | D S | 11 | M | Rd | Rb

Assembler Syntax

VCVTIF  VRd, VRb
VCVTIF  VRd, SRb
VCVTIF  SRd, SRb

Supported Modes

| D:S:M | V <- V | V <- S | | S <- S | |
|---|---|---|---|---|---|

Description

The content of vector/scalar register Rb is converted from the int32 to float data type and the result is stored in vector/scalar register Rd.

Operation

```
for (i = 0 ; i < NumElem ; i++) {
    Rd[i] = convert to floating point format (Rb[i]) ;
}
```

Exception

None.

Programming Note

This instruction supports only the word data size. This instruction does not use the element mask since the architecture does not support multiple data types within a register.

VD1CBR — Decrement VCR1 And Conditional Branch

Format

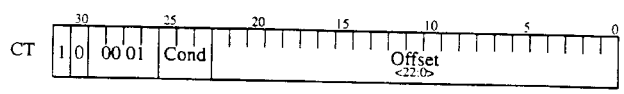

Assembler Syntax

VD1CBR.cond #Offset where cond = {un, lt, eq, le, gt, ne, ge, ov}.

Description

Decrement VCR1 and branch if Cond is true. This is not a delayed branch.

Operation

VCR1 = VCR1 - 1;
If ((VCR1 > 0) & ( (Cond == VCSR[SO,GT,EQ,LT]) | (Cond == un) ) )
    VPC = VPC + sex(Offset<22:0> * 4) ;
else VPC = VPC + 4;

Exception

Invalid instruction address.

Programming Note

Note that VCR1 is decremented before the branch condition is checked. Executing this instruction when VCR1 is 0 effectively sets the loop count to $2^{32} - 1$.

| VD2CBR | Decrement VCR2 And Conditional Branch |
|---|---|

Format

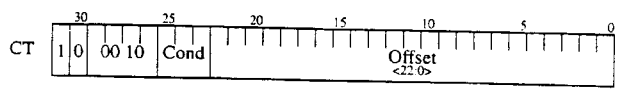

Assembler Syntax

VD2CBR.cond #Offset where cond = {un, lt, eq, le, gt, ne, ge, ov}.

Description

Decrement VCR2 and branch if Cond is true. This is not a delayed branch.

Operation

VCR2 = VCR2 - 1;
If ((VCR2 > 0) & ( (Cond == VCSR[SO,GT,EQ,LT]) | (Cond == un) ) )
   VPC = VPC + sex(Offset<22:0> * 4) ;
else VPC = VPC + 4;

Exception

Invalid instruction address.

Programming Note

Note that VCR2 is decremented before the branch condition is checked. Executing this instruction when VCR2 is 0 effectively sets the loop count to $2^{32} - 1$.

VD3CBR — Decrement VCR3 And Conditional Branch

Format

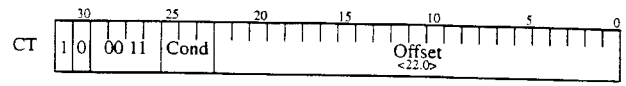

Assembler Syntax

VD3CBR.cond #Offset where cond = {un, lt, eq, le, gt, ne, ge, ov}.

Description

Decrement VCR3 and branch if Cond is true. This is not a delayed branch.

Operation

VCR3 = VCR3 - 1;
If ((VCR3 > 0) & ( (Cond == VCSR[SO,GT,EQ,LT]) | (Cond == un) ) )
    VPC = VPC + sex(Offset<22:0> * 4) ;
else VPC = VPC + 4;

Exception

Invalid instruction address.

Programming Note

Note that VCR3 is decremented before the branch condition is checked. Executing this instruction when VCR3 is 0 effectively sets the loop count to $2^{32} - 1$.

| VDIV2N | Divide By $2^n$ |

Format

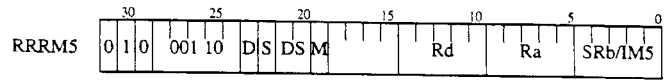

Assembler Syntax

VDIV2N.dt   VRd, VRa, SRb
VDIV2N.dt   VRd, VRa, #IMM
VDIV2N.dt   SRd, SRa, SRb
VDIV2N.dt   SRd, SRa, #IMM where dt = {b, b9, h, w}.

Supported Modes

| D:S:M | | V <- V @ S | V <- V @ I | S <- S @ S | S <- S @ I |
|---|---|---|---|---|---|
| DS | int8 (b) | int9 (b9) | int16 (h) | int32 (w) | |

Description

The content of vector/scalar register Ra is divided by $2^n$ where n is the positive integer content of scalar register Rb or IMM and the final result stored in vector/scalar register Rd. This instruction uses truncate (round toward zero) as the rounding mode.

Operation

```
N = {SRb % 32 || IMM<4:0>} ;
for (i = 0 ; i < NumElem && EMASK[i] ; i++) {
    Rd[i] = Ra[i] / 2^N;
}
```

Exception

None.

Programming Note

Note that $N$ is taken as a 5-bit number from SRb or IMM<4:0>. For the byte, byte9, halfword data types, the programmer is responsible for correctly specifying the value of $N$ that is less than or equal to the degree of precision in the data size. If it is larger than the precision of the specified data size, the elements will be filled with the sign bits. This instruction uses the round toward zero rounding mode.

VDIV2N.F — Divide By $2^n$ Float

Format

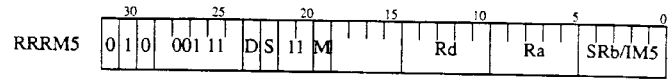

RRRM5

Assembler Syntax

| | |
|---|---|
| VDIV2N.f | VRd, VRa, SRb |
| VDIV2N.f | VRd, VRa, #IMM |
| VDIV2N.f | SRd, SRa, SRb |
| VDIV2N.f | SRd, SRa, #IMM |

Supported Modes

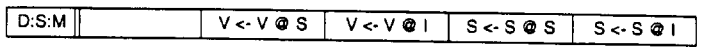

Description

The content of vector/scalar register Ra is divided by $2^n$ where n is the positive integer content of scalar register Rb or IMM and the final result stored in vector/scalar register Rd.

Operation

```
N = {SRb % 32 || IMM<4:0>} ;
for (i = 0 ; i < NumElem && EMASK[i] ; i++) {
    Rd[i] = Ra[i] / 2^N;
}
```

Exception

None.

Programming Note

Note that $N$ is taken as a 5-bit number from SRb or IMM<4:0>.

| VDIVI | Divide Initialize - incomplete |
|---|---|

Format

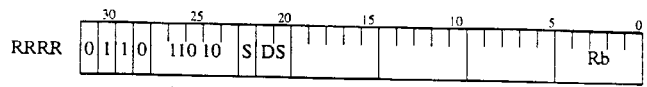

Assembler Syntax

VDIVI.ds    VRb
    VDIVI.ds    SRb where ds = {b, b9, h, w}.

Supported Modes

| S | VRb | SRb | | |
|---|---|---|---|---|
| DS | int8 (b) | int9 (b9) | int16 (h) | int32 (w) |

Description

Perform the initial step of a non-restoring signed integer division. The dividend is a double precision signed integer in the accumulator. If the dividend is single precision, it must be sign extended to double precision and stored in VAC0H and VAC0L. The divisor is a single precision signed integer in Rb.

If the sign of the dividend is same as the sign of the divisor, Rb is subtracted from accumulator high. If not, Rb is added to accumulator high.

Operation

```
for (i = 0 ; i < NumElem && EMASK[i] ; i++ ) {
    Bop[i] = {VRb[i] || SRb }
    if (VAC0H[i]<msb> == Bop[i]<msb>)
        VAC0H[i] = VAC0H[i] - Bop[i] ;
    else
        VAC0H[i] = VAC0H[i] + Bop[i] ;
}
```

Exception

None.

Programming Note

Programmer is responsible for detecting overflow or divide by zero cases before the divide steps.

| VDIVS | Divide Step - incomplete |
|---|---|

Format

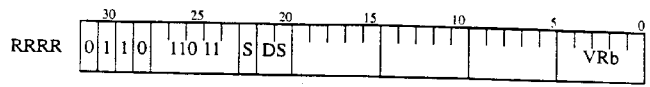

Assembler Syntax

VDIVS.ds    VRb
    VDIVS.ds    SRb where ds = {b, b9, h, w}.

Supported Modes

| S | VRb | SRb | | |
|---|---|---|---|---|
| DS | int8 (b) | int9 (b9) | int16 (h) | int32 (w) |

Description

Perform one iterative step of a non-restoring signed division. This instruction should be executed as many times as the data size (i.e., 8 times for int8, 9 for int9, 16 for int16 and 32 for int32 data types). The VDIVI instruction must be used once before the divide steps to produce initial partial remainder in the accumulator. Divisor is single precision signed integer in Rb. Once quotient bit is extracted per step and shifted into the least-significant-bit of the accumulator.

If the sign of the partial remainder in the accumulator is same as the sign of the divisor in Rb, Rb is subtracted from the accumulator high. If not, Rb is added to the accumulator high.

The quotient bit is 1 if the sign of the resulting partial remainder (result of add or subtract) in the accumulator is same as the sign of the divisor. If not, the quotient bit is 0. The accumulator is shifted left by one bit position with the quotient bit filling in.

At conclusion of the divide steps, the remainder is in the accumulator high and the quotient is in the accumulator low. The quotient is in one's complement form.

Operation

VESL — Element Shift Left by 1

Format

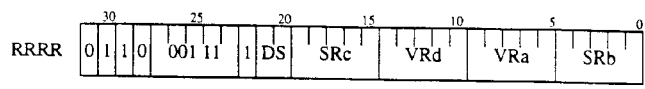

Assembler Syntax

VESL.dt    SRc, VRd, VRa, SRb where dt = {b, b9, h, w, f}. Note that .w and .f specify the same operation.

Supported Modes

| S | | SRb | | |
|---|---|---|---|---|
| DS | int8 (b) | int9 (b9) | int16 (h) | int32 (w) |

Description

Shift elements in vector register Ra left by 1 position, filling in from the scalar register Rb. The left most element being shifted out is returned in the scalar register Rc and the other elements are returned in the vector register Rd.

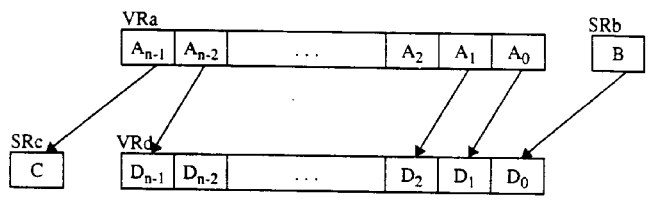

Operation

```
VRd[0] = SRb ;
for (i = 1 ; i < NumElem-1 ; i++)
    VRd[i] = VRa[i-1] ;
SRc = VRa[NumElem-1] ;
```

Exception

None.

Programming Note

This instruction is not affected by the element mask.

VESR — Element Shift Right by 1

Format

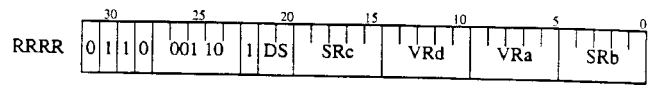

Assembler Syntax

VESL.dt    SRc, VRd, VRa, SRb where dt = {b, b9, h, w, f}. Note that .w and .f specify the same operation.

Supported Modes

| S | | SRb | | |
|---|---|---|---|---|
| DS | int8 (b) | int9 (b9) | int16 (h) | int32 (w) |

Description

Shift elements in vector register Ra right by 1 position, filling in from the scalar register Rb. The right most element being shifted out is returned in the scalar register Rc and the other elements are returned in the vector register Rd.

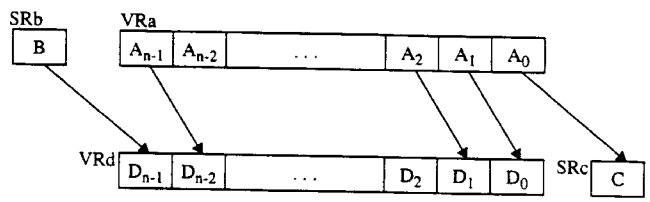

Operation

```
SRc = VRa[0] ;
for (i = 0 ; i < NumElem-2 ; i++)
    VRd[i] = VRa[i+1] ;
VRd[NumElem-1] = SRb ;
```

Exception

None.

Programming Note

This instruction is not affected by the element mask.

VEXTRT — Extract One Element

Format

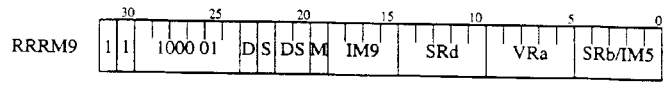

Assembler Syntax

VEXTRT.dt    SRd, VRa, SRb
VEXTRT.dt    SRd, VRa, #IMM where dt = {b, b9, h, w, f}. Note that .f and .w specify the same operation.

Supported Modes

| D:S:M | | | | S <- S | S <- I |
|---|---|---|---|---|---|
| DS | int8 (b) | int9 (b9) | int16 (h) | int32 (w) | |

Description

Extract an element from Ra vector register whose index is specified by scalar register Rb or IMM field and store it into scalar register Rd.

Operation index32 = {SRb % 32 || IMM<4:0>} ;
index64 = {SRb % 64 || IMM<5:0>} ;
index = (VCSR<vec64>) ? index64 : index32 ;
SRd = VRa[index] ;

Exception

None.

Programming Note

This instruction is not affected by the element mask.

VEXTSGN2 — Extract Sign of (1, -1)

Format

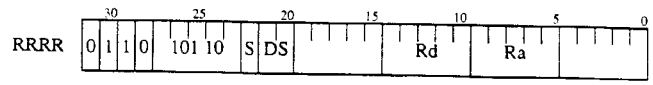

Assembler Syntax

VEXTSGN2.dt VRd, VRa
VEXTSGN2.dt SRd, SRa where dt = {b, b9, h, w}.

Supported Modes

| S | V <- V | S <- S | | |
|---|---|---|---|---|
| DS | int8 (b) | int9 (b9) | int16 (h) | int32 (w) |

Description

Sign value of the content of vector/scalar register Ra elementwise is computed and the result is stored in vector/scalar register Rd.

Operation

```
for (i = 0 ; i < NumElem && EMASK[i] ; i++) {
    Rd[i] = (Ra[i] < 0) ? -1 : 1 ;
}
```

Exception

None.

VEXTSGN3     Extract Sign of (1, 0, -1)

Format

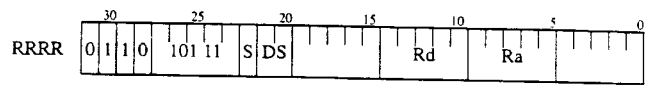

Assembler Syntax

VEXTSGN3.dt VRd, VRa
VEXTSGN3.dt SRd, SRa where dt = {b, b9, h, w}.

Supported Modes

| S | V <- V | S <- S | | |
|---|---|---|---|---|
| DS | int8 (b) | int9 (b9) | int16 (h) | int32 (w) |

Description

Sign value of the content of vector/scalar register Ra elementwise is computed and the result is stored in vector/scalar register Rd.

Operation

```
for (i = 0 ; i < NumElem && EMASK[i] ; i++) {
    if (Ra[i] > 0)       Rd[i] = 1 ;
    else if (Ra[i] < 0)  Rd[i] = -1 ;
    else                 Rd[i] = 0 ;
}
```

Exception

None.

VINSRT  Insert One Element

Format

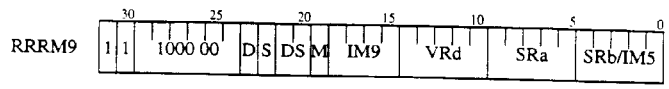

RRRM9

Assembler Syntax

VINSRT.dt    VRd, SRa, SRb
VINSRT.dt    VRd, SRa, #IMM where dt = {b, b9, h, w, f}. Note that .w and .f specify the same operation.

Supported Modes

| D:S:M | | V <- S | V <- I | | |
|---|---|---|---|---|---|
| DS | int8 (b) | int9 (b9) | int16 (h) | int32 (w) | |

Description

Insert the element in the scalar register Ra into the vector register Rd at the index specified by scalar register Rb or IMM field.

Operation

```
index32 = {SRb % 32 || IMM<4:0>} ;
index64 = {SRb % 64 || IMM<5:0>} ;
index = (VCSR<vec64>) ? index64 : index32 ;
VRd[index] = SRa ;
```

Exception

None.

Programming Note

This instruction is not affected by the element mask.

-143-

| VL | Load |
|---|---|

Format

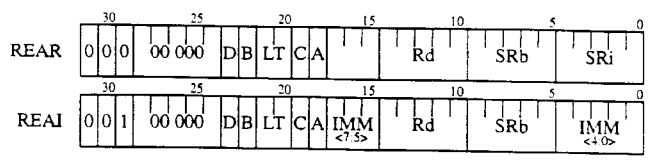

Assembler Syntax

| VL.lt | Rd, SRb, SRi |
| VL.lt | Rd, SRb, #IMM |
| VL.lt | Rd, SRb+, SRi |
| VL.lt | Rd, SRb+, #IMM | where lt = {b, bz9, bs9, h, w, 4, 8, 16, 32, 64}, Rd = {VRd, VRAd, SRd}. Note that .b and .bs9 specify the same operation, and that .64 and VRAd cannot be specified together. Use VLOFF for cache-off load.

Description

Loads a vector register in the current or alternate bank or a scalar register.

Operation $EA = SR_b + \{SR_i \parallel sex(IMM<7:0>)\}$;
if $(A == 1)$ $SR_b = EA$;
$R_d$ = see table below;

| LT | Load Operation |
|---|---|
| .b | $SR_d<7:0> = BYTE[EA]$ |
| .bz9 | $SR_d<8:0> = zex\ BYTE[EA]$ |
| .bs9 | $SR_d<8:0> = sex\ BYTE[EA]$ |
| .h | $SR_d<15:0> = HALF[EA]$ |
| .w | $SR_d<31:0> = WORD[EA]$ |
| .4 | $VR_d<9i+8:9i> = sex\ BYTE[EA+i], i = 0\ to\ 3$ |
| .8 | $VR_d<9i+8:9i> = sex\ BYTE[EA+i], i = 0\ to\ 7$ |
| .16 | $VR_d<9i+8:9i> = sex\ BYTE[EA+i], i = 0\ to\ 15$ |
| .32 | $VR_d<9i+8:9i> = sex\ BYTE[EA+i], i = 0\ to\ 31$ |
| .64 | $VR_{0d}<9i+8:9i> = sex\ BYTE[EA+i], i = 0\ to\ 31$<br>$VR_{1d}<9i+8:9i> = sex\ BYTE[EA+32+i], i = 0\ to\ 31$ |

Exception

Invalid data address, unaligned access.

Programming Note

This instruction is not affected by the element mask.

VLCB  Load From Circular Buffer

Format

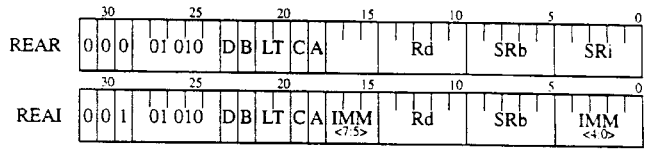

Assembler Syntax

VLCB.lt    Rd, SRb, SRi
VLCB.lt    Rd, SRb, #IMM
VLCB.lt    Rd, SRb+, SRi
VLCB.lt    Rd, SRb+, #IMM where lt = {b, bz9, bs9, h, w, 4, 8, 16, 32, 64}, Rd = {VRd, VRAd, SRd}. Note that .b and .bs9 specify the same operation, and that .64 and VRAd cannot be specified together. Use VLCBOFF for cache-off load.

Description

Loads a vector or scalar register from the circular buffer bounded by the BEGIN pointer in $SR_{b+1}$ and the END pointer in $SR_{b+2}$.

The effective address is adjusted if it is greater than the END address before the load as well as the address update operation. In addition, the circular buffer bounds must be aligned on the halfword and word boundaries for .h and .w scalar loads, respectively.

Operation

EA = $SR_b$ + {SRi ‖ sex(IMM<7:0>)} ;
BEGIN = $SR_{b+1}$ ;
END = $SR_{b+2}$ ;
cbsize = END - BEGIN ;
if (EA > END) EA = BEGIN + (EA - END) ;
if (A == 1) $SR_b$ = EA ;
$R_d$ = see table below:

| LT | Load Operation |
|---|---|
| .bz9 | $SR_d<8:0>$ = zex BYTE[EA] |
| .bs9 | $SR_d<8:0>$ = sex BYTE[EA] |
| .h | $SR_d<15:0>$ = HALF[EA] |
| .w | $SR_d<31:0>$ = WORD[EA] |
| .4 | $VR_d<9i+8:9i>$ = sex BYTE[(EA+i > END) ? EA+i-cbsize : EA+i], i = 0 to 3 |
| .8 | $VR_d<9i+8:9i>$ = sex BYTE[(EA+i > END) ? EA+i-cbsize : EA+i], i = 0 to 7 |

| LT | Load Operation |
|---|---|
| .16 | $VR_d<9i+8:9i> = $ sex BYTE[(EA+i > END) ? EA+i-cbsize : EA+i], i = 0 to 15 |
| .32 | $VR_d<9i+8:9i> = $ sex BYTE[(EA+i > END) ? EA+i-cbsize : EA+i], i = 0 to 31 |
| .64 | $VR_{0d}<9i+8:9i> = $ sex BYTE[(EA+i > END) ? EA+i-cbsize : EA+i], i = 0 to 31<br>$VR_{1d}<9i+8:9i> = $ sex BYTE[(EA+32+i > END) ? EA+32+i-cbsize : EA+32+i], i = 0 to 31 |

Exception

Invalid data address, unaligned access.

Programming Note

This instruction is not affected by the element mask.

Programmer must ensure the following condition for this instruction to work as expected:

BEGIN < EA < 2*END - BEGIN

That is EA > BEGIN as well as EA - END < END - BEGIN.

-147-

VLD — Load Double

Format

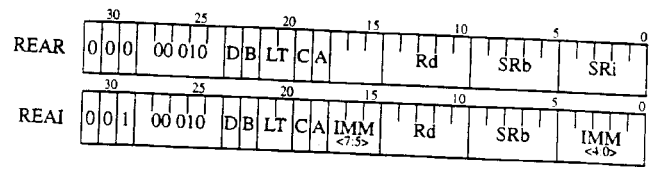

Assembler Syntax

| | |
|---|---|
| VLD.lt | Rd, SRb, SRi |
| VLD.lt | Rd, SRb, #IMM |
| VLD.lt | Rd, SRb+, SRi |
| VLD.lt | Rd, SRb+, #IMM | where lt = {b, bz9, bs9, h, w, 4, 8, 16, 32, 64}, Rd = {VRd, VRAd, SRd}. Note that .b and .bs9 specify the same operation, and that .64 and VRAd cannot be specified together. Use VLDOFF for cache-off load.

Description

Loads two vector registers in the current or alternate bank or two scalar registers.

Operation $EA = SR_b + \{SR_i \parallel sex(IMM<7:0>)\}$ ;
if $(A == 1)$ $SR_b = EA$ ;
$R_d:R_{d+1}$ = see table below ;

| LT | Load Operation |
|---|---|
| .bz9 | $SR_d<8:0>$ = zex BYTE[EA]<br>$SR_{d+1}<8:0>$ = zex BYTE[EA+1] |
| .bs9 | $SR_d<8:0>$ = zex BYTE[EA]<br>$SR_{d+1}<8:0>$ = zex BYTE[EA+1] |
| .h | $SR_d<15:0>$ = HALF[EA]<br>$SR_{d+1}<15:0>$ = HALF[EA+2] |
| .w | $SR_d<31:0>$ = WORD[EA]<br>$SR_{d+1}<31:0>$ = WORD[EA+4] |
| .4 | $VR_d<9i+8:9i>$ = sex BYTE[EA+i], i = 0 to 3<br>$VR_{d+1}<9i+8:9i>$ = sex BYTE[EA+4+i], i = 0 to 3 |
| .8 | $VR_d<9i+8:9i>$ = sex BYTE[EA+i], i = 0 to 7<br>$VR_{d+1}<9i+8:9i>$ = sex BYTE[EA+8+i], i = 0 to 7 |

| LT | Load Operation |
|---|---|
| .16 | $VR_d<9i+8:9i>$ = sex BYTE[EA+i], i = 0 to 15<br>$VR_{d+1}<9i+8:9i>$ = sex BYTE[EA+16+i], i = 0 to 15 |
| .32 | $VR_d<9i+8:9i>$ = sex BYTE[EA+i], i = 0 to 31<br>$VR_{d+1}<9i+8:9i>$ = sex BYTE[EA+32+i], i = 0 to 31 |
| .64 | $VR_{0d}<9i+8:9i>$ = sex BYTE[EA+i], i = 0 to 31<br>$VR_{1d}<9i+8:9i>$ = sex BYTE[EA+32+i], i = 0 to 31<br>$VR_{0d+1}<9i+8:9i>$ = sex BYTE[EA+64+i], i = 0 to 31<br>$VR_{1d+1}<9i+8:9i>$ = sex BYTE[EA+96+i], i = 0 to 31 |

Exceptions:

Invalid data address, unaligned access.

Programming Note

This instruction is not affected by the element mask.

VLI — Load Immediate

Format

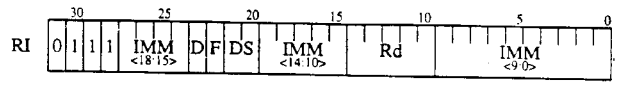

Assembler Syntax

VLI.dt    VRd, #IMM
VLI.dt    SRd, #IMM where dt = {b, b9, h, w, f}.

Description

Loads an immediate value into a scalar or vector register.

For scalar register load, a byte, byte9, halfword or word is loaded according to the data type. For byte, byte9 and halfword data type, the unaffected bytes (byte9s) are not modified.

Operation

Rd = see table below :

| DT | Scalar Load | Vector Load |
|---|---|---|
| .i8 | $SR_d<7:0> = IMM<7:0>$ | $VR_d$ = 32 int8 elements |
| .i9 | $SR_d<8:0> = IMM<8:0>$ | $VR_d$ = 32 int9 elements |
| .i16 | $SR_d<15:0> = IMM<15:0>$ | $VR_d$ = 16 int16 elements |
| .i32 | $SR_d<31:0>$ = sex $IMM<18:0>$ | $VR_d$ = 8 int32 elements |
| .f | $SR_d<31> = IMM<18>$ (sign)<br>$SR_d<30:23> = IMM<17:10>$ (exponent)<br>$SR_d<22:13> = IMM<9:0>$ (mantissa)<br>$SR_d<12:0>$ = zeroes | $VR_d$ = 8 float elements |

Exception

None.

VLQ — Load Quad

Format

```
       30        25        20      15        10       5      0
REAR  |0|0|0| 00 100 |D|B|LT|C|A|        |  Rd  | SRb |  SRi  |

30        25        20      15        10       5      0
REAI  |0|0|1| 00 100 |D|B|LT|C|A| IMM    |  Rd  | SRb |  IMM  |
                                  <7:5>                 <4:0>
```

Assembler Syntax

| | |
|---|---|
| VLQ.lt | Rd, SRb, SRi |
| VLQ.lt | Rd, SRb, #IMM |
| VLQ.lt | Rd, SRb+, SRi |
| VLQ.lt | Rd, SRb+, #IMM | where lt = {b, bz9, bs9, h, w, 4, 8, 16, 32, 64}, Rd = {VRd, VRAd, SRd}. Note that .b and .bs9 specify the same operation, and that .64 and VRAd cannot be specified together. Use VLQOFF for cache-off load.

Description

Loads four vector registers in the current or alternate bank or four scalar registers.

Operation

$EA = SR_b + \{SR_i \parallel sex(IMM<7:0>)\}$ ;
if $(A == 1)$ $SR_b = EA$ ;;
$R_d:R_{d+1}:R_{d+2}:R_{d+3}$ = see table below ;

| LT | Load Operation |
|---|---|
| .bz9 | $SR_d<8:0>$ = zex BYTE[EA]<br>$SR_{d+1}<8:0>$ = zex BYTE[EA+1]<br>$SR_{d+2}<8:0>$ = zex BYTE[EA+2]<br>$SR_{d+3}<8:0>$ = zex BYTE[EA+3] |
| .bs9 | $SR_d<8:0>$ = zex BYTE[EA]<br>$SR_{d+1}<8:0>$ = zex BYTE[EA+1]<br>$SR_{d+2}<8:0>$ = zex BYTE[EA+2]<br>$SR_{d+3}<8:0>$ = zex BYTE[EA+3] |
| .h | $SR_d<15:0>$ = HALF[EA]<br>$SR_{d+1}<15:0>$ = HALF[EA+2]<br>$SR_{d+2}<15:0>$ = HALF[EA+4]<br>$SR_{d+3}<15:0>$ = HALF[EA+6] |

| LT | Load Operation |
|---|---|
| .w | $SR_d<31:0> = WORD[EA]$<br>$SR_{d+1}<31:0> = WORD[EA+4]$<br>$SR_{d+2}<31:0> = WORD[EA+8]$<br>$SR_{d+3}<31:0> = WORD[EA+12]$ |
| .4 | $VR_d<9i+8:9i> = sex\ BYTE[EA+i], i = 0\ to\ 3$<br>$VR_{d+1}<9i+8:9i> = sex\ BYTE[EA+4+i], i = 0\ to\ 3$<br>$VR_{d+2}<9i+8:9i> = sex\ BYTE[EA+8+i], i = 0\ to\ 3$<br>$VR_{d+3}<9i+8:9i> = sex\ BYTE[EA+12+i], i = 0\ to\ 3$ |
| .8 | $VR_d<9i+8:9i> = sex\ BYTE[EA+i], i = 0\ to\ 7$<br>$VR_{d+1}<9i+8:9i> = sex\ BYTE[EA+8+i], i = 0\ to\ 7$<br>$VR_{d+2}<9i+8:9i> = sex\ BYTE[EA+16+i], i = 0\ to\ 7$<br>$VR_{d+3}<9i+8:9i> = sex\ BYTE[EA+24+i], i = 0\ to\ 7$ |
| .16 | $VR_d<9i+8:9i> = sex\ BYTE[EA+i], i = 0\ to\ 15$<br>$VR_{d+1}<9i+8:9i> = sex\ BYTE[EA+16+i], i = 0\ to\ 15$<br>$VR_{d+2}<9i+8:9i> = sex\ BYTE[EA+32+i], i = 0\ to\ 15$<br>$VR_{d+3}<9i+8:9i> = sex\ BYTE[EA+48+i], i = 0\ to\ 15$ |
| .32 | $VR_d<9i+8:9i> = sex\ BYTE[EA+i], i = 0\ to\ 31$<br>$VR_{d+1}<9i+8:9i> = sex\ BYTE[EA+32+i], i = 0\ to\ 31$<br>$VR_{d+2}<9i+8:9i> = sex\ BYTE[EA+64+i], i = 0\ to\ 31$<br>$VR_{d+3}<9i+8:9i> = sex\ BYTE[EA+96+i], i = 0\ to\ 31$ |
| .64 | $VR_{0d}<9i+8:9i> = sex\ BYTE[EA+i], i = 0\ to\ 31$<br>$VR_{1d}<9i+8:9i> = sex\ BYTE[EA+32+i], i = 0\ to\ 31$<br>$VR_{0d+1}<9i+8:9i> = sex\ BYTE[EA+64+i], i = 0\ to\ 31$<br>$VR_{1d+1}<9i+8:9i> = sex\ BYTE[EA+96+i], i = 0\ to\ 31$<br>$VR_{0d+2}<9i+8:9i> = sex\ BYTE[EA+128+i], i = 0\ to\ 31$<br>$VR_{1d+2}<9i+8:9i> = sex\ BYTE[EA+160+i], i = 0\ to\ 31$<br>$VR_{0d+3}<9i+8:9i> = sex\ BYTE[EA+192+i], i = 0\ to\ 31$<br>$VR_{1d+3}<9i+8:9i> = sex\ BYTE[EA+224+i], i = 0\ to\ 31$ |

Exception

Invalid data address, unaligned access.

Programming Note

This instruction is not affected by the element mask.

VLR  Load Reverse

Format

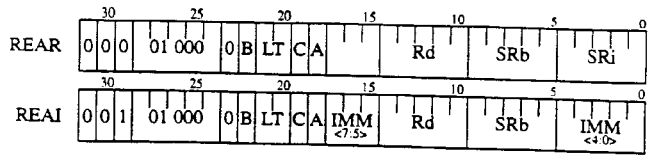

Assembler Syntax

| | |
|---|---|
| VLR.lt | Rd, SRb, SRi |
| VLR.lt | Rd, SRb, #IMM |
| VLR.lt | Rd, SRb+, SRi |
| VLR.lt | Rd, SRb+, #IMM | where lt = { 4, 8, 16, 32, 64}, Rd = {VRd, VRAd}. Note that .64 and VRAd cannot be specified together. Use VLROFF for cache-off load.

Description

Loads a vector register in reverse element order. This instruction does not support a scalar destination register.

Operation $EA = SR_b + \{SR_i \| sex(IMM<7:0>)\}$;
if $(A == 1) SR_b = EA$ ;
$R_d$ = see table below ;

| LT | Load Operation |
|---|---|
| .4 | $VR_d[31-i]<8:0>$ = sex BYTE[EA+i], i = 0 to 3 |
| .8 | $VR_d[31-i]<8:0>$ = sex BYTE[EA+i], i = 0 to 7 |
| .16 | $VR_d[31-i]<8:0>$ = sex BYTE[EA+i], i = 0 to 15 |
| .32 | $VR_d[31-i]<8:0>$ = sex BYTE[EA+i], i = 0 to 31 |
| .64 | $VR_{0d}[31-i]<8:0>$ = sex BYTE[EA+32+i], i = 0 to 31<br>$VR_{1d}[31-i]<8:0>$ = sex BYTE[EA+i], i = 0 to 31 |

Exception

Invalid data address, unaligned access.

Programming Note

This instruction is not affected by the element mask.

VLSL — Logical Shift Left

Format

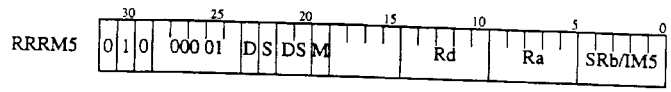

Assembler Syntax

| | |
|---|---|
| VLSL.dt | VRd, VRa, SRb |
| VLSL.dt | VRd, VRa, #IMM |
| VLSL.dt | SRd, SRa, SRb |
| VLSL.dt | SRd, SRa, #IMM | where dt = {b, b9, h, w}.

Supported Modes

| D:S:M | | V <- V @ S | V <- V @ I | S <- S @ S | S <- S @ I |
|---|---|---|---|---|---|
| DS | int8 (b) | int9 (b9) | int16 (h) | int32 (w) | |

Description

Each element of vector/scalar register Ra is logically bit-shifted to the left, with zeros filled in at the Least-Significant-Bit (LSB) locations, by the shift amount given in the scalar register Rb or IMM field and the result is stored in vector/scalar register Rd.

Operation

```
shift_amount = {SRb % 32 || IMM<4:0>} ;
for (i = 0 ; i < NumElem && EMASK[i] ; i++) {
    Rd[i] = Ra[i] << shift_amount ;
}
```

Exception

None.

Programming Note

Note that the shift_amount is taken as a 5-bit number from SRb or IMM<4:0>. For the byte, byte9, halfword data types, the programmer is responsible for correctly specifying the shift amount that is less than or equal to the number of bits in the data size. If the shift amount is larger than the specified data size, the elements will be filled with zeroes.

VLSR — Logical Shift Right

Format

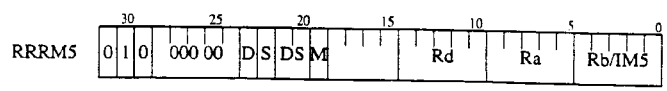

RRRM5    `0 1 0  000 00  D S DS M  _ _ _  Rd  Ra  Rb/IM5`

Assembler Syntax

| | |
|---|---|
| VLSR.dt | VRd, VRa, SRb |
| VLSR.dt | VRd, VRa, #IMM |
| VLSR.dt | SRd, SRa, SRb |
| VLSR.dt | SRd, SRa, #IMM | where dt = {b, b9, h, w}.

Supported Modes

| D:S:M | | V <- V @ S | V <- V @ I | S <- S @ S | S <- S @ I |
|---|---|---|---|---|---|
| DS | int8 (b) | int9 (b9) | int16 (h) | int32 (w) | |

Description

Each data element of vector/scalar register Ra is logically bit-shifted to the right, with zeros filled in at the Most-Significant-Bit (MSB) locations, by the bit amount given in the scalar register Rb or IMM field and the result is stored in vector/scalar register Rd.

Operation

```
shift_amount = {SRb % 32 || IMM<4:0>} ;
for (i = 0 ; i < NumElem && EMASK[i] ; i++) {
    Rd[i] = Ra[i] zero>> shift_amount ;
}
```

Exception

None.

Programming Note

Note that the shift_amount is taken as a 5-bit number from SRb or IMM<4:0>. For the byte, byte9, halfword data types, the programmer is responsible for correctly specifying the shift amount that is less than or equal to the number of bits in the data size. If the shift amount is larger than the specified data size, the elements will be filled with zeroes.

| VLWS | Load With Stride |
|---|---|

Format

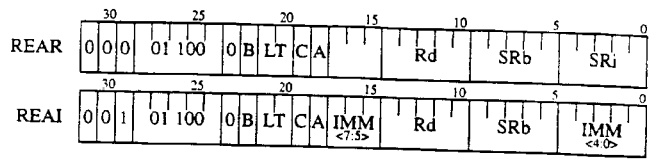

Assembler Syntax

VLWS.lt    Rd, SRb, SRi
VLWS.lt    Rd, SRb, #IMM
VLWS.lt    Rd, SRb+, SRi
VLWS.lt    Rd, SRb+, #IMM where lt = { 4, 8, 16, 32}, Rd = {VRd, VRAd}. Note that .64 mode is not supported - use VL instead. Use VLWSOFF for cache-off load.

Description

Starting at the effective address, 32 bytes are loaded from memory to vector register VRd using scalar register $SR_{b+1}$ as the Stride Control register.

The LT specifies *block size*, the number of consecutive bytes to load for each block. SRb+1 specifies *stride*, the number of bytes separating the beginnings of two consecutive blocks.

The *stride* must be equal to or greater than the *block size*. The EA must be data size aligned. The *stride* and *block size* must be multiples of the data size.

Operation

```
EA = SRb + {SRi || sex(IMM<7:0>)};
if (A == 1) SRb = EA;
Block_size = {4 || 8 || 16 || 32} ;
Stride = SRb+1<31:0> ;
for (i = 0 ; i < VECSIZE/Block_size ; i++)
    for (j = 0 ; j < Block_size ; j++)
        VRd[i*Block_size+j]<8:0> = sex BYTE[EA+i*Stride+j];
```

Exception
Invalid data address, unaligned access.

VMAC — Multiply And Accumulate

Format

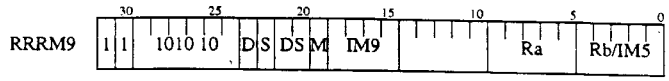

RRRM9

Assembler Syntax

| VMAC.dt | VRa, VRb |
| VMAC.dt | VRa, SRb |
| VMAC.dt | VRa, #IMM |
| VMAC.dt | SRa, SRb |
| VMAC.dt | SRa, #IMM | where dt = {b, h, w, f}.

Supported Modes

| D:S:M | V <- V @ V | V <- V @ S | V <- V @ I | S <- S @ S | S <- S @ I |
|---|---|---|---|---|---|
| DS | int8 (b) | | int16 (h) | int32 (w) | float (f) |

Description

Multiply each element of Ra with each element in Rb to produce a double precision intermediate result; add each double precision element of the intermediate result to the each double precision element of the vector accumulator; store the double precision sum of each element to the vector accumulator.

The Ra and Rb use the specified data type, where as the VAC use the appropriate double precision data type (16, 32 and 64 bits for int8, int16 and int32, respectively). The upper portions of each double precision element are stored in VACH.

For the float data type, all operands and results are of single precision.

Operation

```
for (i = 0 ; i < NumElem && EMASK[i] ; i++) {
    Aop[i] = {VRa[i] II SRa} ;
    Bop[i] = {VRb[i] II SRb} ;
    if (dt == float) VACL[i] = Aop[i] * Bop[i] + VACL[i] ;
    else VACH[i]:VACL[i] = Aop[i] * Bop[i] + VACH[i]:VACL[i] ;
}
```

Exception

Overflow, floating point invalid operand.

Programming Note

This instruction does not support the int9 data type - use int16 data type instead.

VMACF — Multiply And Accumulate Fraction

Format

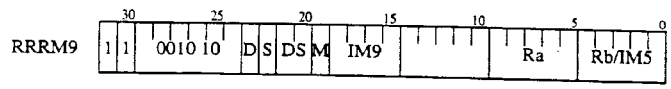

RRRM9

Assembler Syntax

VMACF.dt    VRa, VRb
VMACF.dt    VRa, SRb
VMACF.dt    VRa, #IMM
VMACF.dt    SRa, SRb
VMACF.dt    SRa, #IMM where dt = {b, h, w}.

Supported Modes

| D:S:M | V <- V @ V | V <- V @ S | V <- V @ I | S <- S @ S | S <- S @ I |
|---|---|---|---|---|---|
| DS | int8 (b) |  | int16 (h) | int32 (w) |  |

Description

Multiply each element of VRa with each element in Rb to produce a double precision intermediate result; shift the double precision intermediate result by one bit left; add each double precision element of the shifted intermediate result to the each double precision element of the vector accumulator; store the double precision sum of each element to the vector accumulator.

The VRa and Rb use the specified data type, where as the VAC use the appropriate double precision data type (16, 32, and 64 bits for int8, int16, and int32, respectively). The upper portions of each double precision element are stored in VACH.

Operation

```
for (i = 0 ; i < NumElem && EMASK[i] ; i++) {
    Bop[i] = {VRb[i] || SRb || sex(IMM<8:0>)} ;
    VACH[i]:VACL[i] = ((VRa[i] * Bop[i]) << 1) + VACH[i]:VACL[i] ;
}
```

Exception.

Overflow.

Programming Note

This instruction does not support the int9 data type - use int16 data type instead.

VMACL — Multiply And Accumulate Low

Format

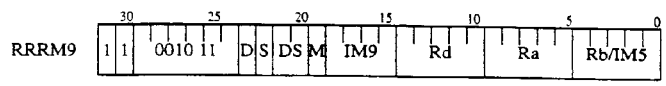

RRRM9 | 1 1 | 0010 11 | D | S | DS | M | IM9 | Rd | Ra | Rb/IM5 |

Assembler Syntax

| VMACL.dt | VRd, VRa, VRb |
| VMACL.dt | VRd, VRa, SRb |
| VMACL.dt | VRd, VRa, #IMM |
| VMACL.dt | SRd, SRa, SRb |
| VMACL.dt | SRd, SRa, #IMM | where dt = {b, h, w, f}.

Supported Modes

| D:S:M | V <- V @ V | V <- V @ S | V <- V @ I | S <- S @ S | S <- S @ I |
|---|---|---|---|---|---|
| DS | int8 (b) |  | int16 (h) | int32 (w) | float (f) |

Description

Multiply each element of VRa with each element in Rb to produce a double precision intermediate result; add each double precision element of the intermediate result to the each double precision element of the vector accumulator; store the double precision sum of each element to the vector accumulator; return the lower portion to the destination register VRd.

The VRa and Rb use the specified data type, where as the VAC use the appropriate double precision data type (16, 32 and 64 bits for int8, int16 and int32, respectively). The upper portions of each double precision element are stored in VACH.

For the float data type, all operands and results are of single precision.

Operation

```
for (i = 0 ; i < NumElem && EMASK[i] ; i++) {
    Bop[i] = {VRb[i] || SRb} ;
    if (dt == float) VACL[i] = VRa[i] * Bop[i] + VACL[i] ;
    else VACH[i]:VACL[i] = VRa[i] * Bop[i] + VACH[i]:VACL[i] ;
    VRd[i] = VACL[i] ;
}
```

Exception

Overflow, floating point invalid operand.

Programming Note

This instruction does not support the int9 data type. Instead, use int16 data type.

VMAD — Multiply And Add

Format

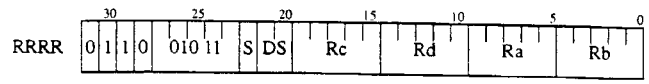

Assembler Syntax

VMAD.dt     VRc, VRd, VRa, VRb
VMAD.dt     SRc, SRd, SRa, SRb where dt = {b, h, w}.

Supported Modes

| S  | VR      | SR |          |          |
|----|---------|----|----------|----------|
| DS | int8 (b)|    | int16 (h)| int32 (w)|

Description

Multiply each element of Ra with each element in Rb to produce a double precision intermediate result; add each double precision element of the intermediate result to the each element of Rc; store the double precision sum of each element to the destination registers Rd+1:Rd.

Operation

```
for (i = 0 ; i < NumElem && EMASK[i] ; i++) {
    Aop[i] = {VRa[i] II SRa} ;
    Bop[i] = {VRb[i] II SRb} ;
    Cop[i] = {VRc[i] II SRc} ;
    Rd+1[i]:Rd[i] = Aop[i] * Bop[i] + sex_dp(Cop[i]) ;
}
```

Exception

None.

| VMADL | Multiply And Add Low |

Format

RRRR | 0 1 1 0 | 01001 | S | DS | Rc | Rd | Ra | Rb

Assembler Syntax

VMADL.dt    VRc, VRd, VRa, VRb
VMADL.dt    SRc, SRd, SRa, SRb where dt = {b, h, w, f}.

Supported Modes

| S | VR | SR | | |
|---|---|---|---|---|
| DS | int8 (b) | float (f) | int16 (h) | int32 (w) |

Description

Multiply each element of Ra with each element in Rb to produce a double precision intermediate result; add each double precision element of the intermediate result to the each element of Rc; return the lower portion of the double precision sum of each element to the destination register Rd.

For the float data type, all operands and results are of single precision.

Operation

```
for (i = 0 ; i < NumElem && EMASK[i] ; i++) {
    Aop[i] = {VRa[i] || SRa} ;
    Bop[i] = {VRb[i] || SRb} ;
    Cop[i] = {VRc[i] || SRc} ;
    if (dt == float) Lo[i] = Aop[i] * Bop[i] + Cop[i] ;
    else Hi[i]:Lo[i] = Aop[i] * Bop[i] + sex_dp(Cop[i]) ;
    Rd[i] = Lo[i] ;
}
```

Exception

Overflow, floating point invalid operand.

VMAS — Multiply And Subtract From Accumulator

Format

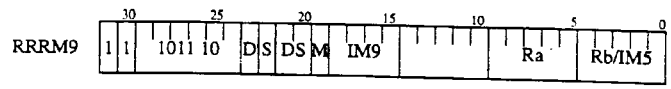

Assembler Syntax

VMAS.dt  VRa, VRb
VMAS.dt  VRa, SRb
VMAS.dt  VRa, #IMM
VMAS.dt  SRa, SRb
VMAS.dt  SRa, #IMM where dt = {b, h, w, f}.

Supported Modes

| D:S:M | V <- V @ V | V <- V @ S | V <- V @ I | S <- S @ S | S <- S @ I |
|---|---|---|---|---|---|
| DS | int8 (b) |  | int16 (h) | int32 (w) | float (f) |

Description

Multiply each element of Ra with each element in Rb to produce a double precision intermediate result; subtract each double precision element of the intermediate result from the each double precision element of the vector accumulator; store the double precision sum of each element to both the vector accumulator.

The Ra and Rb use the specified data type, where as the VAC use the appropriate double precision data type (16, 32 and 64 bits for int8, int16 and int32, respectively). The upper portions of each double precision element are stored in VACH.

For the float data type, all operands and results are of single precision.

Operation

```
for (i = 0 ; i < NumElem && EMASK[i] ; i++) {
    Bop[i] = {VRb[i] II SRb} ;
    if (dt == float) VACL[i] = VACL[i] - VRa[i] * Bop[i] ;
    else VACH[i]:VACL[i] = VACH[i]:VACL[i] - VRa[i] * Bop[i] ;
}
```

Exception

Overflow, floating point invalid operand.

Programming Note

This instruction does not support the int9 data type - use int16 data type instead.

VMASF — Multiply And Subtract From Accumulator Fraction

Format

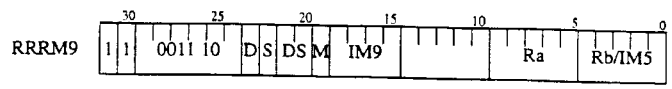

RRRM9 | 1 1 0011 10 D S DS M IM9 | Ra | Rb/IM5

Assembler Syntax

VMASF.dt  VRa, VRb
VMASF.dt  VRa, SRb
VMASF.dt  VRa, #IMM
VMASF.dt  SRa, SRb
VMASF.dt  SRa, #IMM where dt = {b, h, w}.

Supported Modes

| D:S:M | V <- V @ V | V <- V @ S | V <- V @ I | S <- S @ S | S <- S @ I |
|-------|------------|------------|------------|------------|------------|
| DS    | int8 (b)   |            | int16 (h)  | int32 (w)  |            |

Description

Multiply each element of VRa with each element in Rb to produce a double precision intermediate result; shift the double precision intermediate result left by one bit; subtract each double precision element of the shifted intermediate result from the each double precision element of the vector accumulator; store the double precision sum of each element to the vector accumulator.

The VRa and Rb use the specified data type, where as the VAC use the appropriate double precision data type (16, 32 and 64 bits for int8, int16 and int32, respectively). The upper portions of each double precision element are stored in VACH.

Operation

```
for (i = 0 ; i < NumElem && EMASK[i] ; i++) {
    Bop[i] = { VRb[i] || SRb || sex(IMM<8:0>) } ;
    VACH[i]:VACL[i] = VACH[i]:VACL[i] - VRa[i] * Bop[i] ;
}
```

Exception

Overflow.

Programming Note

This instruction does not support the int9 data type - use int16 data type instead.

VMASL  Multiply And Subtract From Accumulator Low

Format

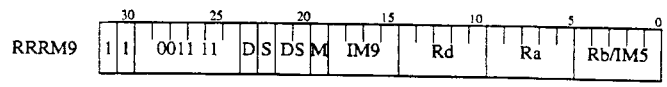

RRRM9 | 1 | 1 | 0011 11 | D | S | DS | M | IM9 | Rd | Ra | Rb/IM5 |

Assembler Syntax

| VMASL.dt | VRd, VRa, VRb |
| VMASL.dt | VRd, VRa, SRb |
| VMASL.dt | VRd, VRa, #IMM |
| VMASL.dt | SRd, SRa, SRb |
| VMASL.dt | SRd, SRa, #IMM | where dt = {b, h, w, f}.

Supported Modes

| D:S:M | V <- V @ V | V <- V @ S | V <- V @ I | S <- S @ S | S <- S @ I |
|---|---|---|---|---|---|
| DS | int8 (b) | | int16 (h) | int32 (w) | float (f) |

Description

Multiply each element of VRa with each element in Rb to produce a double precision intermediate result; subtract each double precision element of the intermediate result from the each double precision element of the vector accumulator; store the double precision sum of each element to the vector accumulator; return the lower portion to the destination register VRd.

The VRa and Rb use the specified data type, where as the VAC use the appropriate double precision data type (16, 32 and 64 bits for int8, int16 and int32, respectively). The upper portions of each double precision element are stored in VACH.

For the float data type, all operands and results are of single precision.

Operation

```
for (i = 0 ; i < NumElem && EMASK[i] ; i++) {
    Bop[i] = {VRb[i] || SRb} ;
    if (dt == float) VACL[i] = VACL[i] - VRA[i] * Bop[i] ;
    else VACH[i]:VACL[i] = VACH[i]:VACL[i] - VRa[i] * Bop[i] ;
    VRd[i] = VACL[i] ;
}
```

Exception

Overflow, floating point invalid operand.

Programming Note

This instruction does not support the int9 data type. Instead, use int16 data type.

VMAXE — Pairwise Maximum And Exchange

Format

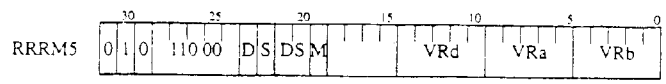

RRRM5 | 0 1 0 | 110 00 | D S DS M | | VRd | VRa | VRb

Assembler Syntax

VMAXE.dt   VRd, VRb where dt = {b, b9, h, w, f}.

Supported Modes

| D:S:M | V <- V | | | | |
|---|---|---|---|---|---|
| DS | int8 (b) | int9 (b9) | int16 (h) | int32 (w) | float (f) |

Description

VRa should equal to VRb. When VRa is different from VRb, the result is undefined.

Each even/odd data element of vector register Rb are compared in pairs and the greater value of the each data element pair is stored in the even location and the lesser value of the each data element pair is stored in the odd position of vector register Rd

Operation

```
for (i = 0 ; i < NumElem && EMASK[i] ; i = i + 2) {
    VRd[i] = (VRb[i] > VRb[i+1]) ? VRb[i] : VRb[i+1] ;
    VRd[i+1] = (VRb[i] > VRb[i+1]) ? VRb[i+1] : VRb[i] ;
}
```

Exception

None.

VMAXE — Pairwise Maximum And Exchange

Format

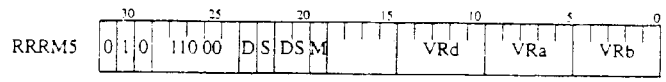

Assembler Syntax

VMAXE.dt   VRd, VRb where dt = {b, b9, h, w, f}.

Supported Modes

| D:S:M | V <- V | | | | |
|---|---|---|---|---|---|
| DS | int8 (b) | int9 (b9) | int16 (h) | int32 (w) | float (f) |

Description

VRa should equal to VRb. When VRa is different from VRb, the result is undefined.

Each even/odd data element of vector register Rb are compared in pairs and the greater value of the each data element pair is stored in the even location and the lesser value of the each data element pair is stored in the odd position of vector register Rd

Operation

```
for (i = 0 ; i < NumElem && EMASK[i] ; i = i + 2) {
    VRd[i]   = (VRb[i] > VRb[i+1]) ? VRb[i] : VRb[i+1] ;
    VRd[i+1] = (VRb[i] > VRb[i+1]) ? VRb[i+1] : VRb[i] ;
}
```

Exception

None.

VMOV - Move

Format

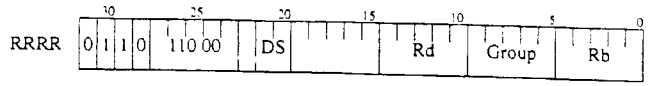

Assembler Syntax

VMOV.dt   Rd, Rb where dt = {b, b9, h, w, f}, Rd and Rb denote architecturally designated register name. Note that .w and .f denote the same operation.

Supported Modes

| DS | int8 (b) | int9 (b9) | int16 (h) | int32 (w) |
|---|---|---|---|---|

Description

The content of register Rb is moved to register Rd. The Group field specifies the source and destination register groups. The register group notation is:

VR      current bank vector register
VRA     alternate bank vector register
SR      scalar register
SP      special-purpose register
RASR    return address stack register
VAC     vector accumulator register (see VAC register encoding table below)

| Group <3:0> | Source Group | Dest. Group | Comments |
|---|---|---|---|
| 0000 | | | reserved |
| 0001 | VR | VRA | |
| 0010 | VRA | VR | |
| 0011 | VRA | VRA | |
| 0100 | | | reserved |
| 0101 | | | reserved |
| 0110 | VRA | VAC | |
| 0111 | VAC | VRA | |
| 1000 | | | reserved |
| 1001 | SR | VRA | |
| 1010 | | | reserved |
| 1011 | | | reserved |
| 1100 | SR | SP | |

| Group <3:0> | Source Group | Dest. Group | Comments |
|---|---|---|---|
| 1101 | SP | SR | |
| 1110 | SR | RASR | |
| 1111 | RASR | SR | |

Note that a vector register cannot be moved to a scalar register with this instruction. The VEXTRT instruction is provided for that purpose.

Use the following table for VAC register encoding:

| R<2:0> | Registers | Comments |
|---|---|---|
| 000 | undefined | |
| 001 | VAC0L | |
| 010 | VAC0H | |
| 011 | VAC0 | specify both VAC0H:VAC0L. If specified as the source, the VRd+1:VRd register pair are updated. VRd must be an even register. |
| 100 | undefined | |
| 101 | VAC1L | |
| 110 | VAC1H | |
| 111 | VAC1 | specify both VAC1H:VAC1L. If specified as the source, the VRd+1:VRd register pair are updated. VRd must be an even register. |
| all others | undefined | |

Operation

Rd = Rb

Exception

Setting an exception status bit in VCSR or VISRC will cause the corresponding exception.

Programming Note

This instruction is not affected by the element mask. Note that, since the alternate bank concept does not exist in VEC64 mode, this instruction cannot be used for moving from or to an alternate bank register in VEC64 mode.

VMUL — Multiply

Format

```
RRRR  |0|1|1|0| 01000 |S|DS| Rc | Rd | Ra | Rb |
       30      25     20    15   10    5    0
```

Assembler Syntax

VMUL.dt     VRc, VRd, VRa, VRb
VMUL.dt     SRc, SRd, SRa, SRb where dt = {b, h, w}.

Supported Modes

| S | VR | SR | | |
|---|---|---|---|---|
| DS | int8 (b) | | int16 (h) | int32 (w) |

Description

Multiply each element of Ra with each element in Rb to produce a double precision result; return the double precision sum of each element to the destination registers Rc:Rd.

The Ra and Rb use the specified data type, where as the Rc:Rd use the appropriate double precision data type (16, 32 and 64 bits for int8, int16 and int32, respectively). The upper portions of each double precision element are stored in Rc.

Operation

```
for (i = 0 ; i < NumElem && EMASK[i] ; i++) {
    Aop[i] = {VRa[i] II SRa} ;
    Bop[i] = {VRb[i] II SRb} ;
    Hi[i]:Lo[i] = Aop[i] * Bop[i] ;
    Rc[i] = Hi[i] ;
    Rd[i] = Lo[i] ;
}
```

Exception

None.

-174-

Programming Note

This instruction does not support the int9 data type - use int16 data type instead. This instruction also does not support the float data type, since the extended result is not a supported data type.

| VMULA | Multiply To Accumulator |

Format

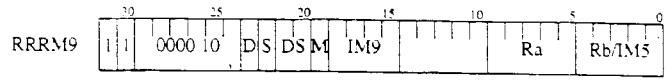

Assembler Syntax

VMULA.dt    VRa, VRb
VMULA.dt    VRa, SRb
VMULA.dt    VRa, #IMM
VMULA.dt    SRa, SRb
VMULA.dt    SRa, #IMM where dt = {b, h, w, f}.

Supported Modes

| D:S:M | V @ V | V @ S | V @ I | S @ S | S @ I |
|---|---|---|---|---|---|
| DS | int8 (b) | | int16 (h) | int32 (w) | float (f) |

Description

Multiply each element of VRa with each element in Rb to produce a double precision result; write the result to the accumulator.

For the float data type, all operands and results are of single precision.

Operation

```
for (i = 0 ; i < NumElem && EMASK[i] ; i++) {
    Bop[i] = {VRb[i] || SRb} ;
    if (dt == float) VACL[i] = VRa[i] * Bop[i] ;
    else VACH[i]:VACL[i] = VRa[i] * Bop[i] ;
}
```

Exception

None.

Programming Note

This instruction does not support the int9 data type. Instead, use int16 data type.

| VMULAF | Multiply To Accumulator Fraction |
|---|---|

Format

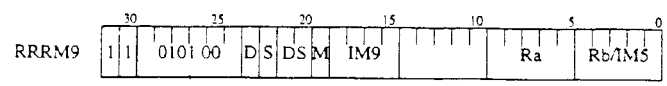

Assembler Syntax

VMULAF.dt  VRa, VRb
VMULAF.dt  VRa, SRb
VMULAF.dt  VRa, #IMM
VMULAF.dt  SRa, SRb
VMULAF.dt  SRa, #IMM where dt = {b, h, w}.

Supported Modes

| D:S:M | V @ V | V @ S | V @ I | S @ S | S @ I |
|---|---|---|---|---|---|
| DS | int8 (b) |  | int16 (h) | int32 (w) |  |

Description

Multiply each element of VRa with each element in Rb to produce a double precision intermediate result; shift the double precision intermediate result left by one bit; write the result to the accumulator.

Operation

```
for (i = 0 ; i < NumElem && EMASK[i] ; i++) {
    Bop[i] = {VRb[i] || SRb || sex(IMM<8:0>)} ;
    VACH[i]:VACL[i] = (VRa[i] * Bop[i]) << 1 ;
}
```

Exception

None.

Programming Note

This instruction does not support the int9 data type - use int16 data type instead.

VMULF — Multiply Fraction

Format

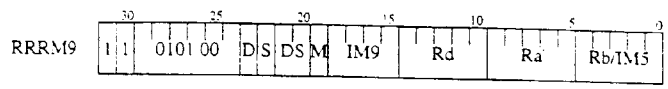

Assembler Syntax

| | |
|---|---|
| VMULF.dt | VRd, VRa, VRb |
| VMULF.dt | VRd, VRa, SRb |
| VMULF.dt | VRd, VRa, #IMM |
| VMULF.dt | SRd, SRa, SRb |
| VMULF.dt | SRd, SRa, #IMM | where dt = {b, h, w}.

Supported Modes

| D:S:M | V <- V @ V | V <- V @ S | V <- V @ I | S <- S @ S | S <- S @ I |
|---|---|---|---|---|---|
| DS | int8 (b) | | int16 (h) | int32 (w) | |

Description

Multiply each element of VRa with each element in Rb to produce a double precision intermediate result; shift the double precision intermediate result left by one bit; return the upper portion of the result to the destination register VRd+1 and the lower portion to the destination register VRd. VRd must be an even numbered register.

Operation

```
for (i = 0 ; i < NumElem && EMASK[i] ; i++) {
    Bop[i] = {VRb[i] ll SRb ll sex(IMM<8:0>)} ;
    Hi[i]:Lo[i] = (VRa[i] * Bop[i]) << 1 ;
    VRd+1[i] = Hi[i] ;
    VRd[i] = Lo[i] ;
}
```

Exception

None.

Programming Note

This instruction does not support the int9 data type - use int16 data type instead.

| VMULFR | Multiply Fraction and Round |
|---|---|

Format

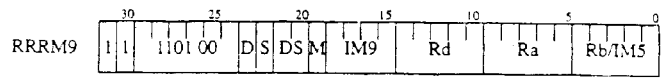

Assembler Syntax

VMULFR.dt  VRd, VRa, VRb
VMULFR.dt  VRd, VRa, SRb
VMULFR.dt  VRd, VRa, #IMM
VMULFR.dt  SRd, SRa, SRb
VMULFR.dt  SRd, SRa, #IMM where dt = {b, h, w}.

Supported Modes

| D:S:M | V <- V @ V | V <- V @ S | V <- V @ I | S <- S @ S | S <- S @ I |
|---|---|---|---|---|---|
| DS | int8 (b) |  | int16 (h) | int32 (w) |  |

Description

Multiply each element of VRa with each element in Rb to produce a double precision intermediate result; shift the double precision intermediate result left by one bit; round the shifted intermediate result to the upper portion; return the upper portion to the destination register VRd.

Operation

```
for (i = 0 ; i < NumElem && EMASK[i] ; i++) {
    Bop[i] = {VRb[i] || SRb || sex(IMM<8:0>)} ;
    Hi[i]:Lo[i] = (VRa[i] * Bop[i]) << 1 ;
    if (Lo[i]<msb> == 1) Hi[i] = Hi[i] + 1 ;
    VRd[i] = Hi[i] ;
}
```

Exception

None.

Programming Note

This instruction does not support the int9 data type - use int16 data type instead.

VMULL — Multiply Low

Format

RRRM9 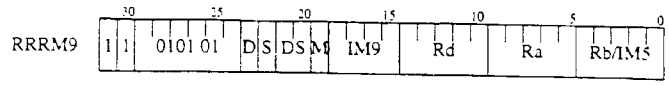

Assembler Syntax

| | |
|---|---|
| VMULL.dt | VRd, VRa, VRb |
| VMULL.dt | VRd, VRa, SRb |
| VMULL.dt | VRd, VRa, #IMM |
| VMULL.dt | SRd, SRa, SRb |
| VMULL.dt | SRd, SRa, #IMM | where dt = {b, h, w, f}.

Supported Modes

| D:S:M | V <- V @ V | V <- V @ S | V <- V @ I | S <- S @ S | S <- S @ I |
|---|---|---|---|---|---|
| DS | int8 (b) | | int16 (h) | int32 (w) | float (f) |

Description

Multiply each element of VRa with each element in Rb to produce a double precision result; return the lower portion to the result to the destination register VRd.

For the float data type, all operands and results are of single precision.

Operation

```
for (i = 0 ; i < NumElem && EMASK[i] ; i++) {
    Bop[i] = {VRb[i] || SRb} ;
    if (dt == float) Lo[i] = VRa[i] * Bop[i] ;
    else Hi[i]:Lo[i] = VRa[i] * Bop[i] ;
    VRd[i] = Lo[i] ;
}
```

Exception

Overflow, floating point invalid operand.

Programming Note

This instruction does not support the int9 data type. Instead, use int16 data type.

VNAND     NAND

Format

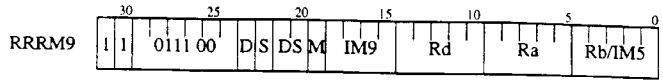

RRRM9

Assembler Syntax

| | |
|---|---|
| VNAND.dt | VRd, VRa, VRb |
| VNAND.dt | VRd, VRa, SRb |
| VNAND.dt | VRd, VRa, #IMM |
| VNAND.dt | SRd, SRa, SRb |
| VNAND.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically NAND each bit of each element in Ra with the corresponding bit in Rb/Immediate operand; return the result in Rd.

Operation

```
for (i = 0 ; i < NumElem && EMASK[i] ; i++) {
    Bop[i] = {VRb[i] || SRb || sex(IMM<8:0>)} ;
    Rd[i]<k> = ~(Ra[i]<k> & Bop[i]<k>), for k = all bits in element i ;
}
```

Exception

None.

VNOR  NOR

Format

RRRM9 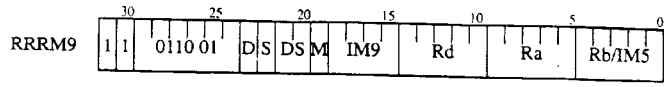

Assembler Syntax

| | |
|---|---|
| VNOR.dt | VRd, VRa, VRb |
| VNOR.dt | VRd, VRa, SRb |
| VNOR.dt | VRd, VRa, #IMM |
| VNOR.dt | SRd, SRa, SRb |
| VNOR.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically NOR each bit of each element in Ra with the corresponding bit in Rb/Immediate operand; return the result in Rd.

Operation

```
for (i = 0 ; i < NumElem && EMASK[i] ; i++) {
    Bop[i] = {VRb[i] || SRb || sex(IMM<8:0>)} ;
    Rd[i]<k> = ~(Ra[i]<k> | Bop[i]<k>), for k = all bits in element i ;
}
```

Exception

None.

VOR — OR

Format

| | 30 | 25 | 20 | 15 | 10 | 5 | 0 |
|---|---|---|---|---|---|---|---|
| RRRM9 | 1 1 | 0110 11 | D S DS M | IM9 | Rd | Ra | Rb/IM5 |

Assembler Syntax

| | |
|---|---|
| VOR.dt | VRd, VRa, VRb |
| VOR.dt | VRd, VRa, SRb |
| VOR.dt | VRd, VRa, #IMM |
| VOR.dt | SRd, SRa, SRb |
| VOR.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically OR each bit of each element in Ra with the corresponding bit in Rb/Immediate operand; return the result in Rd.

Operation

```
for (i = 0 ; i < NumElem && EMASK[i] ; i++) {
    Bop[i] = {VRb[i] II SRb II sex(IMM<8:0>)} ;
    Rd[i]<k> = Ra[i]<k> I Bop[i]<k>, for k = all bits in element i ;
}
```

Exception

None.

VORC — OR Complement

Format

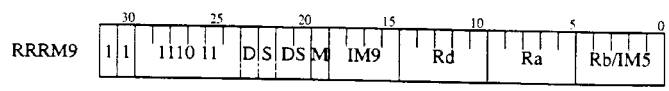

RRRM9 | 1 1 | 1110 11 | D | S | DS | M | IM9 | Rd | Ra | Rb/IM5 |

Assembler Syntax

| VORC.dt | VRd, VRa, VRb |
| VORC.dt | VRd, VRa, SRb |
| VORC.dt | VRd, VRa, #IMM |
| VORC.dt | SRd, SRa, SRb |
| VORC.dt | SRd, SRa, #IMM | where dt = {b, b9, h, w}. Note that .w and .f specify the same operation.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

Logically OR each bit of each element in Ra with the complement of the corresponding bit in Rb/Immediate operand; return the result in Rd.

Operation

```
for (i = 0 ; i < NumElem && EMASK[i] ; i++) {
    Bop[i] = {VRb[i] || SRb || sex(IMM<8:0>)} ;
    Rd[i]<k> = Ra[i]<k> | ~Bop[i]<k>, for k = all bits in element i ;
}
```

Exception

None.

VPFTCH  Prefetch

Format

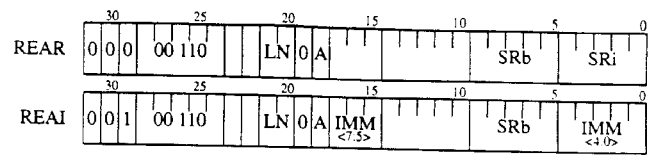

Assembler Syntax

VPFTCH.ln   SRb, SRi
VPFTCH.ln   SRb, #IMM
VPFTCH.ln   SRb+, SRi
VPFTCH.ln   SRb+, #IMM where ln = {1, 2, 4, 8}.

Description

Prefetchs multiple vector data cache lines starting from the effective address. The number of cache lines are specified as follows:

LN<1:0> = 00:   1 64-byte cache line is prefetched
LN<1:0> = 01:   2 64-byte cache lines are prefetched
LN<1:0> = 10:   4 64-byte cache lines are prefetched
LN<1:0> = 11:   8 64-byte cache lines are prefetched If the effective address is not on a 64-byte boundary, it is first truncated to be aligned to the 64-byte boundary.

Operation

Exception

Invalid data address exception.

Programming Note

The EA<31:0> denotes a byte address in the local memory.

VPFTCHSP  Prefetch To Scratch Pad

Format

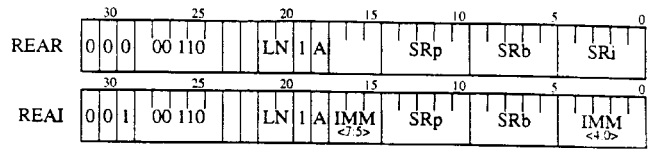

Assembler Syntax

VPFTCHSP.ln SRp, SRb, SRi
VPFTCHSP.ln SRp, SRb, #IMM
VPFTCHSP.ln SRp, SRb+, SRi
VPFTCHSP.ln SRp, SRb+, #IMM where ln = {1, 2, 4, 8}. Note that VPFTCH and VPFTCHSP have the same opcode.

Description

Transfers multiple 64-byte blocks from memory to the scratch pad. The effective address provides the starting address in memory and SRp provides the starting address in the scratch pad. The number of 64-byte blocks are specified as follows:

LN<1:0> = 00:  1 64-byte block is transferred
LN<1:0> = 01:  2 64-byte blocks are transferred
LN<1:0> = 10:  4 64-byte blocks are transferred
LN<1:0> = 11:  8 64-byte blocks are transferred If the effective address is not on a 64-byte boundary, it is first truncated to be aligned to the 64-byte boundary. If the scratch pad pointer address in SRp is not on a 64-byte boundary, it is also truncated to be aligned to the 64-byte boundary. The aligned scratch pad pointer address is incremented by the number of bytes transferred.

Operation

EA = SRb + {SRi || sex(IMM<7:0>)} ;
if (A == 1) SRb = EA ;
Num_bytes = {64 || 128 || 256 || 512} ;
Mem_adrs = EA<31:6> : 6b'000000 ;
SRp = SRp<31:6> : 6b'000000 ;
for (i = 0; i < Num_bytes ; i++)
    SPAD[SRp++] = MEM[Mem_adrs+i] ;

Exception

Invalid data address exception.

VROL — Rotate Left

Format

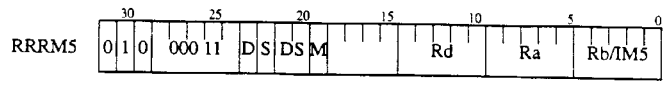

RRRM5 | 0 1 0 | 000 11 | D S DS M | | Rd | Ra | Rb/IM5

Assembler Syntax

| | |
|---|---|
| VROL.dt | VRd, VRa, SRb |
| VROL.dt | VRd, VRa, #IMM |
| VROL.dt | SRd, SRa, SRb |
| VROL.dt | SRd, SRa, #IMM | where dt = {b, b9, h, w}.

Supported Modes

| D:S:M | | V <- V @ S | V <- V @ I | S <- S @ S | S <- S @ I |
|---|---|---|---|---|---|
| DS | int8 (b) | int9 (b9) | int16 (h) | int32 (w) | |

Description

Each data element of vector/scalar register Ra is rotated to the left by the bit amount given in the scalar register Rb or IMM field and the result is stored in vector/scalar register Rd.

Operation

```
rotate_amount = {SRb % 32 || IMM<4:0>} ;
for (i = 0 ; i < NumElem && EMASK[i] ; i++) {
    Rd[i] = Ra[i] rotate_left rotate_amount ;
}
```

Exception

None.

Programming Note

Note that the rotate_amount is taken as a 5-bit number from SRb or IMM<4:0>. For the byte, byte9, halfword data types, the programmer is responsible for correctly specifying the rotate amount that is less than or equal to the number of bits in the data size. If the rotate amount is larger than the specified data size, the result is *undefined*.

Note that rotate left by *n* is equivalent to rotate right by ElemSize - *n*, where ElemSize denotes the number of bits in a given data size.

| VROR | Rotate Right |
|---|---|

Format

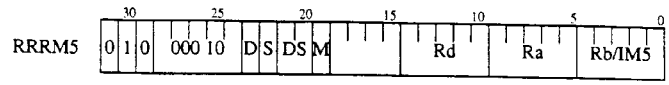

Assembler Syntax

VROR.dt    VRd, VRa, SRb
VROR.dt    VRd, VRa, #IMM
VROR.dt    SRd, SRa, SRb
VROR.dt    SRd, SRa, #IMM where dt = {b, b9, h, w}.

Supported Modes

| D:S:M | | V <- V @ S | V <- V @ I | S <- S @ S | S <- S @ I |
|---|---|---|---|---|---|
| DS | int8 (b) | int9 (b9) | int16 (h) | int32 (w) | |

Description

Each data element of vector/scalar register Ra is rotated to the right by the bit amount given in the scalar register Rb or IMM field and the result is stored in vector/scalar register Rd.

Operation rotate_amount = {SRb % 32 || IMM<4:0>} ;
for (i = 0 ; i < NumElem && EMASK[i] ; i++) {
    Rd[i] = Ra[i] rotate_right rotate_amount ;
}

Exception

None.

Programming Note

Note that the rotate_amount is taken as a 5-bit number from SRb or IMM<4:0>. For the byte, byte9, halfword data types, the programmer is responsible for correctly specifying the rotate amount that is less than or equal to the number of bits in the data size. If the rotate amount is larger than the specified data size, the result is *undefined*.

Note that rotate right by $n$ is equivalent to rotate left by ElemSize - $n$, where ElemSize denotes the number of bits in a given data size.

VROUND — Round Floating Point To Integer

Format

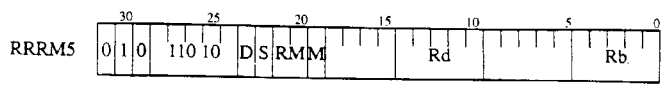

RRRM5

Assembler Syntax

VROUND.rm  VRd, VRb
VROUND.rm  SRd, SRb where rm = {ninf, zero, near, pinf}.

Supported Modes

| D:S:M | V <- V | | | S <- S | |
|---|---|---|---|---|---|

Description

The content of vector/scalar register Rb in floating point data format is rounded to the nearest 32-bit integer (Word) and the result is stored in vector/scalar register Rd. The rounding mode is defined in RM.

| RM<1:0> | Mode | Meaning |
|---|---|---|
| 00 | ninf | Round toward - infinity |
| 01 | zero | Round toward zero |
| 10 | near | Round toward nearest even |
| 11 | pinf | Round toward + infinity |

Operation

```
for (i = 0 ; i < NumElem ; i++) {
    Rd[i] = Convert to int32 (Rb[i]) ;
}
```

Exception

None.

Programming Note

This instruction is not affected by the element mask.

VSATL — Saturate To Lower Bound

Format

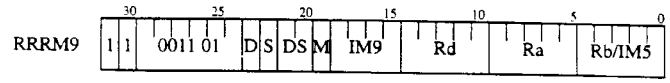

Assembler Syntax

| | |
|---|---|
| VSATL.dt | VRd, VRa, VRb |
| VSATL.dt | VRd, VRa, SRb |
| VSATL.dt | VRd, VRa, #IMM |
| VSATL.dt | SRd, SRa, SRb |
| VSATL.dt | SRd, SRa, #IMM | where dt = {b, b9, h, w, f}. Note that .f data type is not supported with 9-bit immediate.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | float (f) |

Description

Each data element of vector/scalar register Ra is checked against its corresponding lower limit in vector/scalar register Rb or IMM field. If the value of the data element is less than the lower limit, it is set equal to the lower limit, and the final result stored in vector/scalar register Rd.

Operation

```
for (i = 0 ; i < NumElem && EMASK[i] ; i++) {
    Bop[i] = {VRb[i] || SRb || sex(IMM<8:0>)} ;
    Rd[i] = (Ra[i] < Bop[i]) ? Bop[i] : Ra[i] ;
}
```

Exception

None.

VSATU — Saturate To Upper Bound

Format

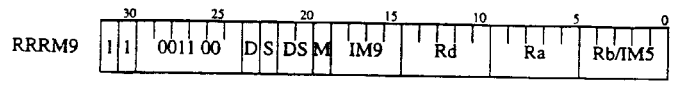

Assembler Syntax

| VSATU.dt | VRd, VRa, VRb |
| VSATU.dt | VRd, VRa, SRb |
| VSATU.dt | VRd, VRa, #IMM |
| VSATU.dt | SRd, SRa, SRb |
| VSATU.dt | SRd, SRa, #IMM | where dt = {b, b9, h, w, f}. Note that .f data type is not supported with 9-bit immediate.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | float (f) |

Description

Each data element of vector/scalar register Ra is checked against its corresponding upper limit in vector/scalar register Rb or IMM field. If the value of the data element is greater than the upper limit, it is set equal to the upper limit, and the final result stored in vector/scalar register Rd.

Operation

```
for (i = 0 ; i < NumElem && EMASK[i] ; i++) {
    Bop[i] = {VRb[i] || SRb || sex(IMM<8:0>)} ;
    Rd[i] = (Ra[i] > Bop[i]) ? Bop[i] : Ra[i] ;
}
```

Exception

None.

VSHFL         Shuffle

Format

RRRR | 0 | 1 | 1 | 0 | 000 00 | S | DS | VRc | VRd | VRa | Rb |

Assembler Syntax

VSHFL.dt    VRc, VRd, VRa, VRb
VSHFL.dt    VRc, VRd, VRa, SRb where dt = {b, b9, h, w, f}. Note that .w and .f specify the same operation.

Supported Modes

| S | VRb | SRb | | |
|---|---|---|---|---|
| DS | int8 (b) | int9 (b9) | int16 (h) | int32 (w) |

Description

The content of vector registers Ra is shuffled with Rb and the result is stored in vector registers Rc:Rd, as shown below:

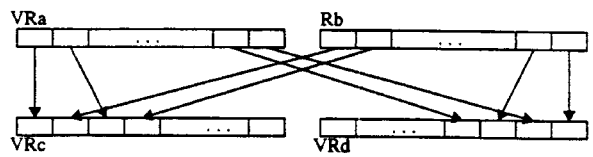

Operation

Exception

None.

Programming Note

This instruction does not use the element mask.

VSHFLH  Shuffle High

Format

```
        30       25      20        15       10       5       0
RRRR  |0|1|1|0| 100 00 |S|DS|         |  VRd  |  VRa  |  Rb  |
```

Assembler Syntax

VSHFLH.dt    VRd, VRa, VRb
VSHFLH.dt    VRd, VRa, SRb where dt = {b, b9, h, w, f}. Note that .w and .f specify the same operation.

Supported Modes

| S  | VRb     | SRb      |          |          |
|----|---------|----------|----------|----------|
| DS | int8 (b)| int9 (b9)| int16 (h)| int32 (w)|

Description

The content of vector registers Ra is shuffled with Rb and the upper portion of the result is stored in vector registers Rd, as shown below:

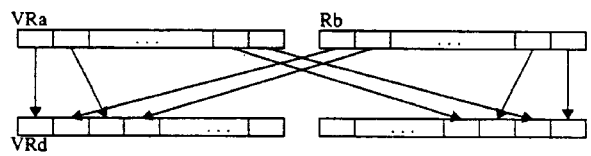

Operation

Exception

None.

Programming Note

This instruction does not use the element mask.

VSHFLL — Shuffle Low

Format

RRRR | 0 1 1 0 | 100 10 | S | DS | | VRd | VRa | Rb

Assembler Syntax

VSHFLL.dt  VRd, VRa, VRb
VSHFLL.dt  VRd, VRa, SRb where dt = {b, b9, h, w, f}. Note that .w and .f specify the same operation.

Supported Modes

| S | VRb | SRb | | |
|---|---|---|---|---|
| DS | int8 (b) | int9 (b9) | int16 (h) | int32 (w) |

Description

The content of vector registers Ra is shuffled with Rb and the lower portion of the result is stored in vector registers Rd, as shown below:

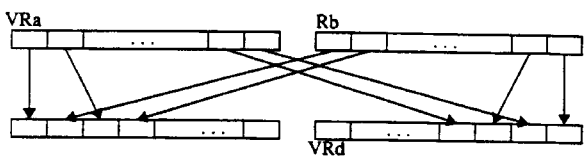

Operation

Exception

None.

Programming Note

This instruction does not use the element mask.

| VST | Store |

Format

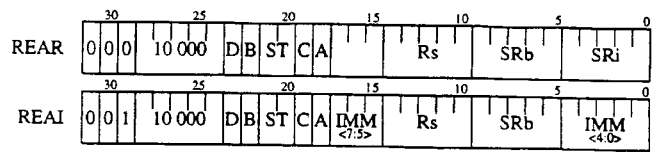

Assembler Syntax

| | |
|---|---|
| VST.st | Rs, SRb, SRi |
| VST.st | Rs, SRb, #IMM |
| VST.st | Rs, SRb+, SRi |
| VST.st | Rs, SRb+, #IMM | where st = {b, b9t, h, w, 4, 8, 16, 32, 64}, Rs = {VRs, VRAs, SRs}. Note that .b and .b9t specify the same operation, and that .64 and VRAs cannot be specified together. Use VSTOFF for cache-off store.

Description

Stores a vector or scalar register.

Operation $EA = SR_b + \{SR_i \| sex(IMM<7:0>)\}$;
if $(A == 1)\ SR_b = EA$;
$MEM[EA]$ = see table below ;

| ST | Store Operation |
|---|---|
| .b | $BYTE[EA] = SR_s<7:0>$ |
| .h | $HALF[EA] = SR_s<15:0>$ |
| .w | $WORD[EA] = SR_s<31:0>$ |
| .4 | $BYTE[EA+i] = VR_s<9i+7:9i>$, i = 0 to 3 |
| .8 | $BYTE[EA+i] = VR_s<9i+7:9i>$, i = 0 to 7 |
| .16 | $BYTE[EA+i] = VR_s<9i+7:9i>$, i = 0 to 15 |
| .32 | $BYTE[EA+i] = VR_s<9i+7:9i>$, i = 0 to 31 |
| .64 | $BYTE[EA+i] = VR_{0s}<9i+7:9i>$, i = 0 to 31<br>$BYTE[EA+32+i] = VR_{1s}<9i+7:9i>$, i = 0 to 31 |

Exception

Invalid data address. unaligned access.

Programming Note

This instruction is not affected by the element mask.

VSTCB      Store To Circular Buffer

Format

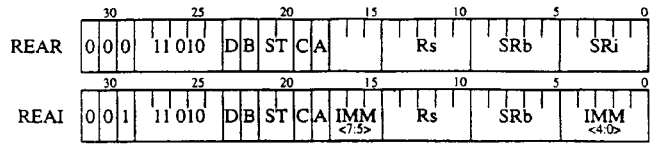

Assembler Syntax

| | |
|---|---|
| VSTCB.st | Rs, SRb, SRi |
| VSTCB.st | Rs, SRb, #IMM |
| VSTCB.st | Rs, SRb+, SRi |
| VSTCB.st | Rs, SRb+, #IMM | where st = {b, b9t, h, w, 4, 8, 16, 32, 64}, Rs = {VRs, VRAs, SRs}. Note that .b and .b9t specify the same operation, and that .64 and VRAd cannot be specified together. Use VSTCBOFF for cache-off load.

Description

Stores a vector or scalar register from the circular buffer bounded by the BEGIN pointer in $SR_{b+1}$ and the END pointer in $SR_{b+2}$.

The effective address is adjusted if it is greater than the END address before the store as well as the address update operation. In addition, the circular buffer bounds must be aligned on the halfword and word boundaries for .h and .w scalar loads, respectively.

Operation $EA = SR_b + \{SRi \parallel sex(IMM<7:0>)\}$ ;
$BEGIN = SR_{b+1}$ ;
$END = SR_{b+2}$ ;
cbsize = END - BEGIN ;
if (EA > END) EA = BEGIN + (EA - END) ;
if (A == 1) $SR_b$ = EA ;
MEM[EA] = see table below;

| ST | Store Operation |
|---|---|
| .b | BYTE[EA] = $SR_s<7:0>$ ; |
| .h | HALF[EA] = $SR_s<15:0>$ ; |
| .w | WORD[EA] = $SR_s<31:0>$ ; |
| .4 | BYTE[(EA+i > END) ? EA+i-cbsize : EA+i] = $VR_s<9i+7:9i>$, i = 0 to 3 |
| .8 | BYTE[(EA+i > END) ? EA+i-cbsize : EA+i] = $VR_s<9i+7:9i>$, i = 0 to 7 |
| .16 | BYTE[(EA+i > END) ? EA+i-cbsize : EA+i] = $VR_s<9i+7:9i>$, i = 0 to 15 |

| ST | Store Operation |
|---|---|
| .32 | BYTE[(EA+i > END) ? EA+i-cbsize : EA+i] = $VR_s<9i+7:9i>$, i = 0 to 31 |
| .64 | BYTE[(EA+i > END) ? EA+i-cbsize : EA+i] = $VR_{0s}<9i+7:9i>$, i = 0 to 31<br>BYTE[(EA+32+i > END) ? EA+32+i-cbsize : EA+32+i] = $VR_{1s}<9i+7:9i>$, i = 0 to 31 |

Exception

Invalid data address, unaligned access.

Programming Note

This instruction is not affected by the element mask.

Programmer must ensure the following condition for this instruction to work as expected:

BEGIN < EA < 2*END - BEGIN

That is, EA > BEGIN as well as EA - END < END - BEGIN.

-198-

VSTD — Store Double

Format

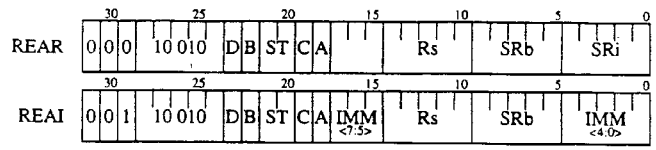

Assembler Syntax

VSTD.st    Rs, SRb, SRi
VSTD.st    Rs, SRb, #IMM
VSTD.st    Rs, SRb+, SRi
VSTD.st    Rs, SRb+, #IMM where st = {b, b9t, h, w, 4, 8, 16, 32, 64}, Rs = {VRs, VRAs, SRs}. Note that .b and .b9t specify the same operation, and that .64 and VRAs cannot be specified together. Use VSTDOFF for cache-off store.

Description

Stores two vector registers from the current or alternate bank or two scalar registers.

Operation $EA = SR_b + \{SR_i \parallel sex(IMM<7:0>)\};$
if $(A == 1)$ $SR_b = EA;$
MEM[EA] = see table below ;

| ST | Store Operation |
|---|---|
| .b | BYTE[EA] = $SR_s<7:0>$<br>BYTE[EA+1] = $SR_{s+1}<7:0>$ |
| .h | HALF[EA] = $SR_s<15:0>$<br>HALF[EA+2] = $SR_{s+1}<15:0>$ |
| .w | WORD[EA] = $SR_s<31:0>$<br>WORD[EA+4] = $SR_{s+1}<31:0>$ |
| .4 | BYTE[EA+i] = $VR_s<9i+7:9i>$, i = 0 to 3<br>BYTE[EA+4+i] = $VR_{s+1}<9i+7:9i>$, i = 0 to 3 |
| .8 | BYTE[EA+i] = $VR_s<9i+7:9i>$, i = 0 to 7<br>BYTE[EA+8+i] = $VR_{s+1}<9i+7:9i>$, i = 0 to 7 |
| .16 | BYTE[EA+i] = $VR_s<9i+7:9i>$, i = 0 to 15<br>BYTE[EA+16+i] = $VR_{s+1}<9i+7:9i>$, i = 0 to 15 |

| ST | Store Operation |
|---|---|
| .32 | BYTE[EA+i] = $VR_s<9i+7:9i>$, i = 0 to 31<br>BYTE[EA+32+i] = $VR_{s+1}<9i+7:9i>$, i = 0 to 31 |
| .64 | BYTE[EA+i] = $VR_{0s}<9i+7:9i>$, i = 0 to 31<br>BYTE[EA+32+i] = $VR_{1s}<9i+7:9i>$, i = 0 to 31<br>BYTE[EA+64+i] = $VR_{0s+1}<9i+7:9i>$, i = 0 to 31<br>BYTE[EA+96+i] = $VR_{1s+1}<9i+7:9i>$, i = 0 to 31 |

Exception

Invalid data address, unaligned access.

Programming Note

This instruction is not affected by the element mask.

VSTQ — Store Quad

Format

```
        30        25        20     15        10       5        0
REAR   0 0 0   10 100   D B ST C A        Rs        SRb       SRi 30        25        20     15        10       5        0
REAI   0 0 1   10 100   D B ST C A IMM     Rs        SRb       IMM
                                   <7:5>                        <4:0>
```

Assembler Syntax

VSTQ.st    Rs, SRb, SRi
VSTQ.st    Rs, SRb, #IMM
VSTQ.st    Rs, SRb+, SRi
VSTQ.st    Rs, SRb+, #IMM where st = {b, b9t, h, w, 4, 8, 16, 32, 64}, Rs = {VRs, VRAs, SRs}. Note that .b and .b9t specify the same operation, and that .64 and VRAs cannot be specified together. Use VSTQOFF for cache-off store.

Description

Stores four vector registers from the current or alternate bank or four scalar registers.

Operation $EA = SR_b + \{SR_i \parallel sex(IMM<7:0>)\}$;
if $(A == 1)$ $SR_b = EA$;
MEM[EA] = see table below:

| ST | Store Operation |
|----|-----------------|
| .b | BYTE[EA] = $SR_s<7:0>$<br>BYTE[EA+1] = $SR_{s+1}<7:0>$<br>BYTE[EA+2] = $SR_{s+2}<7:0>$<br>BYTE[EA+3] = $SR_{s+3}<7:0>$ |
| .h | HALF[EA] = $SR_s<15:0>$<br>HALF[EA+2] = $SR_{s+1}<15:0>$<br>HALF[EA+4] = $SR_{s+2}<15:0>$<br>HALF[EA+6] = $SR_{s+3}<15:0>$ |
| .w | WORD[EA] = $SR_s<31:0>$<br>WORD[EA+4] = $SR_{s+1}<31:0>$<br>WORD[EA+8] = $SR_{s+2}<31:0>$<br>WORD[EA+12] = $SR_{s+3}<31:0>$ |

| ST | Store Operation |
|---|---|
| .4 | BYTE[EA+i] = $VR_s\langle 9i+7:9i\rangle$, i = 0 to 3<br>BYTE[EA+4+i] = $VR_{s+1}\langle 9i+7:9i\rangle$, i = 0 to 3<br>BYTE[EA+8+i] = $VR_{s+2}\langle 9i+7:9i\rangle$, i = 0 to 3<br>BYTE[EA+12+i] = $VR_{s+3}\langle 9i+7:9i\rangle$, i = 0 to 3 |
| .8 | BYTE[EA+i] = $VR_s\langle 9i+7:9i\rangle$, i = 0 to 7<br>BYTE[EA+8+i] = $VR_{s+1}\langle 9i+7:9i\rangle$, i = 0 to 7<br>BYTE[EA+16+i] = $VR_{s+2}\langle 9i+7:9i\rangle$, i = 0 to 7<br>BYTE[EA+24+i] = $VR_{s+3}\langle 9i+7:9i\rangle$, i = 0 to 7 |
| .16 | BYTE[EA+i] = $VR_s\langle 9i+7:9i\rangle$, i = 0 to 15<br>BYTE[EA+16+i] = $VR_{s+1}\langle 9i+7:9i\rangle$, i = 0 to 15<br>BYTE[EA+32+i] = $VR_{s+2}\langle 9i+7:9i\rangle$, i = 0 to 15<br>BYTE[EA+48+i] = $VR_{s+3}\langle 9i+7:9i\rangle$, i = 0 to 15 |
| .32 | BYTE[EA+i] = $VR_s\langle 9i+7:9i\rangle$, i = 0 to 31<br>BYTE[EA+32+i] = $VR_{s+1}\langle 9i+7:9i\rangle$, i = 0 to 31<br>BYTE[EA+64+i] = $VR_{s+2}\langle 9i+7:9i\rangle$, i = 0 to 31<br>BYTE[EA+96+i] = $VR_{s+3}\langle 9i+7:9i\rangle$, i = 0 to 31 |
| .64 | BYTE[EA+i] = $VR_{0s}\langle 9i+7:9i\rangle$, i = 0 to 31<br>BYTE[EA+32+i] = $VR_{1s}\langle 9i+7:9i\rangle$, i = 0 to 31<br>BYTE[EA+64+i] = $VR_{0s+1}\langle 9i+7:9i\rangle$, i = 0 to 31<br>BYTE[EA+96+i] = $VR_{1s+1}\langle 9i+7:9i\rangle$, i = 0 to 31<br>BYTE[EA+128+i] = $VR_{0s+2}\langle 9i+7:9i\rangle$, i = 0 to 31<br>BYTE[EA+160+i] = $VR_{1s+2}\langle 9i+7:9i\rangle$, i = 0 to 31<br>BYTE[EA+192+i] = $VR_{0s+3}\langle 9i+7:9i\rangle$, i = 0 to 31<br>BYTE[EA+224+i] = $VR_{1s+3}\langle 9i+7:9i\rangle$, i = 0 to 31 |

Exception

Invalid data address, unaligned access.

Programming Note

This instruction is not affected by the element mask.

| VSTR | Store Reverse |
|---|---|

Format

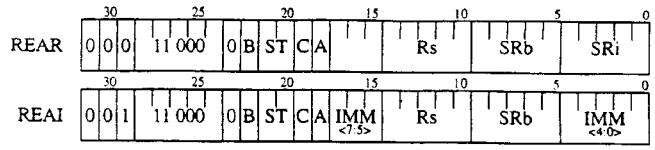

Assembler Syntax

| VSTR.st | Rs, SRb, SRi |
|---|---|
| VSTR.st | Rs, SRb, #IMM |
| VSTR.st | Rs, SRb+, SRi |
| VSTR.st | Rs, SRb+, #IMM | where st = { 4, 8, 16, 32, 64}, Rs = {VRs, VRAs}. Note :
.64 and VRAs cannot be specified together. Use VSTROFF for cache-off store.

Description

Stores a vector register in reverse element order. This instruction does not support a scalar data source register.

Operation $EA = SR_b + \{SR_i \parallel sex(IMM<7:0>)\}$;
if $(A == 1)\ SR_b = EA$ ;
MEM[EA] = see table below ;

| ST | Store Operation |
|---|---|
| .b | ~~BYTE[EA+i] = VR_s[31-i]<7:0>, for i = 0 to 31.~~ |
| .h | ~~HALF[EA+i] = VR_s[15-i]<15:0>, for i = 0 to 15.~~ |
| .w | ~~WORD[EA+i] = VR_s[7-i]<31:0>, for i = 0 to 7.~~ |
| .4 | BYTE[EA+i] = VR_s[31-i]<7:0>, i = 0 to 3 |
| .8 | BYTE[EA+i] = VR_s[31-i]<7:0>, i = 0 to 7 |
| .16 | BYTE[EA+i] = VR_s[31-i]<7:0>, i = 0 to 15 |
| .32 | BYTE[EA+i] = VR_s[31-i]<7:0>, i = 0 to 31 |
| .64 | BYTE[EA+32+i] = VR_{0s}[31-i]<7:0>, i = 0 to 31<br>BYTE[EA+i] = VR_{1s}[31-i]<7:0>, i = 0 to 31 |

Exception

Invalid data address, unaligned access.

Programming Note

This instruction is not affected by the element mask.

| VSTWS | Store With Stride |

Format

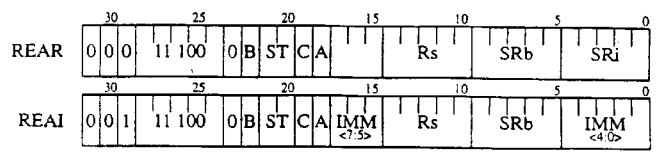

Assembler Syntax

VSTWS.st    Rs, SRb, SRi
    VSTWS.st    Rs, SRb, #IMM
    VSTWS.st    Rs, SRb+, SRi
    VSTWS.st    Rs, SRb+, #IMM where st = { 8, 16, 32}, Rs = {VRs, VRAs}. Note that .64 mode is not supported - use VST instead. Use VSTWSOFF for cache-off store.

Description

Starting at the effective address, 32 bytes are stored from vector register $VR_s$ to memory using scalar register $SR_{b+1}$ as the Stride Control register.

The ST specifies *block size*, the number of consecutive bytes to store from each block. SRb+1 specifies *stride*, the number of bytes separating the beginnings of two consecutive blocks.

The *stride* must be equal to or greater than the *block size*. The EA must be data size aligned. The *stride* and *block size* must be multiples of the data size.

Operation

```
EA = SR_b + {SR_i || sex(IMM<7:0>)} ;
if (A == 1) SR_b = EA ;
Block_size = {4 || 8 || 16 || 32} ;
Stride = SR_{b+1}<31:0> ;
for (i = 0 ; i < VECSIZE/Block_size ; i++)
    for (j = 0 ; j < Block_size ; j++)
        BYTE[EA+i*Stride+j] = VR_s[i*Block_size+j]<7:0> ;
```

Exception
Invalid data address, unaligned access.

VSUB — Subtract

Format

```
            30      25      20    15      10       5      0
RRRM9    |1|1|0001 00|D|S|DS|M| IM9 |  Rd  |  Ra  |Rb/IM5|
```

Assembler Syntax

VSUB.dt    VRd, VRa, VRb
VSUB.dt    VRd, VRa, SRb
VSUB.dt    VRd, VRa, #IMM
VSUB.dt    SRd, SRa, SRb
VSUB.dt    SRd, SRa, #IMM where dt = {b, b9, h, w, f}.

Supported Modes

| D:S:M | V <- V @ V | V <- V @ S | V <- V @ I | S <- S @ S | S <- S @ I |
|-------|------------|------------|------------|------------|------------|
| DS    | int8 (b)   | int9 (b9)  | int16 (h)  | int32 (w)  | float (f)  |

Description

The content of vector/scalar register Rb is subtracted from the content of vector/scalar register Ra and the result is stored in vector/scalar register Rd.

Operation

```
for (i = 0 ; i < NumElem && EMASK[i] ; i++) {
    Bop[i] = {Rb[i] || SRb || sex(IMM<8:0>)} ;
    Rd[i] = Ra[i] - Bop[i] ;
}
```

Exception

Overflow, floating point invalid operand.

VSUBS — Subtract and Set

Format

RRRM9: `1 1 010100 D S DS M IM9 SRd SRa SRb/IM5`

(bits 30, 25, 20, 15, 10, 5, 0)

Assembler Syntax

VSUBS.dt    SRd, SRa, SRb
VSUBS.dt    SRd, SRa, #IMM where dt = {b, b9, h, w, f}.

Supported Modes

| D:S:M |        |         |          | S <- S @ S | S <- S @ I |
|-------|--------|---------|----------|------------|------------|
| DS    | int8 (b) | int9 (b9) | int16 (h) | int32 (w)  | float (f)  |

Description

The SRb is subtracted from SRa; the result is stored in SRd and the VFLAG bits in the VCSR are set.

Operation

Bop = {SRb || sex(IMM<8:0>)} ;
SRd = SRa - Bop ;
VCSR<lt, eq, gt> = status(SRa - Bop) ;

Exception

Overflow, floating point invalid operand.

| VUNSHFL | Unshuffle |
|---|---|

Format

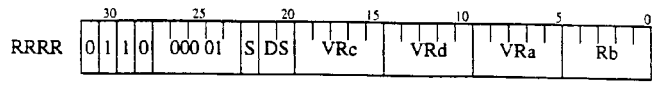

Assembler Syntax

VUNSHFL.dt VRc, VRd, VRa, VRb
VUNSHFL.dt VRc, VRd, VRa, SRb where dt = {b, b9, h, w, f}. Note that .w and .f specify the same operation.

Supported Modes

| S | VRb | SRb | | |
|---|---|---|---|---|
| DS | int8 (b) | int9 (b9) | int16 (h) | int32 (w) |

Description

The content of vector register VRa is unshuffled with Rb into vector registers VRc:VRd, as shown below:

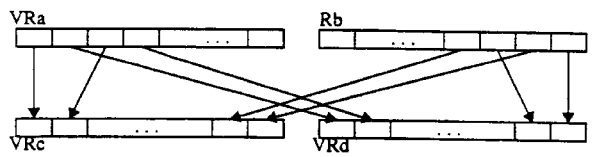

Operation

Exception

None.

Programming Note

This instruction does not use the element mask.

| VUNSHFLH | Unshuffle High |
|---|---|

Format

RRRR | 0 | 1 | 1 | 0 | 100 01 | S | DS | | VRd | VRa | Rb |

Assembler Syntax

VUNSHFLH.dt VRd, VRa, VRb
VUNSHFLH.dt VRd, VRa, SRb where dt = {b, b9, h, w, f}. Note that .w and .f specify the same operation.

Supported Modes

| S  | VRb     | SRb      |          |          |
|----|---------|----------|----------|----------|
| DS | int8 (b)| int9 (b9)| int16 (h)| int32 (w)|

Description

The content of vector register VRa is unshuffled with Rb; the upper portion of the result is returned to vector register VRd, as shown below:

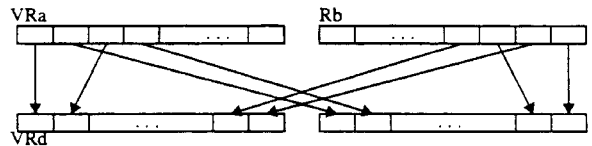

Operation

Exception

None.

Programming Note

This instruction does not use the element mask.

VUNSHFLL  Unshuffle Low

Format

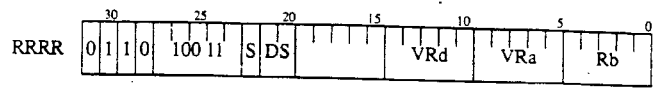

Assembler Syntax

VUNSHFLL.dt VRd, VRa, VRb
VUNSHFLL.dt VRd, VRa, SRb where dt = {b, b9, h, w, f}. Note that .w and .f specify the same operation.

Supported Modes

| S  | VRb     | SRb      |          |          |
|----|---------|----------|----------|----------|
| DS | int8 (b)| int9 (b9)| int16 (h)| int32 (w)|

Description

The content of vector register VRa is unshuffled with Rb; the lower portion of the result is returned to vector register VRd, as shown below:

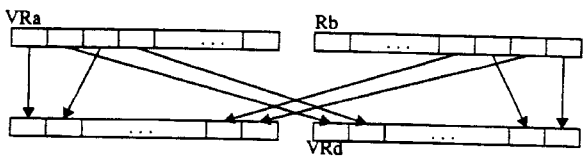

Operation

Exception

None.

Programming Note

This instruction does not use the element mask.

| VWBACK | Write Back |
|---|---|

Format

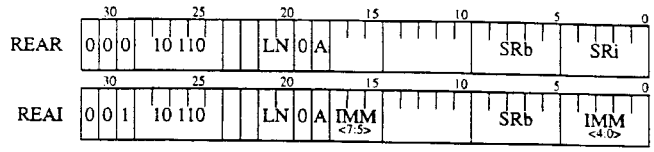

Assembler Syntax

VWBACK.ln SRb, SRi
VWBACK.ln SRb, #IMM
VWBACK.ln SRb+, SRi
VWBACK.ln SRb+, #IMM where ln = {1, 2, 4, 8}.

Description

The cache line whose index is specified by the EA (as opposed to whose tag matches the EA) in the vector data cache is updated to memory if it contains modified data. If more than one cache line is specified, the next sequential cache lines are updated to memory if they contain modified data. The number of cache lines are specified as follows:

LN<1:0> = 00: 1 64-byte cache line is written
LN<1:0> = 01: 2 64-byte cache lines are written
LN<1:0> = 10: 4 64-byte cache lines are written
LN<1:0> = 11: 8 64-byte cache lines are written If the effective address is not on a 64-byte boundary, it is first truncated to be aligned to a 64-byte boundary.

Operation

Exception

Invalid data address exception.

Programming Note

The EA<31:0> denotes a byte address in the local memory.

VWBACKSP    Write Back From Scratch Pad

Format

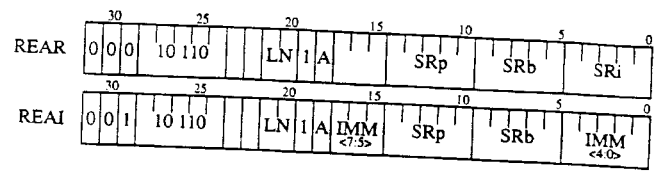

Assembler Syntax

VWBACKSP.ln   SRp, SRb, SRi
    VWBACKSP.ln   SRp, SRb, #IMM
    VWBACKSP.ln   SRp, SRb+, SRi
    VWBACKSP.ln   SRp, SRb+, #IMM where ln = {1, 2, 4, 8}. Note that VWBACK and VWBACKSP use the same opcode.

Description

Transfers multiple 64-byte blocks from the scratch pad to memory. The effective address provides the starting address in memory and SRp provides the starting address in the scratch pad. The number of 64-byte blocks are specified as follows:

LN<1:0> = 00:   1 64-byte block is transferred
LN<1:0> = 01:   2 64-byte blocks are transferred
LN<1:0> = 10:   4 64-byte blocks are transferred
LN<1:0> = 11:   8 64-byte blocks are transferred If the effective address is not on a 64-byte boundary, it is first truncated to be aligned to the 64-byte boundary. If the scratch pad pointer address in SRp is not on a 64-byte boundary, it is also truncated to be aligned to the 64-byte boundary. The aligned scratch pad pointer address is incremented by the number of bytes transferred.

Operation

EA = SRb + {SRi || sex(IMM<7:0>)} ;
    if (A == 1) SRb = EA ;
    Num_bytes = {64 || 128 || 256 || 512} ;
    Mem_adrs = EA<31:6> : 6b'000000 ;
    SRp = SRp<31:6> : 6b'000000 ;
    for (i = 0; i < Num_bytes ; i++)
        SPAD[SRp++] = MEM[Mem_adrs+i] ;

Exception

Invalid data address exception.

VXNOR — XNOR (Exclusive NOR)

Format

RRRM9: | 1 | 1 | 01110 1 | D | S | DS | M | IM9 | Rd | Ra | Rb/IM5 |

Bit positions: 30, 25, 20, 15, 10, 5, 0

Assembler Syntax

| | |
|---|---|
| VXNOR.dt | VRd, VRa, VRb |
| VXNOR.dt | VRd, VRa, SRb |
| VXNOR.dt | VRd, VRa, #IMM |
| VXNOR.dt | SRd, SRa, SRb |
| VXNOR.dt | SRd, SRa, #IMM | where dt = {b, b9, h, w}.

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

The content of vector/scalar register Ra is logically XNORed to the content of vector/scalar register Rb and the result is stored in vector/scalar register Rd.

Operation

```
for (i = 0 ; i < NumElem && EMASK[i] ; i++) {
    Bop[i] = {VRb[i] || SRb || sex(IMM<8:0>)} ;
    Rd[i]<k> = ~(Ra[i]<k> ^ Bop[i]<k>), for k = all bits in element i ;
}
```

Exception

None.

VXOR — XOR (Exclusive OR)

Format

RRRM9: `1 1 0111 11 D S DS M IM9 Rd Ra Rb/IM5`

Assembler Syntax

| | |
|---|---|
| VXOR.dt | VRd, VRa, VRb |
| VXOR.dt | VRd, VRa, SRb |
| VXOR.dt | VRd, VRa, #IMM |
| VXOR.dt | SRd, SRa, SRb |
| VXOR.dt | SRd, SRa, #IMM | where dt = {b, b9, h, w}

Supported Modes

| D:S:M | V <- V @ V | V <- V @ S | V <- V @ I | S <- S @ S | S <- S @ I |
|---|---|---|---|---|---|
| DS | int8 (b) | int9 (b9) | int16 (h) | int32 (w) | |

Description

The content of vector/scalar register Ra is logically XORed with the content of vector/scalar register Rb and the result is stored in vector/scalar register Rd.

Operation

```
for (i = 0 ; i < NumElem && EMASK[i] ; i++) {
    Bop[i] = { VRb[i] || SRb || sex(IMM<8:0>) } ;
    Rd[i]<k> = Ra[i]<k> ^ Bop[i]<k>, for k = all bits in element i ;
}
```

Exception

None.

We claim:

1. A vector processor comprising:

a register file containing vector registers;

a decoder which during decoding of an instruction identifies a selected vector register from the register file and identifies a size for data elements to be processed during execution of the instruction; and processing circuitry coupled to the vector register, wherein the processing circuitry when executing the instruction performs a number of parallel operations on data elements from the selected vector register, the number of parallel operations being controlled by the size for the data elements.

2. The vector processor of claim 1, wherein each vector register has a fixed size.

3. The vector processor of claim 1, wherein data-element sizes which the decoder identifies include 8 bits, 9 bits, 16 bits, and 32 bits.

4. The vector processor of claim 1, wherein the decoder during decoding of the instruction identifies a type for the data elements to be processed during execution of the instruction.

5. The vector processor of claim 4, wherein types which the decoder identifies include integer and floating point data types.

6. The vector processor of claim 1, wherein each vector register in the register file is partitionable into data elements having any one of a plurality of user selectable sizes.

7. The vector processor of claim 6, wherein the plurality of user selectable sizes comprises 8 bits per data element, 16 bits per data element, and 32 bits per data element.

8. A method for operating a vector processor, comprising:

storing data in a vector register;

decoding an instruction which include a register number identifying the vector register and a size field identifying a size for data elements in the vector register;

partitioning the data in the vector register into data elements, wherein each data element has the size identified by the size field; and executing the instruction by performing a number of operations in parallel, wherein each of the operations corresponds to a data element in the vector register and the size field controls the number of operations performed in parallel.

9. The method of claim 8, wherein decoding the instruction comprises determining which of a plurality of sizes the size field identifies as the size for the data elements.

10. The method of claim 9, wherein the plurality of sizes comprises 8 bits per data element, 16 bits per data element, and 32 bits per data element.

11. The method of claim 10, wherein the plurality of sizes further comprises 9-bits per data element.

12. A vector processor comprising:

a register file containing vector registers;

an instruction decoder which decodes a register number from an instruction to identify a selected vector register in the register file and decodes a size field from the instruction to identify a data element size for data elements in the selected register, wherein the selected register has a fixed size and contains a number of data elements such that the number of data elements depends a ratio of the fixed size to the data element size; and processing circuitry coupled to the vector register, wherein the processing circuitry when executing the instruction performs a number of parallel operations on data elements from the selected vector register, the number of parallel operations being controlled by the data element size.

13. The vector processor of claim 12, wherein:

when the size field has a first value, data elements of the selected vector register have a first size; and when the size field has a second value, data elements of the selected vector register have a second size which is twice the first size.

14. The vector processor of claim 13, wherein a portion of the processing circuitry that performs a single operation on a data element of the vector register when the size field has the second size performs parallel operations on two data elements of the selected register when the size field has the second size.

* * * * *